(12) United States Patent
Horowitz et al.

(10) Patent No.: US 6,349,290 B1
(45) Date of Patent: Feb. 19, 2002

(54) AUTOMATED SYSTEM AND METHOD FOR CUSTOMIZED AND PERSONALIZED PRESENTATION OF PRODUCTS AND SERVICES OF A FINANCIAL INSTITUTION

(75) Inventors: Edward Horowitz, New York; Mark Ambrose, Valley Cottage; Michael Fetta, Pelham, all of NY (US); Steve Hakim, Belle Mead, NJ (US); Michael Kaufman, New Providence, NJ (US); David Robinson, Herndon, VA (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 09/337,014

(22) Filed: Jun. 30, 1999

(Under 37 CFR 1.47)

Related U.S. Application Data

(60) Provisional application No. 60/091,276, filed on Jun. 30, 1998.

(51) Int. Cl.⁷ .............................................. G06F 17/00
(52) U.S. Cl. ............................................ 705/35; 705/42
(58) Field of Search .............................. 705/42, 36, 70, 705/34, 35; 370/352

(56) References Cited

U.S. PATENT DOCUMENTS

| | | | |
|---|---|---|---|
| 5,701,400 A | * 12/1997 | Amado | |
| 5,710,889 A | * 1/1998 | Clark et al. | |
| 5,787,403 A | * 7/1998 | Randle | 705/43 |
| 5,917,730 A | * 6/1999 | Rittie et al. | 364/578 |
| 5,918,217 A | * 6/1999 | Maggioncalda et al. | 705/36 |
| 5,920,848 A | * 7/1999 | Schutzer et al. | 705/42 |
| 5,933,816 A | * 8/1999 | Zeanah et al. | 705/35 |
| 6,021,397 A | * 2/2000 | Jones et al. | 705/35 |
| 6,029,156 A | * 2/2000 | Lannert et al. | 706/11 |
| 6,131,810 A | * 10/2000 | Weiss et al. | 235/379 |

FOREIGN PATENT DOCUMENTS

JP 2000242658 A * 9/2000

OTHER PUBLICATIONS

Chen L. et al; Derwent–ACC–NO: 2001–060513, Oct. 2000.* http://www.zdnet.com/eweek/news/0127/27ver.html, 1997.*

"Vertigo announces support for open financial exchange", Business Wire. Dialog File 148, Access No. 09295078, Feb. 1997.*

"Vertigo delivers an unprecedented level of personalized webcasting with I–Casting", Business Wire. Dialog File 621, Access No. 01501311, Mar. 1997.*

(List continued on next page.)

*Primary Examiner*—James P. Trammell
*Assistant Examiner*—Pierre E. Elisca
(74) *Attorney, Agent, or Firm*—George T. Marcou; Kilpatrick Stockton LLP

(57) ABSTRACT

An automated system and method for presenting both interactive and proactive customized and personalized advice for a customer by a financial institution is based on a sophisticated customer profile generated by the system according to an analysis of the customer from a totality of the customer's interaction with the system. The system includes, for example, an advice engine, which is primarily software, that considers numerous sets of system logic, such as legal constraints and statistical facts that affect the customer, and generates the advice. The system also includes a presentation engine which varies the presentation, depending in part on the mode by which the customer accesses the system, but regardless of the mode, presents the advice to the customer in an individualized manner. Additionally, the system includes a context assessment engine, which examines the context of the interaction between the customer and the system and assesses the effectiveness of the advice.

44 Claims, 37 Drawing Sheets

OTHER PUBLICATIONS

"security First: Security First & Vertigo join forces to create virtual financial advisor for net banking", M2 Presswire. Dialog File 636, Access No. 03377991, Dec. 1996.*

Rosen, R., "Standing out in the online crowd", Banking Strategies, v73n1 pp:50–53. Dialog File 15, Access No. 01360437, Jan. 1997.*

"Vertigo introduces personalized online financial advice for banking customers", Business Wire. Dialog File 621, Access No. 01445171, Oct. 1996.*

"Home Account Network scores first customer", Bank Technology News. Dialog File 636, Access No. 03624674, Jul. 1997.*

* cited by examiner

CUSTOMER PROFILE DATA

| Customer Unique Identification | Customer First Name | Customer Middle Initial | Customer Last Name | Customer Main Residence Link | Customer Date of Birth | Customer Sex | Customer Financial Link | Customer Preferred Method of Engagement | Customer Declared Financial Link | Customer Communication Link | Customer Linguistic Link |
|---|---|---|---|---|---|---|---|---|---|---|---|
| 134 | 136 | 138 | 140 | 142 | 144 | 146 | 148 | 150 | 152 | 154 | 156 |

FIG. 14

CUSTOMER RESIDENCE LINK
142

| Customer Unique Identification | Address Residence Identification | Address Main Residence Flag/Link | Address Street | Address Town | Address State/Province | Address Zip | Address Country |
|---|---|---|---|---|---|---|---|

FIG. 15

CUSTOMER DECLARED FINANCIAL LINK DATA

152

| Customer Unique Identification | Declared Goal | Derived Financial Need | Derived Vehicle Type | Derived Schedule | Start Goal Date | Achievement Level |
|---|---|---|---|---|---|---|
| | | | | | | |

FIG. 17

CUSTOMER COMMUNICATION LINK DATA
154

| Customer Unique Identification | Link Type | Communication Number or URL | Date & Time to be Used From | Date & Time to be Used Till |
|---|---|---|---|---|
| | | | | |

FIG. 18

CUSTOMER LINGUISTIC LINK DATA
156

| Customer Unique ID | Link Type (Weighted by Preference) | Language Spoken | Alphabet Used |
|---|---|---|---|
| | | | |

FIG. 19

CUSTOMER BEHAVIOR DATABASE

100

| Customer Unique ID | Declared Preference Communication Touchpoint | Declared Time of Communication | Declared Emergency Touchpoint | Customer Activities Link |
|---|---|---|---|---|//

FIG. 20

PRODUCTS AND SERVICES DATABASE
/96

Product Record

Product Unique ID

Product Name

Country of Applicability Code

Product Type

Product Life Span

Product Life Measurement

Product Cost Structure Link

Transaction Link

FIG. 21

AUTOMATED SYSTEM AND METHOD FOR CUSTOMIZED AND PERSONALIZED PRESENTATION OF PRODUCTS AND SERVICES OF A FINANCIAL INSTITUTION

CROSS REFERENCE TO RELATED APPLICATIONS

This application claims the benefit of U.S. Provisional Application No. 60/091,276 filed Jun. 30, 1998.

FIELD OF THE INVENTION

This invention relates generally to customized and personalized presentation of products and services, and more particularly to an automated system and method for presenting customized and personalized product and service messages to customers of a financial institution, such as a bank.

BACKGROUND OF THE INVENTION

In the early days of telephony, it was determined that a single operator was needed for every ten adult citizens. This problem was solved by the introduction of electronic switching systems, which provided automated, self-service enabling universal access and ubiquitous service. Self-service telephone access, for example, to a financial institution, such as a bank, was a great convenience at the time. However, financial institutions, such as banks, typically want to learn more about their individual customers' financial needs and operational styles, in order to be able to personalize and customize individual consultative sessions and to provide the best possible transactional sessions to customers. They also want to be able to provide "mass customization" of individualized consultative sessions to deepen customer relationships. These goals are not possible with currently available self-service systems.

Current systems are intended to capture electronic presentation to customers of certain products and services and to push or encourage customers to purchase a certain product that matches a customer's perceived need. Some of these tailoring products include direct use of such interfaces as the Internet or call center agents. However, currently available tailoring products are typically designed for groups of customers and make no distinction between individual customers. In other words, such systems rely on a one-size-fits-all approach, in which one or two or three sizes must fit all customers.

In the financial services sector, as a financial institution, such as a bank, expands its customer base, and as people become more and more involved in determining their own financial destinies by taking charge of their own financial matters, the complexity and spectrum of financial options cannot be handled on a simple one-size-fits-all basis. Instead, banks and other financial institutions need a system that presents not only the means to offer the customer an umbrella of services and products, but also to serve the individual needs of a customer significantly better than any operator can. Such a system, when applied, for example, to a bank's customer interactive systems, would remove the need for agent intervention, except for the technically resistant customer, and would offer a significant competitive advantage within the service center technology arena and in the application of Internet technology.

SUMMARY OF THE INVENTION

It is a feature and advantage of the present invention to provide an automated method and system for presenting customized and personalized product and service messages that allows a financial institution, such as a bank, to retain customers and attract new customers, while maintaining the lowest possible cost of agent support staff.

It is another feature and advantage of the present invention to provide an automated customization and personalization product and service message presentation system and method that revolves around intelligent engines that self learn, and couple extracted customer's business needs and operational style with the bank's broadest set of products and services.

It is a further feature and advantage of the Present invention to provide an automated customization and personalization product and service message presentation system and method that is dynamic and constantly adapts to new products and services, as well as to the ever-changing needs of customers.

It is an additional feature and advantage of the present invention to provide an automated customization and personalization product and service message presentation system and method which enables a financial institution, such as a bank, to vastly expand its customer base in a cost-effective manner.

It is another feature and advantage of the present invention to provide an automated customization and personalization product and service message presentation system which differentiates the services of a financial institution, such as a bank, by enabling the bank to provide "mass customization" of individualized consultative sessions to deepen customer relationships.

It is an additional feature and advantage of the present invention to provide an automated customization and personalization product and service message presentation system which provides the best possible transactional sessions to customers that consistently satisfy and exceed customer intents.

It is a further feature and advantage of the present invention to provide an automated customization and personalization system and method for presentation of product and service messages which eliminates distance barriers by providing global access at a very attractive cost.

It is a still further feature and advantage of the present invention to provide an automated customization and personalization system and method for presentation of product and service messages which adapts itself to any customer, at any location, for example, by being able to recognize the customer as an individual, rather than as a member of a class, and tailors its offerings to satisfy specific customer needs, regardless of worldwide location.

It is an additional feature and advantage of the present invention to provide an automated customization and personalization system and method for presentation of product and service messages which supports any major interface access, such as Internet, voice calls, call centers, automated teller machines (ATM), e-mail, and associated distribution technologies such as cable, wireless, pagers, and the like.

It is another feature and advantage of the present invention to provide an automated customization and personalization system and method for presentation of product and service messages which easily disseminates information regarding new products and/or services to the most interested customers and those who would likely subscribe to such products and/or services.

It is an additional feature and advantage of the present invention to provide an automated customization and personalization system and method for presentation of product and service messages which easily updates products and/or services offerings, as they become available.

It is another feature and advantage of the present invention to provide an automated customization and personalization system and method for presenting product and service messages which scales architecturally in a cost-effective manner, such as by architecture that lends itself to natural, modular growth as the usage of the system increases, and that is scaleable to allow growth without incurring undue cost for re-architecting and re-deploying the system.

It is a further feature and advantage of the present invention to provide an automated customization and personalization system and method for presenting product and service messages which offers a high degree of reliability in that, for example, system hardware not only scales to allow growth, but also guarantees a high degree of reliability as a part of the hardware, as well as the operating systems running the systems that collectively provide the functionality of the system, and the overall networking plan that provides a similar degree of reliability in data transmission. The token is a routable entity that allows applications and systems for an embodiment of the present invention to make decisions on various aspects, such as agent skills, methods of interaction (automated or assisted service) with a customer, and the like, and it triggers decisions by the systems. The token interfaces the various applications and systems and influences decisions, but primarily functions as a routable entity between applications and ultimately routes the customer. The token manages sessions with a customer and makes decisions on issues, such as what is involved, when it goes, and the like.

It is a still further feature and advantage of the present invention to provide an automated customization and personalization system and method for presenting product and service messages which offers a high degree of availability and stability and is available to customers, for example, on a 24 hours by 7 days by 360 days commitment basis, with system administrative functions that support such an availability commitment without any single point of failure in the system.

To achieve the stated and other features, advantages and objects of the invention, an embodiment of the present invention makes use of computer hardware and software to generate and present custom tailored advice that is tailored and adjusted based, for example, on the customer's behavior, the customer's financial aptitude, the customer's financial assets, and a combination of these factors. The advice includes, for example, advice that is generated interactively as the financial institution communicates with the customer in real time and based on specific subject matter about which the customer is communicating with the financial institution, and proactive advice generated by the financial institution and presented to the customer without prompting from the customer.

An aspect of an embodiment of the present invention includes use of information referred to as token data, which is a capture or building of a database regarding the customer's financial essence, such as a determination of the customer's assets and how the customer interacts with product and service offerings of the financial institution. The system for an embodiment of the present invention enables the financial institution to formulate an impression or analysis of the customer's token, using computer encapsulation of the perception that the system forms of the customer. In this sense, the system for an embodiment of the present invention forms an opinion or impression of the customer and modifies the opinion over time as it interacts with the customer.

Key components for an embodiment of the present invention include, for example, an advice engine, a presentation engine, and a context assessment engine. The advice engine considers numerous sets of system logic, including for example, legal constraints and statistical facts that affect the customer. The presentation engine varies the presentation of the system depending, for example, on the mode by which the customer accesses the system, and presents the system to the customer in an individualized manner, regardless of the customer's mode of access. The context engine examines the context of the interaction with the customer and determines how effective the system's advice is.

The advice engine for an embodiment of the present invention, for example, analyzes information relating to the customer to identify one or more customer characteristics indicative of a type of advice preferable to the customer and automatically generates one or more items of advice of the type indicated to be preferable to the customer. The presentation engine, for example, analyzes information relating to the customer to identify one or more customer characteristics indicative of a preference of the customer for a manner in which to present advice to the customer and automatically presents the advice generated by the advice engine in the manner indicated to be preferable to the customer. The context assessment engine, for example, automatically assesses the effectiveness of the advice generated for the customer by the advice engine and presented to the customer by the presentation engine.

In an embodiment of the present invention, the presentation engine receives the customer's input, including the customer's ID, and automatically parses, characterizes and sends the input to the advice engine, which verifies the customer. The advice engine automatically retrieves and reads, for example, token data for the customer, as well as the financial institution's data. The advice engine automatically generates one or both of responsive type advice or proactive type advice for the customer.

In connection with responsive type advice for the customer, the advice engine for an embodiment of the present invention retrieves and reads, for example, one or more categories of financial institution data, such as presentation data, marketing and business rules data, and customer profile data. In connection with proactive type advice for the customer, the advice engine retrieves and reads, for example, one or more categories of financial institution data, such as customer pertinent news data, customer asset investment data, customer interaction frequency data, customer purchasing history data, customer risk factor appraisal data, and customer risk assessment data. Also in connection with proactive advice for the customer, the advice engine automatically filters one or more categories of data for the customer, such as news of the day, special events tied to the current date, and sales information of interest to the customer.

The advice engine for an embodiment of the present invention automatically prepares one or both of responsive and proactive type advice for the customer, packages the advice in a preferred format for the customer, and sends the advice to the presentation engine. The advice engine also, for example, automatically posts the advice to a token database of the financial institution and sends an update related to the advice to a customer profile of the financial institution and to the context assessment engine.

The presentation engine for an embodiment of the present invention, for example, deciphers the customer's touchpoint channel and molds a customer token according to one or more customer characteristics for the touchpoint channel. The presentation engine also, for example, recognizes the customer's location. Further, the presentation engine, for example, automatically reads one or more fulfillment processes statuses into the customer token and reads one or ore intents of the financial institution into the customer token. In identifying one or more customer characteristics indicative of a manner of presentment preferable to the customer, the presentation reads one or more categories of financial institution data, such as customer continuity data, customer financial profile data, customer behavior data, and customer token data. In an embodiment of the present invention, the presentation engine also, for example, processes at least one immediate intent of the customer. Based on the analysis by the presentation engine of the customer's characteristics, the presentation engine automatically identifies a presentation format for the customer.

In an embodiment of the present invention, the presentation engine receives the advice generated by the advice engine and automatically packages and presents the advice to the customer in the presentation format identified for the customer by the presentation engine as preferable to the customer, for example, from the token data for the customer. In packaging the advice, the presentation engine, for example, modifies one or more aspects of the manner of presentation as indicated by the token data, such as the presentation screen, the presentation voice, the presentation colors, and the presentation music. Further, the presentation engine presents the advice to the customer through a medium according to the token process of the financial institution, such as phone/interactive voice response, personal computer/browser, network/Internet, kiosk/intranet, recruitment center/self service, automated teller machine/self service, personal digital assistant/digital, and an agent at a desktop/browser.

After the advice is presented to the customer, the context assessment engine automatically receives an input, for example, from the advice engine and automatically evaluates the effectiveness of the advice, for example, in regard to one or more of the message, the touchpoint channel, and the subject of the advice. In evaluating the advice, the context assessment engine, for example, compares the input from the advice engine with the customer token and automatically updates the token structure with the result of the assessment.

Additional objects, advantages and novel features of the invention will be set forth in part in the description which follows, and in part will become more apparent to those skilled in the art upon examination of the following, or may be learned by practice of the invention.

BRIEF DESCRIPTION OF THE DRAWINGS

FIG. 14 is a table that shows samples of the structure that contains the customer's profile data for an embodiment of the present invention;

FIG. 15 is a table which illustrates examples of customer residence link data for an embodiment of the present invention;

FIG. 17 is a table with illustrates examples of customer declared financial link data for an embodiment of the present invention;

FIG. 18 is a table which shows samples of customer communication link data for an embodiment of the present invention;

FIG. 19 is a table which shows examples of customer linguistic link data for an embodiment of the present invention;

FIG. 20 is a table which shows a sample data scheme for the customer behavior database for an embodiment of the present invention;

FIG. 21 is a table with shows examples of product data for an embodiment of the present invention;

DETAILED DESCRIPTION

Referring now in detail to an embodiment of the invention, an example of which is illustrated in the accompanying drawings, the method and system for an embodiment of the present invention provides a customer-tailored prescription for products and services that not only suits a financial institution, such as a bank, as a service provider, but also adjusts to the customer's individual needs, as the bank's understanding of the customer changes. This custom tailoring and adjustment is based, for example, on the customer's behavior, the customer's financial aptitude, the customer's financial assets, and a combination of these factors, which are used to generate individualized advice to the customer.

Figure 1:
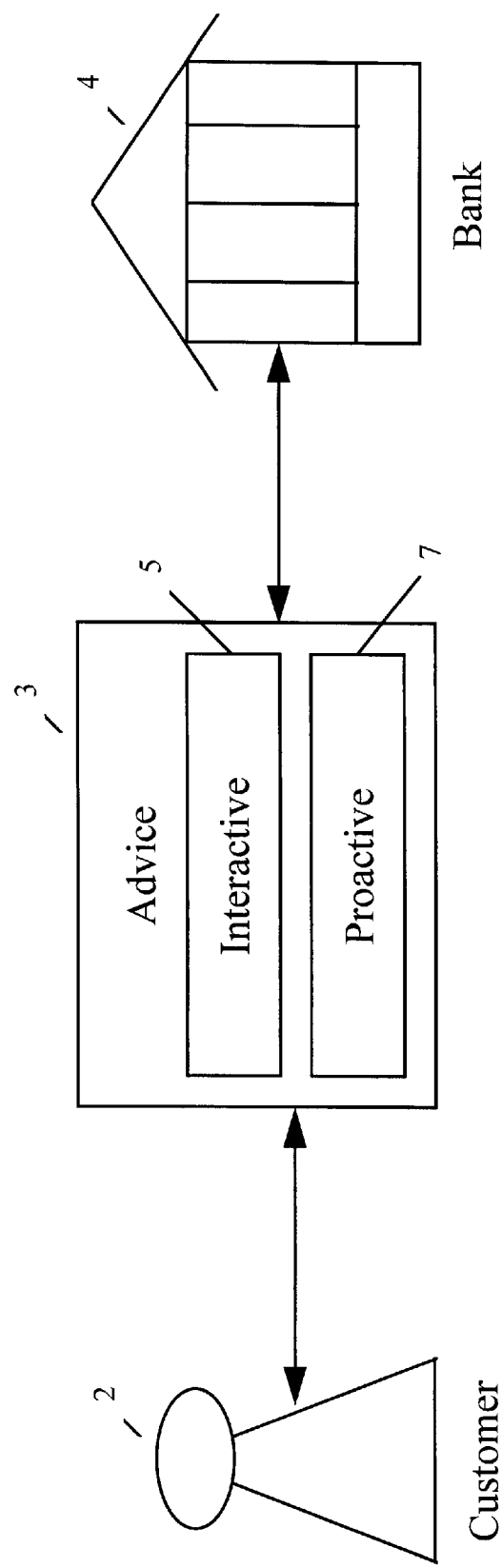
FIG. 1 is a diagram which illustrates the flow of information between a customer and a financial institution, such as a bank, and shows sample types of advice for an embodiment of the present invention.

FIG. 1 is a diagram which illustrates the flow of information between a customer of a financial institution, such as a bank, and shows sample types of advice for an embodiment of the present invention. Referring to FIG. 1, the advice 3 is, for example, twofold, namely, interactively generated advice 5 and proactive advice 7. Interactively generated advice 5 is advice that is interactively generated as the bank 4 communicates with the customer 2. Such advice is therefore generated in real time and based on the specific subject or matter about which the customer 2 is communicating with the bank 4. Proactive advice 7 is specific advice or suggestions to the customer 2 that the bank 4 generates to the customer and forwards without prompting from the customer.

A unique aspect of an embodiment of the present invention is that the presentation method by which the bank 4 communicates with the customer 2 is tailor-made to what the bank believes the likes and dislikes of the customer are. In addition, the system is self-learning and self-correcting on a customer-specific basis. The system allows the bank 4 to evaluate how effective the advice 3 is, determine where corrections are needed, and make the appropriate corrections.

Figure 2:
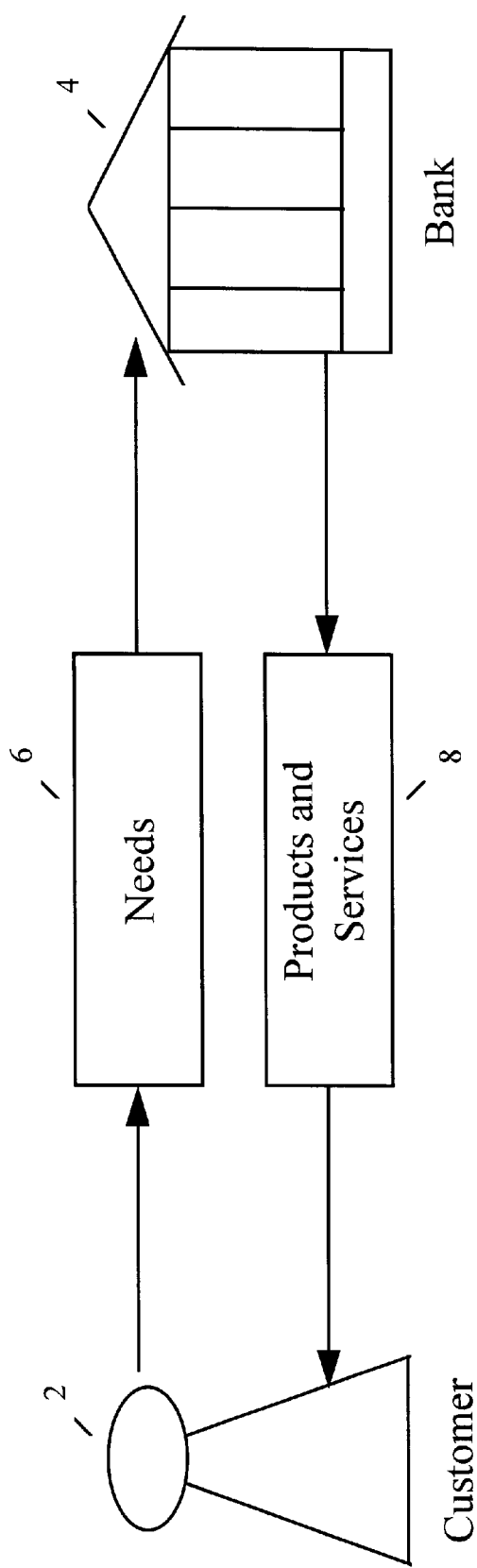
FIG. 2 is a diagram which illustrates an example of the flow of information between the customer and the bank for a fulfillment objective for an embodiment of the present invention.

FIG. 2 is a diagram which illustrates an example of the flow of information between the customer and the bank for a fulfillment objective for an embodiment of the present invention. Referring to FIG. 2, an embodiment of the present invention provides mass customization to meet and exceed the expectations of the customer 2. For example, a fulfillment objective is to provide a global, flexible, mechanism through which a financial institution, such as the bank 4, can interface with the customer 2. Another fulfillment objective is to create channels through which the bank 4 can provide products and services 8 and advice 3 to the customer 2. Additional fulfillment objectives include, for example, satisfying the expressed needs 6 of the customer 2, raising the bar with consultative services offerings, and providing an experience which elicits an enthusiastic response from the customer.

Figure 3:
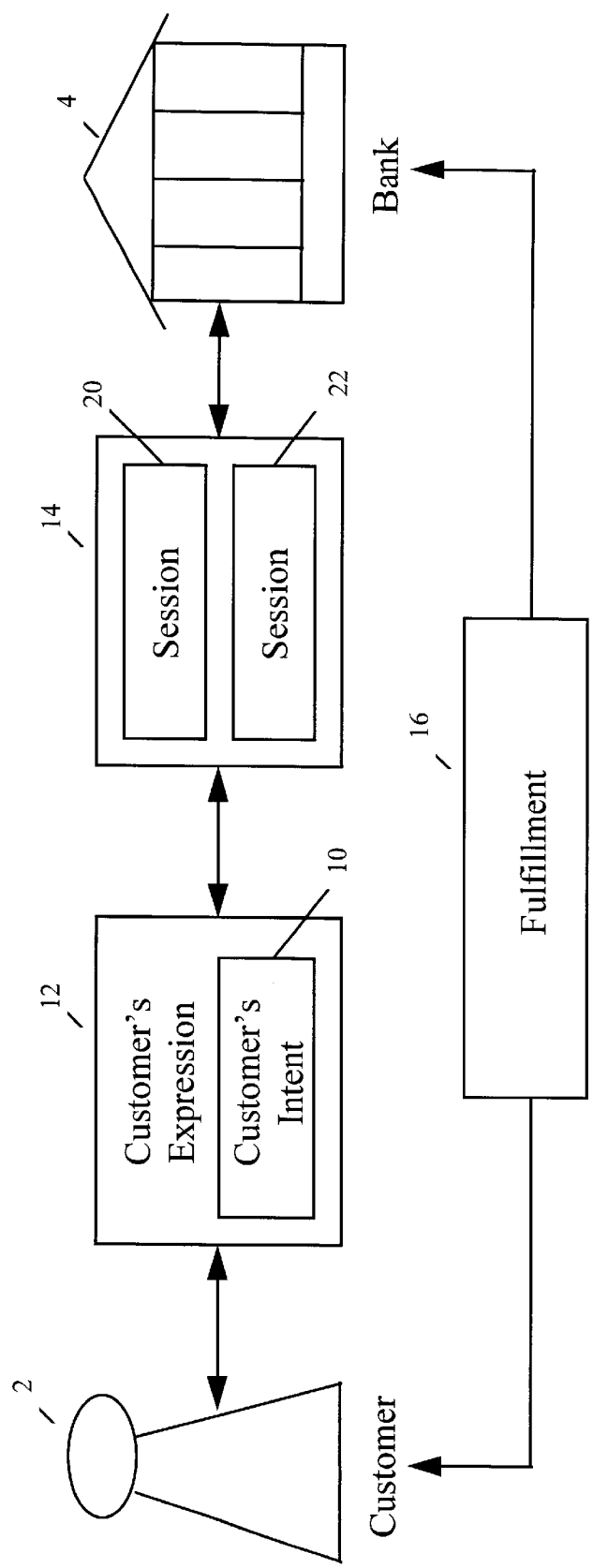
FIG. 3 is a diagram which amplifies the flow of information shown in FIGS. 1 and 2 and provides further detail regarding an example of a fulfillment cycle for an embodiment of the present invention.
Figure 4:
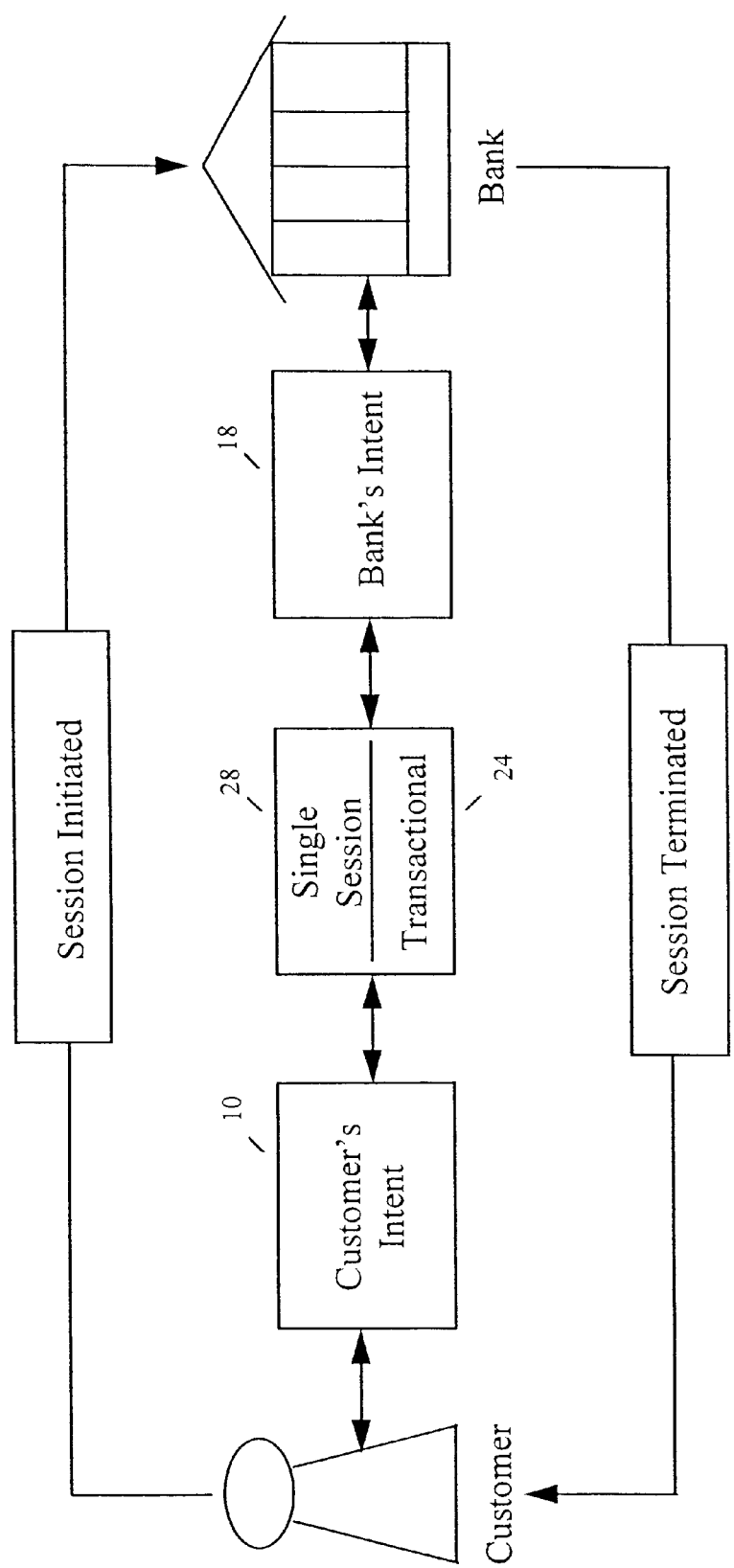
FIG. 4 is a diagram which amplifies the flow of information shown in FIGS. 1 and 2 and provides further detail regarding an example of a transactional session for an embodiment of the present invention.

FIG. 3 is a diagram which amplifies the flow of information shown in FIGS. 1 and 2 and provides further detail regarding an example of the fulfillment cycle for an embodiment of the present invention. FIG. 4 is a diagram which amplifies the flow of information shown in FIGS. 1 and 2 and provides further detail regarding an example of a transactional session for an embodiment of the present invention. Referring to FIGS. 3 and 4, in order to meet the fulfillment objectives for an embodiment of the present invention, it is important to define what is meant by fulfillment 16. For example, fulfillment 16 is the process through which successful resolution of either an intention 10 of the customer 2 or an intention 18 of the bank 4 is achieved. The meaning of fulfillment 16 also involves other concepts, such as intentions 10, 18 and sessions 14, 28. Intentions 10 or 18 can arise, for example, from two sources, namely the customer 2 and the bank 4. The intent 10 of the customer 2 typically exists prior to, and is the cause of, any contact with the bank 4. It is an expression 12 of an underlying desire of the customer 2 which needs fulfillment 16.

Figure 5:
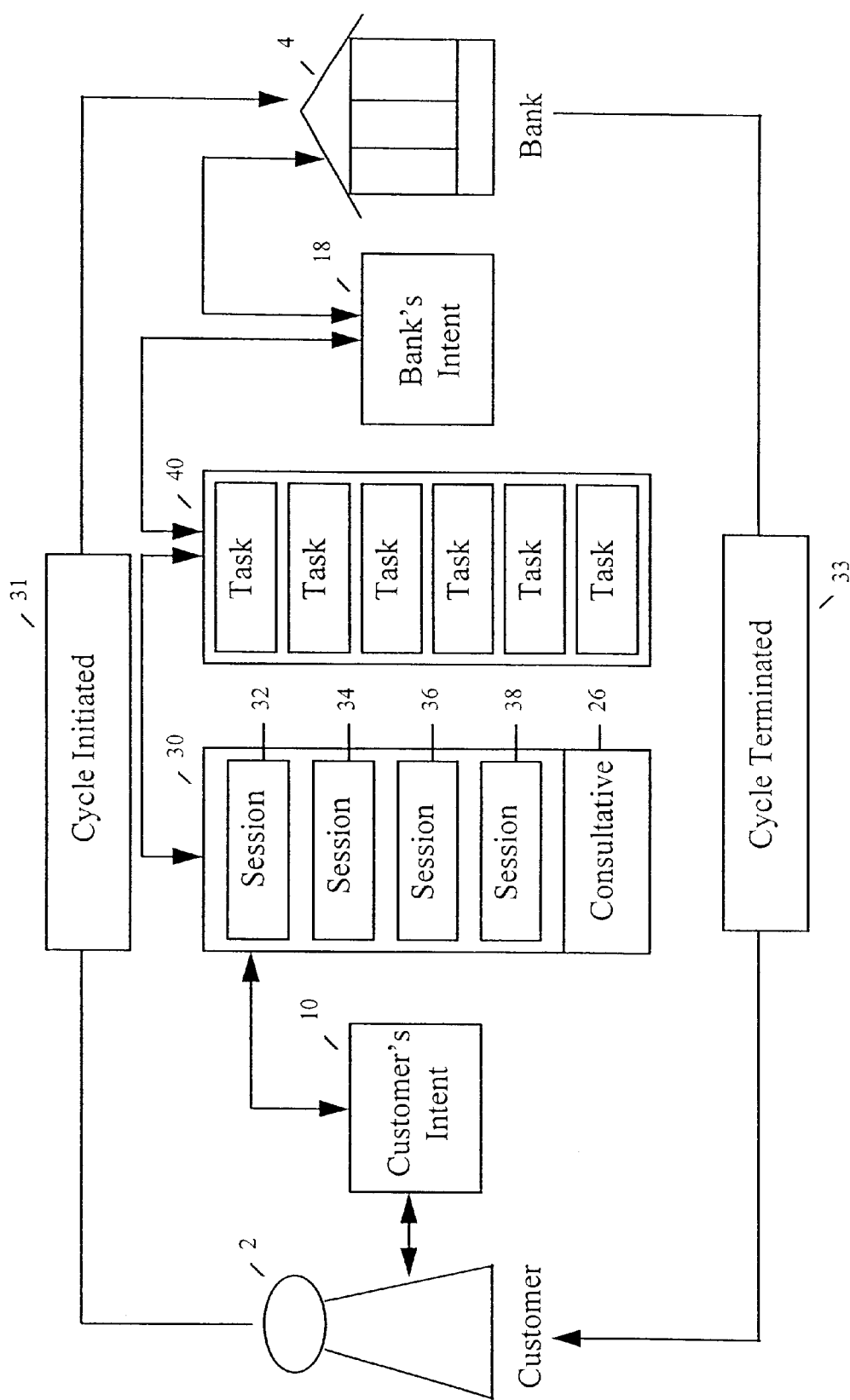
FIG. 5 is a diagram which amplifies the flow of information shown in FIG. 1 and provides further detail regarding an example of a consultative session for an embodiment of the present invention.

FIG. 5 is a diagram which amplifies the flow of information shown in FIG. 1 and provides further detail regarding an example of a consultative session for an embodiment of the present invention. Referring to FIGS. 4 and 5, sessions, shown generally as 28 in FIG. 4 and 30 in FIG. 5, are the discrete (in time) communications between the customer 2 and the bank 4 through a touchpoint resulting from the formulation of an intention 10 or 18. Referring to FIG. 5, the lifetime of a particular session 28 or 30 is bound by the individual contact and terminates when the contact ends. There are two types of sessions 28 or 30, namely, a proactive session, which results, for example, from the formulation of an intention 18 by the bank 4, and a responsive session, which results, for example, from the formulation of an intention 10 by the customer 2. The expression of an intent 10 or 18 in a session 28 or 30 provides an opportunity for fulfillment 16. A fulfillment opportunity across multiple sessions 30 is a fulfillment cycle. The cycle begins 31, for example, with the expression of an intent 10 and ends 33 with resolution of the intent in the act of fulfillment 16.

Referring further to FIGS. 4 and 5, in addition, there are two "kinds" of sessions that need to be distinguished for an embodiment of the present invention, namely, transactional sessions 24 and consultative sessions 26. Transactional sessions 24 are characterized, for example, by the fact that only a single session 28 is necessary to provide fulfillment 16 of the original intent 10 or 18. Transactional fulfillment cycles 24 tend to be atomic in nature, are potentially composed of many data transactions which are typically carried out by back-end financial systems, can consist of multiple data transactions required to fulfill a single intent 10 or 18, and are resolved within the context and scope of a single session 28. It is important to understand that data is kept and harvested even for transactional interactions 24. This source of data is frequently overlooked. The system for an embodiment of the present invention harvests and uses this data.

Referring to FIG. 5, consultative sessions 26 are characterized, for example, by multiple sessions 30 and sessions that continue over time. Each session 32, 34, 36, and 38 can entail, for example, multiple tasks, shown generally as 40, performed by different agents of the bank 4 in series or in parallel (i.e., workflow). By definition, multiple sessions 30 are required throughout the completion of the process to achieve resolution of the initial intent 10 or 18. Since, by definition, a consultative session 26 entails numerous sessions 30, a single consultative session can be referred to as a fulfillment cycle.

An ability to offer both transactional sessions 24 and consultative sessions 26 to a customer 2 without the "brick and mortar" of physical branches is the essence of non-proximate banking for an embodiment of the present invention. Typically, providing a customer 2 with access to products and services 8 of the bank 4 through the use of electronic commerce interfaces is a complex challenge, and the ability to elicit enthusiasm from the customer in the process requires careful analysis, planning, design, construction, and testing. Transactional sessions 24 have as a key value the ability to provide valid information efficiently, easily, repeatedly, and cost effectively. On the other hand, consultative sessions 26 have an additional pivotal value, which is the value of the expertise that is delivered. Expertise places efficiency and cost effectiveness within a new context. Consultative sessions 26 require considerably more information about session context (past, present, and future), the customer 2, the intent 18 of the bank 4 for the customer, and the like.

In a consultative session 26 for an embodiment of the present invention, it important to know who the customer 2 is, how the customer likes to interact, how the customer builds trust (relationship-based and/or empirical-based), what the existing relationship is like in terms of breadth, potential, visceral, and the like, and what information the customer has shared that must frame all others. It is critical that the intentions and expectations 10 of the customer 2 are monitored and that those intentions and expectations are not lost across sessions 30 and time. In an embodiment of the present invention, this is accomplished, for example, through a context assessment engine, which is described elsewhere herein in greater detail.

Also, in a consultative session 26 for an embodiment of the present invention, it is critical to understand where in the fulfillment cycle a particular session fails, what has preceded, what are the expectations for this session and the next, what has been communicated, and the responses. Continuity management is central to session context. Session context also entails the mechanisms whereby the bank 4 creates relationships in an environment that is inherently anonymous. No matter whether sessions 30 are established by the customer 2 or the bank 4, it is critical to understand that the value point of a consultative session 26 is the nexus of the customer's intent 10 and the bank's intent 18. This nexus is unique to a consultative session 26, because the value being provided is expertise.

Figure 6:
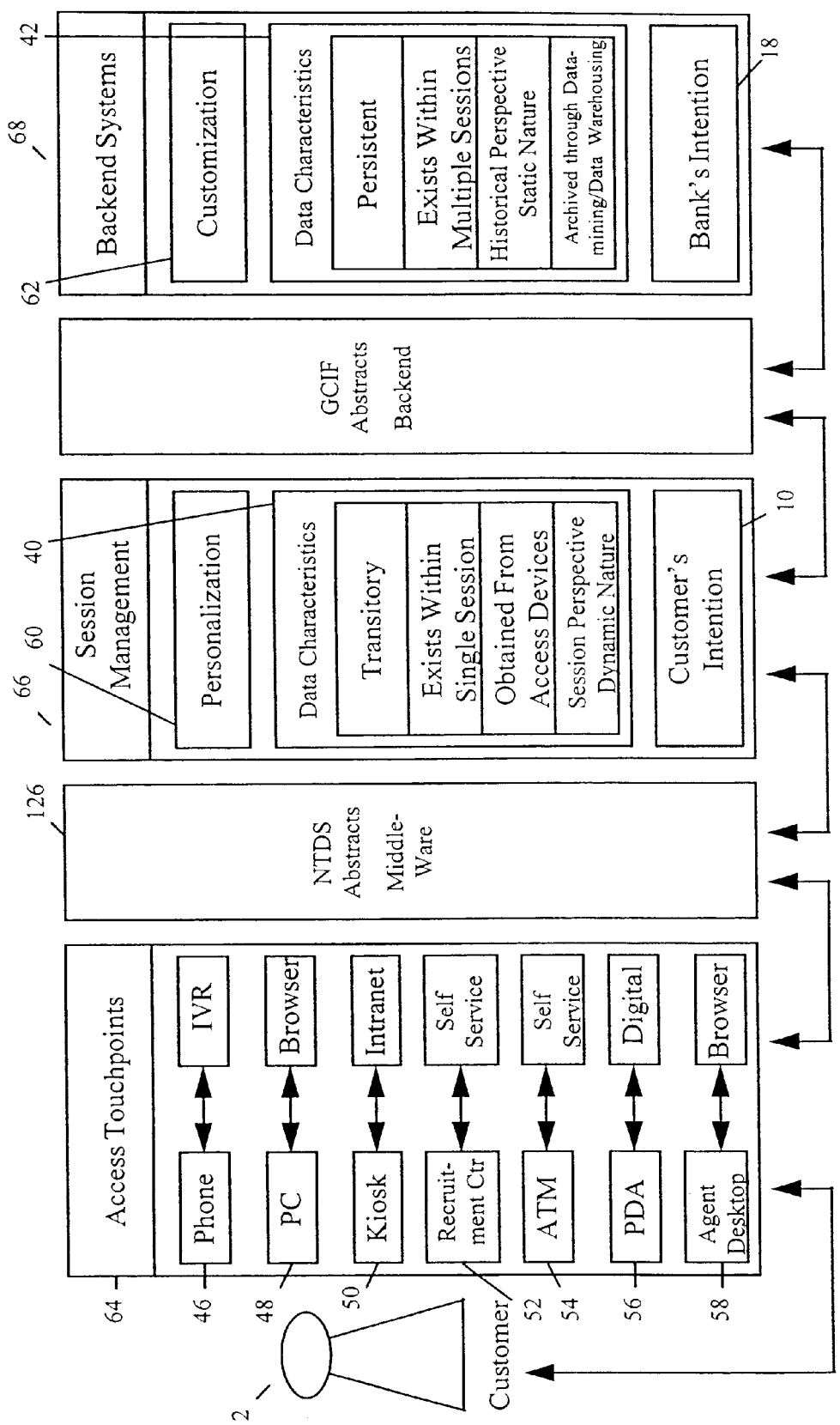
FIG. 6 is a diagram which illustrates a sample tripartite model of access, session management, and persistent data systems for an embodiment of the present invention.

FIG. 6 is a diagram which illustrates a sample tripartite model of access, session management, and persistent data systems for an embodiment of the present invention. Referring to FIG. 6, dynamic data, shown generally as 40, encompasses the personal, financial, and behavioral information of the customer 2, while including complete regulatory information, as well as current details on the product and/or service offerings 8 of the bank 4. The personal data changes as the behavior of the customer 2 changes. This behavioral data is the most volatile and most examined by the system for an embodiment of the present invention. The services and products 8 of the bank 4 also change from time to time as business conditions warrant.

Figure 7:
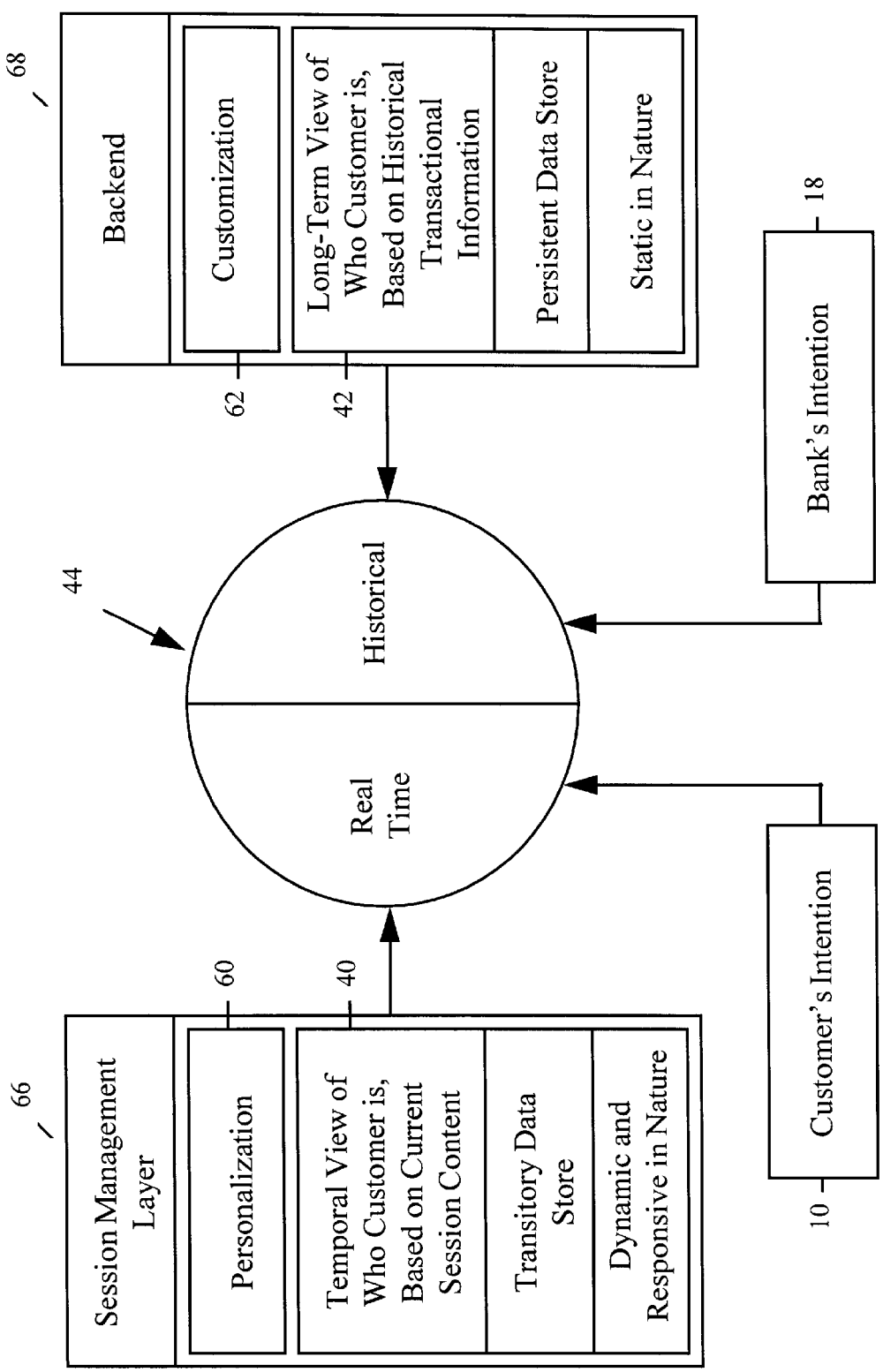
FIG. 7 is a diagram which illustrates an example of the information topography of a customer's token for an embodiment of the present invention.

FIG. 7 is a diagram which illustrates an example of the information topography of a customer's token for an embodiment of the present invention. The combination of the products and services 8 of the bank 4, along with the unique personal and behavioral data of the customer 2 comprise what is referred to herein as the customer's token, shown generally as 44 in FIG. 7. An aspect of an embodiment of the present invention includes use of information that is referred to as token data 40, 42. Token data 40, 42 is a capture, or building, of a database regarding the financial essence of the customer 2. The financial essence of the customer 2 includes, for example, a determination of the customer's assets and tracking how the customer interacts with service offerings.

This extracted token data 40, 42 for an embodiment of the present invention includes, for example, how the customer 2 is paid and the customer's willingness to do things, which is referred to herein as the modus operandi of the customer. For example, some customers are very conservative, some are very aggressive, some have aptitudes for certain financial options, some have time, and some need to be hand-held. The system and method for an embodiment of the present invention allows a financial institution, such as the bank 4, to formulate an impression—an analysis of the token 44—using computer encapsulation of the perception that the system forms of the customer 2.

An embodiment of the present involves the use of a computer such that, in a sense, it mimics a person that is meeting the customer 2 face-to-face. The computer forms an opinion or impression of the customer 2 in the same manner as a person who interacts with the customer. The opinion formed may be unfair or incorrect initially, but it becomes modified over time, as the customer 2 interacts with the system for an embodiment of the present invention. This opinion forming and modification is the concept of the token 44—the encapsulation of opinion. Even if the customer 2 refuses to interact with the system, it results in the formation of an opinion—the refusal to interact tells the system something about the customer.

Another aspect of an embodiment of the present invention is the use of a token universal concept. This aspect of the system allows the system to gather information and perform certain options regardless of the access point of the customer 2 within the system. The system performs whether the customer 2 is at home, regardless of location of the customer's home address, and whether the customer is abroad on business and accesses, for example, a call center number. If, hypothetically, the customer 2 is a U.S. citizen traveling, for example, in Europe when the customer accesses the system, the system automatically determines from the customer's personal identification that the customer's token data 40, 42 is located somewhere in the United States and is able to locate the data, extract it, and transfer the data to Europe for further processing.

Thus, an aspect of an embodiment of the present invention is the token universal concept that allows the look and feel of the system to be the same regardless of where the customer 2 accesses the system and regardless of the method the customer uses to access the system. Referring further to FIG. 6, access to the system by the customer 2 includes, for example, phone/interactive voice response (IVR) 46, personal computer (PC)/browser 48 over a network, such as the internet, kiosk/intranet 50, recruitment center/self service 52, automated teller machine (ATM)/self service 54, personal digital assistant (PDA)/digital 56, or an agent at a desktop/browser 58, or access can be by customer access terminal (CAT) or any other device within the bank's system.

Another element of the system for an embodiment of the present invention is tailoring of the way the bank 4 presents the information to the customer 2. The system can, for example, present information to the customer 2 through a letter, or the system may determine that it can more effectively present the data, for example, through IVR using a high or low decibel male voice, or a female voice, or other approach that appeals to the particular customer. This level of variation in the system further dynamically increases the effectiveness of the sales process.

The token structure, function, and role for an embodiment of the present invention represent a new approach to enabling cost effective, customer-centric delivery of fulfillment 16. A high level overview of the data topography necessary to achieve this approach entails a major change from traditional transactional sessions. The data topography associated with traditional transactional sessions assumed a bifurcated universe composed of access devices and backend systems. Referring to FIGS. 6 and 7, the topography necessary to support customization 60 and personalization 62, as well as consultative 24 and transactional 26 sessions, for an embodiment of the present invention relies on a tripartite model including, for example, access 64, session management 66 and persistent data systems 68.

Referring further to FIGS. 6 and 7, once the topography for the tripartite model for an embodiment of the present invention has been defined, it is important to clarify the characteristics of access 64, session management 66, and persistent data systems 68 and the data within them. For example, the persistent data system (store) 68 is the place in which customization 62 occurs. Customization 62 assumes that data persists and can be culled to support marketing initiatives, product decisions, and the like. Therefore, customization 62 is a process of segmentation into classes that can direct the behavior of the bank 4. Thus, the data 42 within persistent data systems 68 is historical in nature and can be used to infer actions for the future. All data 40, for example, from access 64 and session management 66 finds its ultimate resting place within persistent data stores 68.

Referring further to FIGS. 6 and 7, session management 66 is, for example, the arena of personalization 60. The data 40 within session management 66 is transitory in nature and does not persist as archival data within session management. The majority of the data 40 within session management 66 exists here only for the duration of a session. Session management 66 receives data input from both the persistent 68 and the access 64 arenas and uses that data to determine resource and application decisions.

Referring further to FIG. 7, the concept of the token 44 represents a construct that is capable of being infused with information from the access system 64 and the persistent system 68. The token 44 is an individualized container that has structure, but no content until such time as a session is established. With the establishment of the session and the identification of the customer 2 the token 44 is infused with data. The token 44 is thus the mechanism for determining proper interaction with the customer 2. To accomplish the fulfillment objectives of the customer 2 and the bank 4, the token 44 brings together the customer's intentions 10 and the bank's intentions 18 (personalization 60 and customization 62, respectively). The customer token 44 balances both to ensure that the needs of the customer 2 and the bank 4 are fulfilled. The token 44 represents a construct that is capable of being infused with information from the access points 64 and the backend systems 68 and can control, for example, session flow, applications, and resources.

Figure 8:
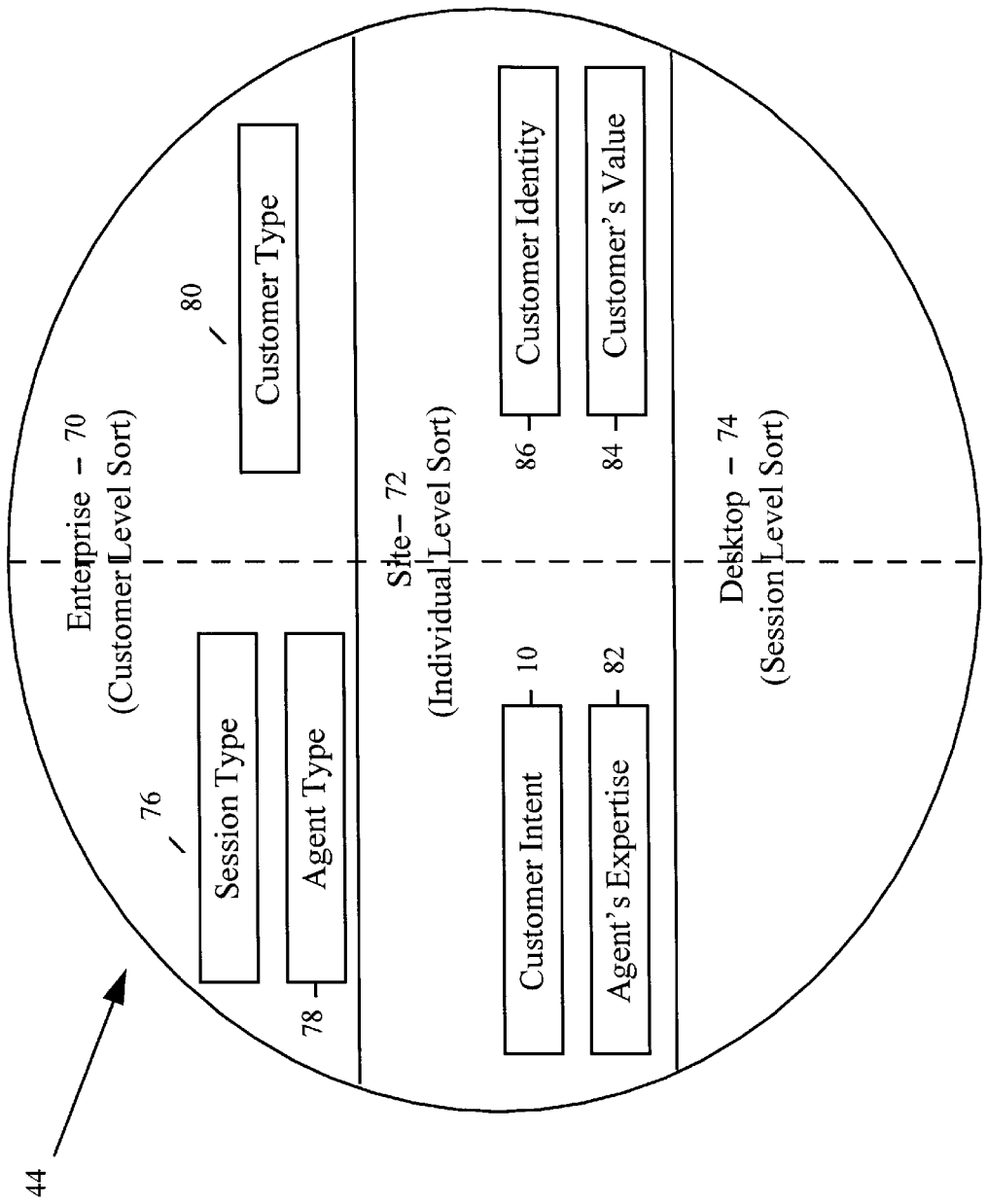
FIG. 8 is a diagram which illustrates an example of the topography of token outputs for an embodiment of the present invention.

FIG. 8 is a diagram which illustrates an example of the topography of token outputs for an embodiment of the present invention. Referring to FIGS. 7 and 8, each customer 2 is assigned a personal token 44. This token 44 provides a vehicle by which personalized 60 and customized 62 services can be delivered in a consistent and complete manner. The token 44 contains data 40, 42 that is made available to different components of the customer service infrastructure. This is used by the subsystems which derive and deliver a unique and customized presentation layer to the customer regardless of the touchpoint. In addition, the data 40, 42 contained in the customer token 44 for an embodiment of the present invention is used to derive an approach in dealing with the customer 2 that is unique to the particular customer as described in the token. For example, this may result in recommending specific products and/or services 8, as well as specific suggestions presented through consulting sessions 26 initiated by the system of the bank 4, the customer 2, or during a normal interaction between the customer and the bank's system.

To achieve this, there is an embedded intelligence in the system for an embodiment of the present invention. The embedded intelligence logic uses the data as its working material and its inherent embedded logic. The token 44 gets its data from access 64 and persistent data 68 systems. Once the token 44 gets its data it is stored in the token for the duration of the session, within three different segments in the token. Referring to FIG. 8, the three segments are vertically divided into the enterprise 70, site 72, and touchpoint (desktop) 74 segments. These segments represent data areas that are used by the servicing infrastructure as the customer session progresses from initial contact to interactions with applications and/or people. The specific topography of the token 44 enables efficiency in processing.

In an embodiment of the present invention, enterprise data 70 in the token is used to balance the work at the enterprise level and ensure that the customer 2 is routed to the appropriate agent based upon session 76, agent 78, and customer 80 types, an advantage of which is to optimally match customer intents 10 with available resources to balance the workload. Site level data 72 is used to manage the intent 10 of the session, direct the call to the appropriate representative 82 (i.e., the best skill set to satisfy the customer intents), rate the value of the customer 84, and identify the customer characteristics 86. Touchpoint (desktop) 72 level data is used by the workstation and/or touchpoints to provide personalized presentation. The desktop presentation and/or touchpoint 72 software and scripts assist a customer service representative (CSR) of the bank 4 and the customer 2 to provide individualized service to the customer. Preferably, the logic for an embodiment of the present invention is easily modifiable, and likewise preferably, it is run-executable software rather than compile-executable software.

Figure 9:
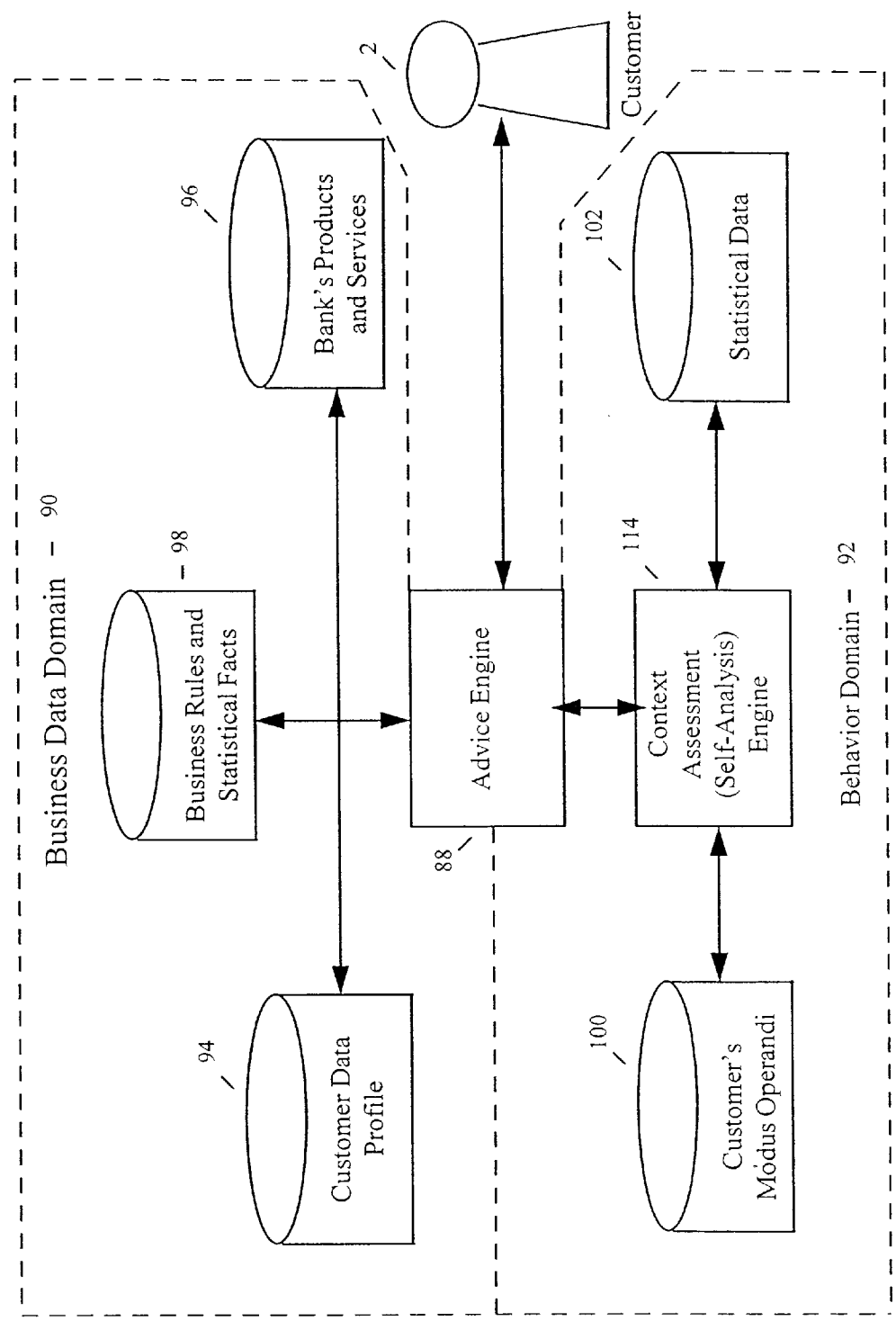
FIG. 9 is a diagram which illustrates an example of the process of merging behavior data with financial data for an embodiment of the present invention.

FIG. 9 is a diagram which illustrates an example of the process of merging behavior data with financial data for an embodiment of the present invention. The components for an embodiment of the present invention include, for example, an advice engine 88, which is primarily composed of software. The advice engine 88 considers numerous sets of system logic, including such things as legal constraints and statistical facts that affect the customer 2. For example, a customer 2 who is sixty-eight years old is not likely to invest in an IRA, or it may be shown statistically that only 2 percent of customers in the population group from age 65 to 70 years invest in or open an IRA account. Another example of system logic for an embodiment of the present invention is that if the customer 2 is less than 18 years old, the law may not allow the customer to perform certain financial acts. Another example is that in a particular country, regardless of the who the customer is, the customer cannot do certain things. The present invention thus uses built-in limitations that are known, such as U.S. federal, individual state, or individual country requirements. The token 44 for an embodiment of the present invention is a routable entity that allows the applications and systems for an embodiment of the present invention to make decisions on various aspects, such as agent skills, method of interaction (automated or assisted service) with the customer 2, and the like, and it triggers the decisions by the systems. The token 44 interfaces various applications and systems and influences the decisions, but primarily functions as a routable entity between applications and ultimately routes the customer 2. The token 44 manages sessions with a customer 2 and makes decisions on issues, such as what is involved, when it goes, and the like.

Referring further to FIG. 9, an embodiment of the present invention makes use of a fundamental concept that lies in the merging of two seemingly distinct data domains, namely, the business data domain 90 and the behavior domain 92. The business data domain 90 contains data stores such as the customer's profile data 94, the bank's products and/or services data 96, and the statistics data 98. The behavior data 92 captures, for example, a customer's interaction mode with the system and manner in which the customer handles financial matters 100 and statistical data 102. These two data domains are merged through two main engines, including the advice engine 88, as well as a context assessment engine 114, described elsewhere herein in greater detail.

The system and method for an embodiment of the present invention includes a number of functional aspects. For example, the system accommodates a flexible, changing product line and substantial growth in the customer base. The system also services the customer 2 in any country, capturing any unique cultural or regional traits that may influence an individual's financial practices. The system also captures the financial goals of the customer 2 and guides the customer through embedded advice. While doing this, the system for an embodiment of the present invention is designed to function on a dynamic basis, recognizing that the financial needs and situation of the customer 2 are changing, as are the bank's products and services 8. The system also updates new products and services easily within the system, effects self-assessment of system logic engines on a universal basis and an individual basis, and modifies the system's logic engines externally by an administrative team.

Other functional aspects of the system and method for an embodiment of the present invention include, for example, offering the entire bank's products and services 8, providing self-initiated advice 7 to the customer 2, and affording access from anywhere in the world, from any device and over any distribution media. In addition, the system provides an interface to all and any available touchpoint modes 64, includes an architectural design that scales, and ensures continuous service through high availability of system hardware, software, and operating systems. Further, the system for an embodiment of the present invention captures the financial behavior of the customer 2 and capitalizes on this information to provide advice 3, reflects the customer's likes and behavioral patterns and the services to which the customer is most likely to subscribe, within a presentation layer, and insures delivery of transactions by guaranteed message delivery, recordability and restartability.

An additional functional aspect of the system for an embodiment of the present invention is, for example, to create service options that are reflective of bank 4 and customer 2 relationships to ensure cost effective service delivery that is customizable and builds in a learning capability, so that through self-assessment and built-in criteria for success, the system can improve its advice content and modes of interaction with the customer. Further functional aspects of the system for an embodiment of the present invention include, for example, triggering the advice capability in the system during an interaction 5 by the customer 2 with the system and initiating system contact with the customer (proactive service) 7 through means such as e-mall, voice messaging, and even sending a letter. Such an action is triggered by the advice capability of the system to alert the customer 2 to products/services 8 of the bank 4 or even critical dates that the customer may find beneficial.

An embodiment of the present invention provides a way for the bank 4 to satisfy the customer 2, for example, by furnishing the ability to provide efficient and easy transaction capabilities 24 along with consultative services 26 that are value rich and non-intrusive. The system presents information to the customer 2 in a way that customer's temperament, needs, and ease of use and provides the customer with the ability to access the system any time and anywhere. The system also encourages customers to deepen their relationship with the bank 4 via repeated demonstration of value in support of the customer's financial needs.

Figure 10:
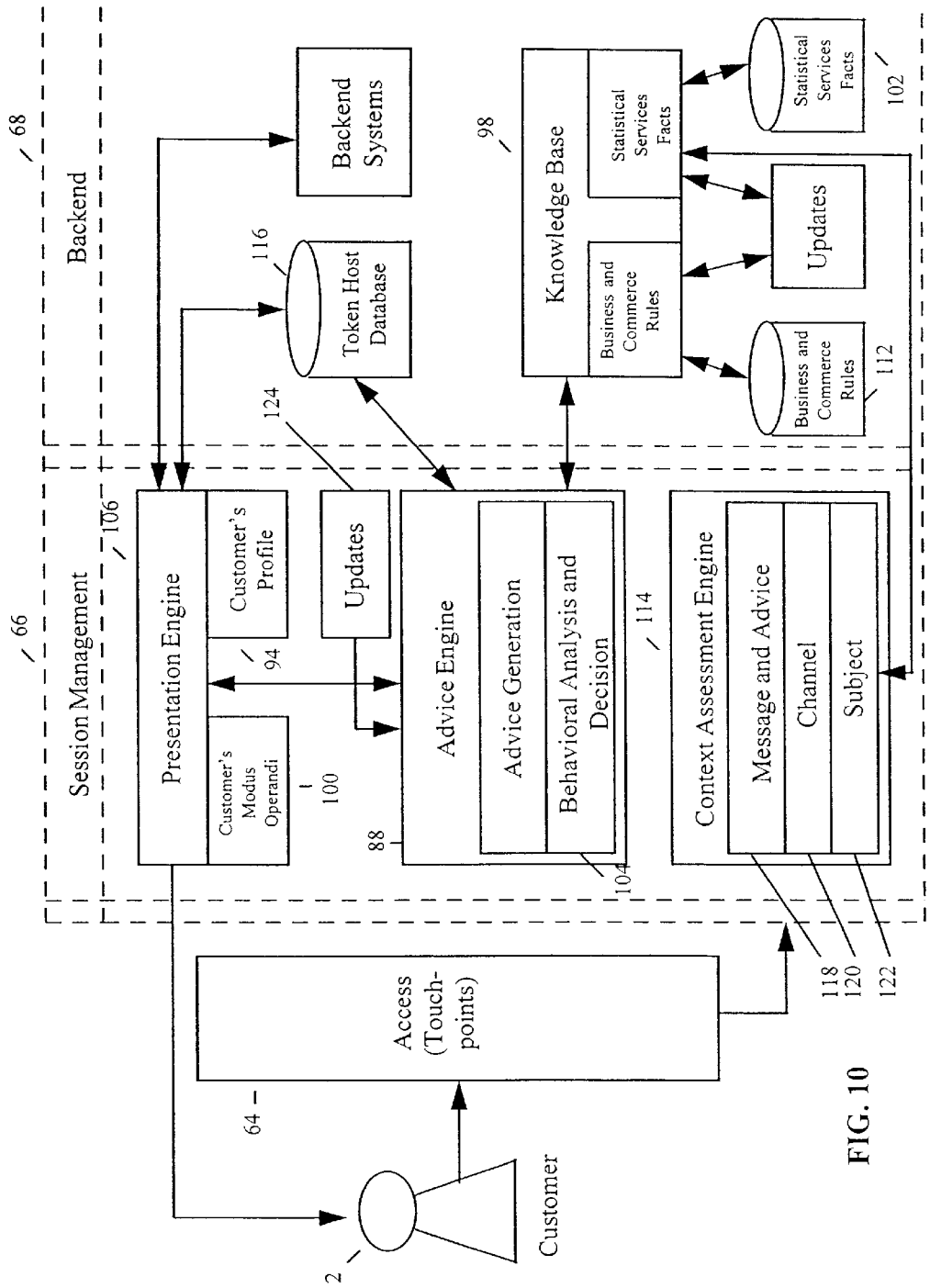
FIG. 10 is a schematic flow chart which shows key components and the flow of information between the key components of the token model for an embodiment of the present invention.

FIG. 10 is a schematic flow chart which shows key components and the flow of information between the key components of the token model for an embodiment of the present invention. Referring to FIGS. 9 and 10, the key components include various data stores and logic engines, such as the advice engine 88, the customer's behavior analysis (behavior database) 104, a user interface processor 106, self analysis 114, customer's profile 94, business and commerce rules 112, and statistical and services facts 102. The data stores and logic engines do not necessarily reside on distinct physical processors, but rather, they represent unique and distinct functions.

To realize the functional capabilities for an embodiment of the present invention, the system has the ability to analyze data, and to make intelligent decisions on a changing basis. This is a capability which, for example, distinguishes the system for an embodiment of the present invention from all others currently in use by financial and investment institutions. The system for an embodiment of the present invention provides an intelligent engine which provides these capabilities. The logic engine supports all of the services provided, for example, by the bank 4.

Referring further to FIG. 6, in an embodiment of the present invention, the system includes high level operating functions, such as access (touchpoints) 64. The system supports any and all touchpoints 64 from anywhere. For example, the customer 2 accesses the bank 4 through the Internet at a PC 48 or a video kiosk 50, by calling a call center 58, or via an ATM 54. Further, the customer 2 accesses the bank 4 through any of the foregoing means, from within the U.S. or from a foreign country, and the customer who is a citizen from any country can access the bank through any touchpoint 64.

In order to succeed in a highly competitive environment, the bank 4 must take initiative to proactively provide advice 3 and information to the customer 2. From the point of view of the customer 2, the customer has a simple option to take the initiative to ensure that the customer's financial interests are being met. In other words, the customer 2 can simply vote with the customer's feet and go to another bank, if the customer's financial needs are not being met. On the other hand, deepening the relationship with the customer 2, knowing the customer's goals, and helping the customer meet the customer's goals ensures customer retention.

The system for an embodiment of the present invention provides high level functionality, such as taking initiative and initiating contact with the customer 2, referred to as a proactive session, and providing transactional 24 or consultative 26 service to the customer during a session that the customer initiates, which is referred to as a responsive session. To evaluate the success of initiatives, such as proactive sessions and responsive sessions, a context assessment engine 114 is provided to actively review the results of customer initiated contacts and bank initiated contacts.

Referring further to FIGS. 9 and 10, in an embodiment of the present invention, the context assessment engine 114 examines the context of the interaction with the customer 2 and determines how effective the system's advice is. The context assessment engine 114 also includes a more objective evaluation. For example, after the system completes an advice session, the context assessment engine 114 examines a preselected number of previous sessions in order to determine how effective the system has been. If the system has not been effective, then the system determines that the token data 40, 42 is incorrect. The token data 40, 42 is produced by the token software process, which extracts data from the various databases in the system.

The ability to differentiate the products and services 8 of the bank 4 in an environment of increasing anonymity is an important metric of the success of the system for an embodiment of the present invention. This is accomplished through understanding the context in which the customer 2 interacts with the bank 4. In order to put an interaction in context, data is kept on the past interactions, the present interaction or intent 10, and inferred future interactions or goals for the particular customer 2 or group of customers.

To measure the success of relationship building in the consultative model 26, an embodiment of the present invention includes the context assessment engine 114 that measures the impact of the interaction on the customer 2 in terms, for example, of whether the products and services 8 that are recommended are being purchased and the impact of the content that was delivered to the customer on the customer's decision. At stake are what products and services 8 were recommended and/or consumed by the customer 2, the means by which they were delivered and presented to the customer, and to whom they were delivered. In short, the context assessment engine 114 examines and regulates the content of the advice, the process by which the advice is delivered, and the object or recipient of the advice 3.

In an embodiment of the present invention, the context assessment engine 114 constantly evaluates the effectiveness or impact of the content (the what) that was delivered, the process (the how) by which the advice 3 was delivered, and the object (to whom) such advice was issued. If needed, the context assessment engine 114 modifies either or all of these parameters in its directed assessment. The context assessment engine 114 provides the context of the ongoing relationship with the customer 2. This is a critical function in ensuring the overall success of the customization 62 and personalization 60 system for an embodiment of the present invention. Briefly, the context assessment engine 114 examines the results of the advice 3 given to the customer 2 in both responsive and proactive sessions.

In an embodiment of the present invention, the intent of the analysis by the context assessment engine 114 is to explicate what advice 3 has been given, accepted and considered. Another function of the analysis is to correlate customer information with session information to ensure the highest degree of success as measured by sales, continued interactions, and the like. The analysis is conducted after the preceding session is completed. The context assessment engine 114 looks at the result of the current session and also looks at the results, for example, of the previous two sessions. More sessions can be stored and their data points used if required. The results of the analysis of the context assessment engine 114 are used to update the content of the customer's token 44. It is this content that guides the advice engine 88 through the steps of generating advice and the content of the advice 3. Thus, if the advice 3 does not benefit the customer 2, the context assessment engine 114 modifies, for example, the content, process, and object of the token 44.

The initiative portion of the advice engine 88 for an embodiment of the present invention is provided with its own built-in, self-appraisal system. The self-appraisal and assessment capability looks into the session's results responsively. After completion of the existing session, and including a predetermined number of past sessions, the number of which is an adjustable system parameter, the system for an embodiment of the present invention attempts corrective action to determine its own effectiveness. To perform the context assessment, a history file is maintained that summarizes in a structured data format the results of the advice 3 whether executed during a responsive session or a session initiated by the bank 4.

The system for an embodiment of the present invention, for example, interacts with the customer 2 through all possible means, tailors the interaction with the customer to the customer's financial needs, operates within all applicable U.S. (federal and state) laws, and complies with a foreign country's financial regulations, if invoked outside the U.S. In addition, the system knows about all the products and services 8 that the bank 4 offers, generates advice 3 to the customer interactively or off line, and constantly improves the advice by performing context assessment. The foregoing captures the functional behavior of the system from the perspective of the customer 2. The customer 2 experiences a system that is responsive, meets the customer's personal, behavioral, business, and financial needs. From the point-of-view of the bank 4, the system proves its value added contribution by providing a higher customer retention ratio and enhanced sales of the bank's products and services 8.

The system for an embodiment of the present invention includes a number of major functional areas, such as presentation and interaction with the customer 2, logic engines, and the token process. With respect to the presentation layer and the interaction with the customer 2, the system includes, for example, a presentation engine 106. The presentation engine 106 varies the presentation of the system depending on the mode by which the customer 2 accesses the system. Regardless of the mode of access, the presentation engine 106 presents the system to the customer 2 in an individualized manner. For example, the system may construct slightly different webpages for presentation to different customers.

A further aspect of the manner in which the information is presented for an embodiment of the present invention depends on the token 44 of the customer 2. For example, if the customer 2 has millions of dollars in accounts with the bank 4, the customer may be presented with more features than a customer with only a few thousand dollars in assets. The presentation engine 106 is geared for presentation, including how to present information to the particular customer 2, such as what voice to play, and even volume. As another example, for an Internet webpage, the presentation engine 106 can vary the color of the background for different customers.

The presentation engine 106 is responsible for the on-line and off-line advice presentation and communication of the bank's intent 18 to the customer 2. It also makes necessary judgments if a piece of advice 3 is appropriate for a specific one of touchpoints 64. Since alerts are part of advice 3, it may be more appropriate to notify the customer 2 with a phone call or pager, rather than with a customer preferred e-mail message if, for example, the customer's favorite stock is declining rapidly. In addition, the presentation engine 106 is responsible for the format of the message via one of the touchpoints 64. For example, format information includes not only the customized page format for worldwide web or the voice and entry point of the interactive voice response (IVR) customer, but it also includes the customer's preferences and habitual behavioral information from the customer profile 94.

The system for an embodiment of the present invention meshes behavioral data collected by analyzing the manner in which the customer 2 handles the customer's financial affairs and couples it with overall statistical data to generate a strategy by which the customer is approached for the expansion of the customer's involvement with the products and/or services 8 of the bank 4. The software manifestation of the customer's financial information and behavioral data is referred to as the customer's token 44. The token 44 is used to deliver the most appropriate option or options in the bank's spectrum of products and services 8 so that specific advice 3 that has been developed is presented to the customer 2. The advice 3 is presented in one of several contexts, such as a proactive session, a responsive session, or a bank-initiated proactive session.

In an embodiment of the present invention, proactive sessions are generated by the system based on information stored in the customer's token 44. Various proactive channels, such as electronic mail, paper mail, voice and/or data phone calls, request the customer token 44. These processes "wake up" based upon business parameters, read the appropriate token information, wake up and initiate contact to the customer 44. The advice 3 that the process generates is transmitted by one of a number of channels, such as a letter sent via the US mail or Priority Mail, an electronic mail message, or a voice call, with a message left on an answering machine, if no response was received.

The system for an embodiment of the present invention prepares tokens 44 with advice tags that are based on the token data structure, an examination of the bank's data daily, or weekly market conditions information and other triggers, and generates the advice content. The system makes a decision based on the content of the token structure 44, which also instructs the process on the method by which it issues the advice 3. The advice 3 issued, when it is self-initiated by the system, may be different than advice 3 issued during an interactive session with the customer 2.

The types of self-initiated advice 7 include, for example, stock market breaking news, political breaking news that may have potential financial implication, breaking financial news in the other parts of the globe that may be occurring while people in the U.S. are asleep, reminders of major events that most people would not want to miss, such as a tax filing date, birthdays, secretary's day, and the like, due bills, suggestions to buy or sell a fast moving stock, and alerts on stock volume and price fluctuations. The foregoing relates, for example, to a one-way initiated proactive session in which the system composes date and/or event driven advice 3 to the customer 2.

Another form of consultative session 26 for an embodiment of the present invention is one in which the customer 2 accesses the system to seek information and possibly advice 3. For example, the customer 2 accesses the system from any place worldwide via any supported touchpoint 64 and requests to interact with the bank 4. Authentication is achieved via a unique customer identifier and password. The unique customer identifier, assigned by the system, uniquely identifies the country code and the token server 116 that serves the particular customer 2. The database 116 contains the token data 40, 42 for the particular customer 2. The country code is also a trigger to the software system for an embodiment of the present invention to determine the transport access method needed to access the host token database 116 for the customer identifier entered.

From this point forward, the scenario of the session for an embodiment of the present invention is somewhat dependent on the touchpoint 64. If the touchpoint 64 is of the electronic variety, then there is no distance impact whatsoever. The remote system acts as an agent to the local system 116 that hosts the customer's token 44. In this sense, the customer communicator or presentation engine 106 acts as the transport agent receiving and sending data to the local host 116. If the customer is using voice touchpoint, such as an IVR 46, then the same special treatments are designed to manage the cost of telecommunications, especially of the customer 2, as making an international call.

The token server 116 for an embodiment of the present invention populates the customer token 44 with customer-centric data and passes it to the customer 2 through the customer communicator or presentation engine 106. If a customer service representative (CSR) is involved, a copy of the token 44 is replicated to both parties. Typically, the customer 2 has some reaction to the information presented by the token 44 (no reaction is interpreted as a negative reaction) and submits some request for action. This request is carried out either within the current session, or initiates a complex transaction, which continues after the responsive session ends. In either case, the result of the session and all associated transactions are recorded. Even independent and completed steps of complex transactions are independently recorded, to be presented to the customer 2 any time the customer initiates the contact with the system again. The system actions are designed to stimulate the customer's fulfillment and satisfaction with the system and therefore with the bank 4 itself. This process can be interfaced with the workflow engines to structure the fulfillment of the request in both self-assisted and assisted modes. By tying the advice engine with the workflow engine, this system also determines the specific steps that need to be taken to fulfill the request (in assisted or self-service modes).

Based on similar past (historical) sessions, the system and method for an embodiment of the present invention places the bank 4 into a position, for example, of predictability of the future needs of the customer 2, which goes hand-in-hand with the bank's desire to sell services. The prognosis of customer needs 6 and intent 10 matched with the banks services and products 8 provides a foundation for the bank's intent 18. Such precise market targeting, for example, minimizes the money spent on advertising and provides further market penetration. This facilitates the process of building customer loyalty for a lifetime. The bank's intent 18 is pre-packaged for individual customer needs and is presented at the opportune time.

In an embodiment of the present invention, the system allows universal access. The universal access capability is built into the backbone system on which the knowledge-based system 98 for an embodiment of the present invention is built. For example, the system for an embodiment of the present invention is the main data input stream to the customer's and the agent's working data, as well as the recipient of responses from both. Responses are in the form of requests for information supplied by the customer 2 or directly entered by the customer. The input data, along with the customer token data 40, 42 is used to generate the appropriate responses.

In an embodiment of the present invention, the manner in which such an interaction is built and introduced into production can be gradual, if desired in order to allow, for example, learning from the system's usage. The nature of the advice engine 88 and the context assessment engines 114 is such that the mode of responses received from customers and the type and spectrum of such responses and questions dictates and expands the scope of these engines' logic. In a manner similar to the universal access described in the preceding paragraph, the system is as touchpoint independent as the backbone on which it is built is.

The context assessment engine 114 for an embodiment of the present invention is an efficiency tuner for the system as a whole and depends on objects, such as message and advice assessment, channel assessment, and subject assessment, for its functionality. For example, a message assessment engine 118 decides how effective the marketing message or advice 3 is. The effectiveness of the message or advice 3 is dependent on many factors. The obvious ones include, for example, how many people actually followed the advice 3 as opposed to disregarding it, how profitable the advice was for the bank 4, how well the advice and /or marketing message was matched to the individual (right advice for wrong individual), and how effective the advice was for the customer 2. Matching advice 3 and/or marketing messages with the individual is measured by comparing the most recent piece of advice 3, and whether or not it was taken, against previous pieces of advice and whether or not they were taken. The number of previous pieces of advice 3 are predetermined.

In an embodiment of the present invention, each advice 3 and/or marketing message comes into the assessment engine 114 with an expectation performance matrix associated with it. That matrix comes from the marketing or advice engine 88, which generated the advice 3 or marketing message. Since the marketing message may have a shelf life of a relatively long period of time, the effectiveness is calculated based on the speed of market penetration, such as how many customers were presented the message or advice 3 during a fixed a period of time. Further, different messages have different expected response levels in terms of percentages.

To calculate the profitability of the offering to the bank 4, a formula can be used, such as:

$$Gross\_Profit = Number\_of\_Customers * Profit\_Margin * Amount\_Invested$$

Where:
  Number_of_Customers equals the number of people who reacted positively to the offering;
  Profit_Margin is a constant of the offering derived by the advice/market message engine; and
  Amount_Invested is the amount of money that customers invested in the product.

The variables in the right side of foregoing equation are extracted from the backend banking systems 68, based on the frequency assigned by the advice or market message engine 88. That frequency is typically identical to all products across the board, or else the Gross_Profit is low.

In an embodiment of the present invention, another tuning mechanism for matching the customer 2 to an advice 3 or marketing message is applied only to those messages or pieces of advice, which are deemed generally successful. This is a more refined, more precise mechanism for the self-adjusting of the advice or market message engine 88. Typically, this adjustment is not done for a rejection of one message or piece of advice 3, but for several. Therefore, there are requirements to derive threshold levels of rejection for the customer 2 or a customer segment. Ideally, each customer is placed into a single segment. This threshold level is stored in the customer profile data area 94 or in a segment attributes area. Upon the examination of all messages or pieces of advice 3, the reasons for rejection are produced. These reasons tell whether the customer segmentation is appropriate or not. Based on this determination the message is, for example, aimed at a different segment or eliminated.

An additional level of analysis of the message or piece of advice 3 for an embodiment of the present invention is its effectiveness on the customer 2. This functionality does not lend itself to the evaluation of the direct bank products. It does evaluate the performance of equities, mutual funds, contracts, and the like. It is done by the comparison of other financial vehicles over time. This is accomplished, for example, by extracting information from analytical services and providing the information to the advice or message engine 88 for comparison of the products. The advice or message engine 88 issues an alert, for example, if changes to the portfolio are necessary.

In an embodiment of the present invention, a channel assessment engine 120 determines which messages are poorer performers in one touchpoint, than in the other. By the definition, the messages and advice 3 are already marked to be successful by the message assessment engine 118. The comparison is made between the success rate per touchpoint.

Once significant discrepancy is determined, which in itself leads to a definition of this discrepancy, the message or advice 3 is examined as to why it performs poorly in the medium.

In other words, the advice or message engine 88 for an embodiment of the present invention produces threshold levels not only for the message, but also for the message presentation via a touchpoint. If those thresholds are not met, then the message is examined as to the appropriateness of a touchpoint. An embodiment of the present invention also includes the development of a system of knowledge which provides some metrics to the advice or message engine 88. These metrics determine what message performs better or worse at each specific touchpoint. The introduction of such metrics makes it possible to pinpoint and produce messages or pieces of advice 3 for each particular touchpoint.

The context assessment engine 114 for an embodiment of the present invention also includes a subject assessment portion 122 which is extremely data intensive. An idea behind customization 62 is to create personal advice 3 or messages for each individual. However, it is not feasible to do marketing campaigns directed at one specific individual. Therefore, all customers are segmented for the marketing messages. The number of financial products in the world is limited.

Thus, to a certain degree, the individual advice 3 for an embodiment of the present invention may not be exactly unique. This is where the question of segmentation comes into play. In order to be more precise in giving an advice 3 or a marketing message, customers are segmented. In order to be accurate within segmentation, components can metamorphose from one segment into another, based on their interaction with the system. The great difference is the ability to fluidly assign the customer 2 to a product, or a piece of advice 3 to the customer, based on how the customer reacted to the previous offering.

The context assessment engine 114 for an embodiment of the present invention features a number of functions, inputs, and outputs. The context assessment engine 114 makes certain determinations, such as the percentage of customers who were offered advice and exercised it, how effective is given advice for the particular touchpoint, and how appropriate the advice is for the particular individual. The context assessment engine 114 is a batch type engine which does its work in low priority mode. The context assessment engine 114 is a decision support system (DSS) engine which, if necessary, can be provided with a different database to provide its functionality. After working on advice 3, the context assessment engine 114 updates, for example, rules repository 112, statistical repository 102, and customer advice.

The context assessment engine 114 for an embodiment of the present invention determines general applicability for an advice 3, for example, by collecting all responses to an advice, grouping them by individual advice, totaling positive and negative responses based on group, and comparing negative responses to the minimum useful standard for advice. Advice 3 falling below an acceptable minimum is dropped from the product table and sent as a report to marketing for analysis.

Further, the context assessment engine 114 for an embodiment of the present invention groups customers within individual pieces of advice 3 by touchpoint, totals positive responses based on each group by touchpoint, determines whether the same advice draws statistically different responses by touchpoint, and compares the results with the statistical database 102, if touchpoint negative response falls within acceptable limits for a touchpoint. Likewise, advice 3 failing below an acceptable minimum established in the statistical database 102 is dropped from use by the touchpoint.

In an embodiment of the present invention, the context assessment engine 114 determines general applicability of an advice 3 to an individual, for example, by collecting all negative responses to advice 3 for a single individual, determining that those pieces of advice do not belong to the two groups described in the foregoing paragraph, determining a risk level of the advice 3 based on the customer's financial profile 94, comparing the risk level to the risk tolerances to previous customers' activity, downgrading the risk tolerance of an individual in the customer profile 94, if the advice had a risk factor involved, and updating the customer's "life stage" factor in the customer profile 94, if the advice was aimed at a long term goal.

In an embodiment of the present invention, the functionality of the context assessment engine 114 includes, for example, reading input from the advice engine 88, comparing the input with the customer's token 44, assessing the matching of the input from the advice engine 88 with the token 44, updating the token structure 44 with the analysis results. The functions involved in the analysis of results against the token structure 44 include, for example, reading the results data.

In an embodiment of the present invention, the results data must reflect either a decline to an advice 3, or an "ignore," or a "kill" function. If the customer 2 has entered any of these commands, then the advice 3 presented has been dropped and rendered ineffective. Only if the advice 3 is flagged as "delay" will the system attempt the advice at a later time. If the advice 3 has been killed, ignored, or dropped, then the customer's token 44 is updated, showing the results. The update is entered, keyed by date and access mode, as well as duration of interaction with the system, and whether any other advice was sought. The system also flags whether the advice 3 was due to an interactive session or an off-line bank-initiated session.

In an embodiment of the present invention, if the customer's responses to the advice 3 are negative, for example, in the three previous contacts, and if the advice has changed, and the customer's responses are still negative, a questionnaire is sent to the customer 2 requesting direct input on the customer's likes and dislikes. This input request, or a direct call from a call center agent, is initiated only if the customer's total assets are greater than a predefined trigger value.

The context assessment engine 114 for an embodiment of the present invention receives input and reads data from a number of databases and functions, such as the advice engine 88, customer's profile database 94, and customer token data 40, 42. The context assessment engine 114 also sends data to a number of databases and functions, such as the advice engine 88, and the customer token 44.

As previously mentioned, the logic engines in the system for an embodiment of the present invention manipulate the massive amounts of data stored by the system, as well as existing systems of the bank 4. The data collected during a session steers the system from the inception of an interaction to its termination in a way that best meets the customer's goals 8 and the bank's intent 18. This process continues even as the interactive session is concluded through bank-initiated advice. The software that makes up the logic engines for an embodiment of the present invention drives not only these intelligent decision processes, but also improves on its own decision-making process and examines its own decision output as built-in capabilities.

The system for an embodiment of the present invention includes a number of intelligent engines, such as the presentation engine 106, the advice engine 88, and the context assessment engine 114. The flexible software logic embedded in these engines sifts through the data and makes customer-based and unique decisions that determine its interactions with the customer 2. Each of these engines has a logical flow and a manner in which it manipulates and processes data and makes decisions. In addition, the architecture for an embodiment of the present invention includes the token process which performs certain functions. A distinction exists between "software process" and "engine" in describing the system architecture for an embodiment of the present invention. Functions performed by the token process include, for example, transferring data to persistent data stores 42 during and after a session from the customer 2 via the touchpoints 64 and transferring data from persistent data stores during a session to the customer via the touchpoints.

An explanation of the system for an embodiment of the present invention includes, for example, a high level presentation of the customization 62 and personalization 60 system functionality and how the system fits within certain backbone platforms of the bank 2, such as the knowledge center 98 of the bank. Such an explanation also includes, for example, focusing on a more detailed description of the logical function of each engine, addressing the issue of the relationship between software design and the logical functions, as well as describing the optimal software architecture that best captures the functionality of these engines and the high expectation of their performance and responsiveness.

The system architecture for an embodiment of the present invention includes a modular customization 62 and personalization 60 system that is adaptable to virtually any environment in the bank 4 or other financial institution. The system thus fits the needs of other bank systems, as well as the general core needs of the bank 4. To achieve this modularity, all software engines are designed and built as sets of objects. These objects contain methods of operation necessary for the data and metadata. Modularity is also achieved via self-containment and self-independence of each individual object, which is designed to function as a single and independent unit, if needed.

The advice engine 88 for an embodiment of the present invention consists, for example, of major components, such as tools for information and planning (TIP), guidance advice planning (GAP), marketing messages, and an alert engine. TIP is free of charge advice 3 in the form of visual tools and calculators available to members and visitors. Of course, when the distinction is made between members and friends, some types of advice 3 are more valuable than others and are generated based on the bank's knowledge of the customer 2. GAP is paid advice 3 and is partially generated by the system and enhanced or reviewed by a licensed CSR. GAP is a very important component of the system. Alternatively, system software can be provided that competes favorably with a licensed CSR for the quality of the advice.

In an embodiment of the present invention, a marketing message is the bank's intent 18 to sell products and services 8. It promotes services which are applicable to individual users or as close as can be to individual users. Therefore, it relies on the segmentation of the product and the compatibility of each customer with the segment. Additional refinement is provided, since each customer may fit into several segments, and vice versa. Personal traits from the behavioral part of the profile 94 play an important role as to what message really hits home with the customer 2. The alert engine is a current term for artificial intelligence. In reality, this object parses financial news and alerts customers if the news affects the customers' financial welfare. This is a task of matching the alert symbol on the press release with the customer's portfolio. The intelligence comes from the software that realizes, for example, that El-Nino will trigger price changes on the future crop contracts in the customer's portfolio. The intelligence also comes from determining the customer's lifetime value by following certain trends.

In an embodiment of the present invention, the token process performs data exchange for all the middleware 126. This data exchange between middleware 126, knowledge center 98 and backend data stores 68 is performed via a single gateway, namely, the token process. This process controls the data bus, which feeds all three engines and their respective components with requested data, transferring generated information to one of the touchpoints 64 and passing customer behavioral data from the session back to the persistent data stores 68 for permanent residence.

The presentation engine 106 for an embodiment of the present invention is the software utility that makes a decision on how to communicate with the customer 2. This means that it decides on which of the channels 64 and how to communicate within a channel. For example, the customer 2 contacting the bank using an IVR 46, may have a high decibel male voice, or a low decibel female voice, or a voice with a California or Brooklyn accent. The presentation engine 106 makes the decision as to the appropriate form of the response, and the advice engine 88 decides on the actual content of the advice 3.

The presentation engine 106 is a central component of the system for an embodiment of the present invention. It decides how to present advice to the customer 2. Thus, the advice engine 88 decides on the content of how to interact with the customer 2, and the presentation engine 106 decides on the method. Both rely on the token data 40, 42 provided by the token process, and both eventually feed information back to the context assessment engine 114 for the assessment of effectiveness. The presentation engine 106 decides, for example, where to respond to the customer 2, such as which of the touchpoints 64, and how to package the advice 3 and present it to the customer. For example, if an IVR 46 is the means of communication, the presentation engine 106 decides on responding by using a female voice, high decibel male voice, and the like. If the Internet 48 is used, a decision is made on how to paint the screen, what colors, how detailed, and the like. Much of the presentation engine software 106 thus runs executable software or provide the consistent service irrespective of the medium.

Figure 11:
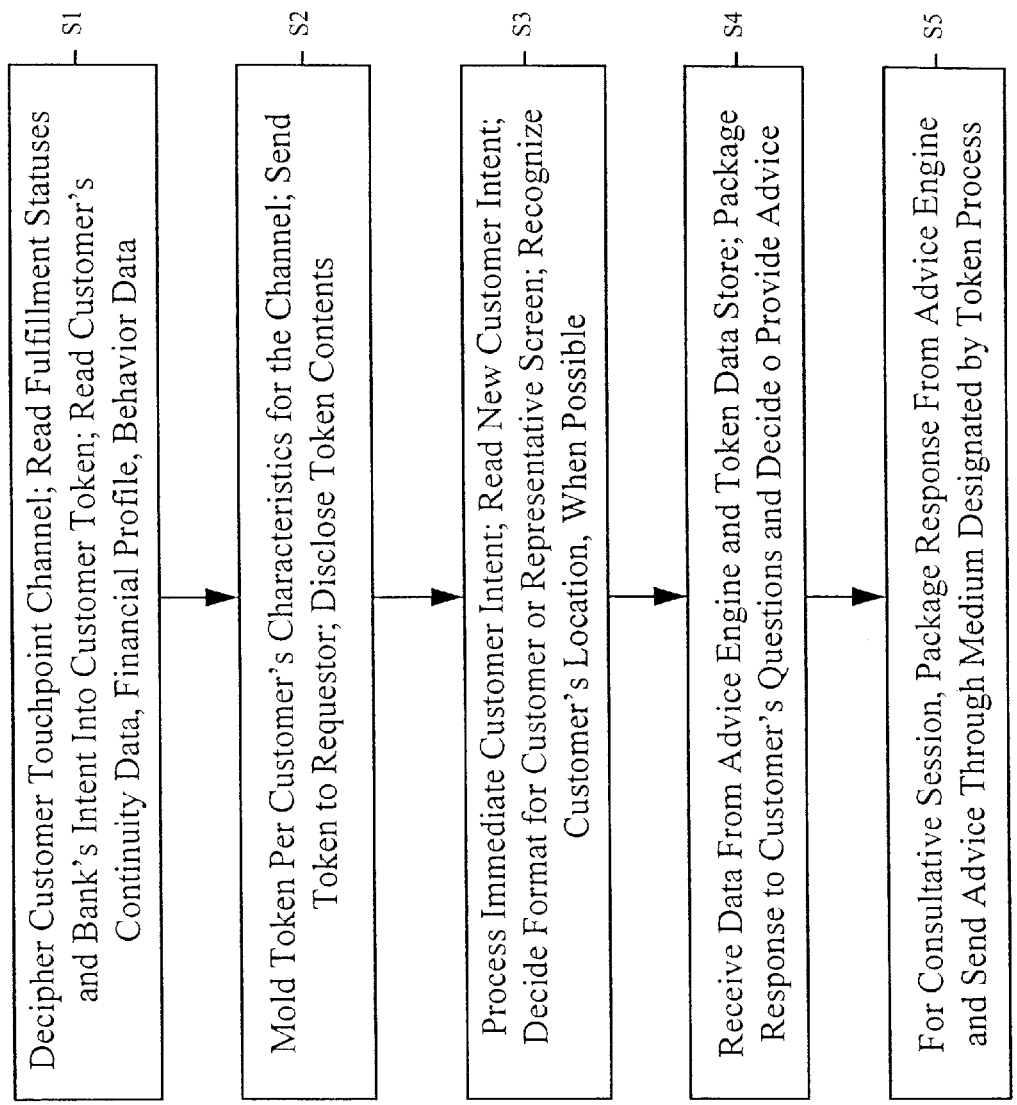
FIG. 11 is a flow chart which illustrates sample presentation engine processes for an embodiment of the present invention.

FIG. 11 is a flow chart which illustrates an example of the presentation engine processes for an embodiment of the present invention. Referring to FIG. 11, at S1, the presentation engine 106 deciphers the customer touchpoint channel, reads fulfillment processes statuses into the customer token 44, reads the bank's intent 18 into the token; reads the customer's continuity data, reads the customer's financial profile, and reads the customer's behavior data. At S2, the presentation engine 106 molds the token 44 per the customer's characteristics for the channel, sends the token to the requestor, and discloses the token content. At S3, the presentation engine 106 processes immediate customer intent 10, reads new customer intent, decides on the format of the screen being painted to the customer 2 and/or CSR and its data content and layout, and recognizes the customer's location when possible.

Referring further to FIG. 11, at S4, the presentation engine receives data from the advice engine 88 and from the token data store 116, packages the response to the customer's questions or inquiries, and decides to provide advice 3. At S5, the presentation engine 106 requests advice 3 from the advice engine 88, receives advice from the advice engine, packages the advice and sends it to the customer 2. For consultative sessions 26, the presentation engine 106 packages responses received from the advice engine 88 and sends the advice 3 through the medium designated by the token process.

The presentation engine 106 for an embodiment of the present invention has at its disposal a text parser, which parses text input provided by the customer 2 into a numerically structured format that can be used by the system in generating responses. The input parser can also reverse the parse, so that it presents numerically structured advice sequence in English prose. If the communication with the customer 2 is through an IVR 46, then the text message is processed through a text-to-speech card.

In an interactive session for an embodiment of the present invention, the presentation engine 106 receives a trigger when the customer 2 accesses the system. The trigger starts when the interface routine sends the basic customer information, which is primarily the customer's identification (ID) password. Upon receipt, the presentation engine 106 sends this information to the token process. The token process then determines the residency location for the customer records, and especially the token data 40, 42.

In an embodiment of the present invention, the presentation engine 106 then sends a message to the host token process 116, and as a result, the token data 40, 42 is sent. The token data 40, 42 is a fixed size data entity. The content obviously varies with the customer 2 but the size is the same. The advice engine 88 also sends a message to a marketing database and retrieves the bank's intent 18. The advice engine 88 eventually requests rules and laws verification after it generates advice 3, in order to substantiate the legal applicability.

In an embodiment of the present invention, the token data 40, 42 is used during an interactive session. One key characteristic of the interactive session is the unique interaction of the customer 2 with the system, depending on the questions asked. Thus, the parser is provided to parse the questions that the customer 2 enters. The advice engine 88 examines the parsed questions, and using the token data 40, 42 as a guide, generates the bank's response. Using this composite information, the advice engine 88 generates its advice 3. After the advice 3 has been generated, it is then passed back to the presentation engine 106, along with the token data 40, 42. The token data 40, 42 contains behavioral information, suggests means to deal with the customer 2, and formats the response. This interactive process is repeated as long as the customer 2 is working with the systems and is asking for advice 3, or is simply asking for information.

Proactive sessions for an embodiment of the present invention are initiated directly by the bank 4. Interactive sessions result from previous, daily off-line evaluation of each customer's token data 40, 42, daily news file log and some other key financial indicators. As a result of this off-line analysis, the system for an embodiment of the present invention elects to send certain advice 3 to the customer 2 using any of the available means of communication 64 with the customer. The advice engine 88 also sends a message to the marketing database and retrieves the bank's intent 18. Also, prior to any activity, the advice engine 88 verifies banking laws to assure that the transaction is legal.

In an embodiment of the present invention, the token data 40, 42 is used during a proactive session. A key characteristic of the proactive session is that the system operates off-line and likely generates advice 3 during off-peak periods. During these periods, the system for an embodiment of the present invention, for example, generates proactive advice 7 and executes any updates to a customer's token 44, based on the context engine 114 feedback. The advice engine 88 logic is called upon, for example, to generate proactive advice 7 to the customer 2. The logic flow for the advice engine 88 in generating proactive advice 7 includes, for example, wake up, read time, read wake up time parameter, and wake up time duration (if set), and check to see if any work was left from previous day, and if so, execute advice.

The advice engine 88 for an embodiment of the present invention uses this composite information to generate its advice 7. After the advice 7 has been generated, it is then passed back to the presentation engine 106 along with the token data 40, 42. The token data 40, 42 contains behavioral information and suggested means to deal with the customer 2 and how to format the response. Since this process is an interactive process, it is repeated as long as the customer 2 is interacting with the system and as long as the customer is asking for advice 3, or simply asking for information.

Figure 12:
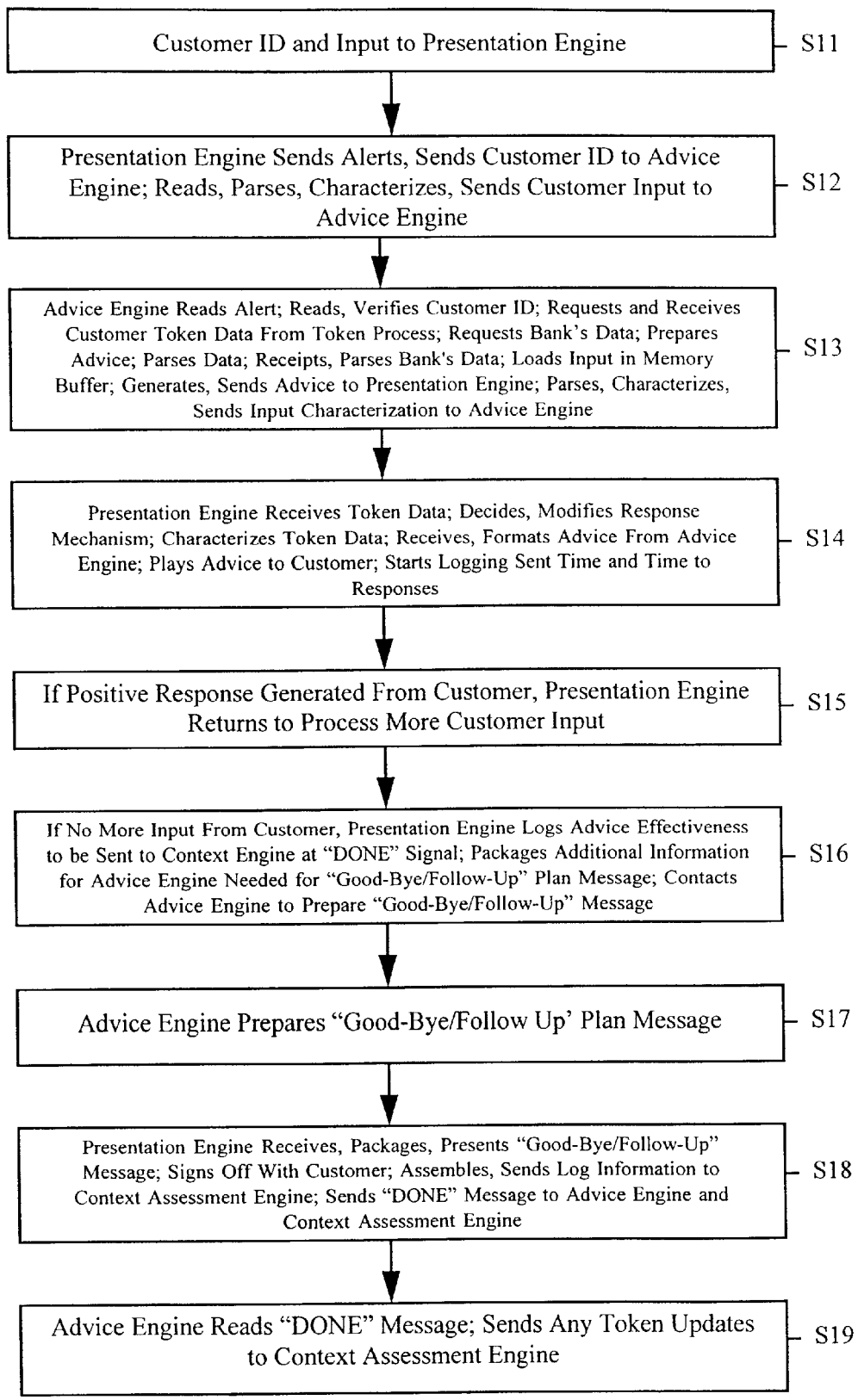
FIG. 12 is a flow chart which illustrates an example of presentation engine and advice engine actions and reactions for interactive or proactive sessions for an embodiment of the present invention.

FIG. 12 is a flow chart which shows sample presentation engine and advice engine actions in interactive or proactive sessions for an embodiment of the present invention. Referring to FIG. 12, at S11, the presentation engine 106 receives the customer's ID and the customer's input. At S12, the presentation engine 106 alerts the advice engine 88 of the interacting customer 2, sends the customer ID to the advice engine, reads the customer's input, parses and characterizes the input, sends the input to the advice engine, and waits for advice from the advice engine.

Referring further to FIG. 12, at S13, the advice engine 88 reads the alert from the presentation engine 106, reads the customer ID, verifies the customer ID, requests the customer's token data 40, 42 from the token process, requests and receives the bank's data, prepares the advice 3, parses the data, receives and parses the bank's data, loads input in an appropriate memory buffer, generates and sends the advice to the presentation engine 106, parses and characterizes the input, and sends the input characterization to the advice engine,.

Referring again to FIG. 12, at S14, the token data 40, 42 is also simultaneously sent to the presentation engine 106 which receives the token data, decides on a mechanism for a response based on the token data, modifies the interaction screen, as needed based on the token 44, modifies the responding voice, as needed based on the token, modifies the colors and possibly music response, as needed based on the token, characterizes the token data and receives advice 3 from the advice engine 88, formats the advice in presentation format, plays the advice to the customer and starts logging sent time and time to responses. At S15, the presentation engine 106 returns to process more customer input, if the advice 3 generates a positive response.

Referring also to FIG. 12, at S16, if there is no more input from the customer 2, the presentation engine reads loop done, ends read loop and logs the advice effectiveness to be sent to the context assessment engine 114 at a "DONE" signal, packages any additional information needed by the advice engine 88 for a good-bye and follow-up message, and contacts the advice engine to prepare a good-bye and follow-up plan message. At S17, the advice engine 88 prepares a follow-up plan message.

Referring likewise to FIG. 12, at S18, the presentation engine 106 receives the good-bye and follow-up message, packages the good-bye/follow-up message, presents the good-bye/follow-up message, signs off with the customer 2, sends log information to the context assessment engine 114, assembles log data, sends log file data to the context assessment engine, sends a "DONE" message to the advice engine 88, and sends a "DONE" message to the context assessment engine. At S19, the advice engine 88, reads the "DONE" message, and sends any updates to the context assessment engine 114 for any token updates.

A number of factors are included in the building of information that comprises the advice engine 88 for an embodiment of the present invention. This detail includes, for example, description of the various rule bases that affect the advice engine 88. The advice engine 88 includes software logic that extracts advice depending on the various rules and facts that are placed at the disposal of the advice engine. The advice engine 88 does only one thing with is to generate advice 3. Regardless of what kind of session is involved, the advice 3 is based solely on the behavioral profile and financial aptitude of the customer 2.

The advice engine 88 for an embodiment of the present invention does perform all the tasks previously identified herein to generate advice 3. The advice 3 itself is the intersection of customer traits, money and products offered by the bank 4. The advice engine 88 matches products to customers 2. A goal for the system is to have a specifically designed product per customer. Alternatively, customers are grouped into product categories based on their behavioral characteristics and financial status. Rules data and relationships are provided, for example, by the bank's marketing department, and an interface can be provided, for example, between the advice engine 88 and the bank's persistent data 68.

The advice engine 88 for an embodiment of the present invention is effectively the central processing unit of the platform for an embodiment of the present invention. Based on the customer's token data 40, 42, and the predefined advice 3 that is provided by the bank 4, the advice engine 88 generates specific advice to the customer 2. From a perspective, for example, of the relative uniqueness of the advice 3 and consideration of the advice as a customer function in a mathematical sense:

Generated Advice=Advice Generator (Customer Token Data)

The advice 3 is discrete per customer, since the argument of the mathematical function itself is discrete, simply because the values of its arguments themselves are necessarily discrete values.

In an embodiment of the present invention, the bank 4 has, for example, tens of millions of unique items of advice 3, because the possible number of items of advice depends, for example, on the following independent parameters:

Token Data=Token Data (Customer Behavior, Customer Profile, Modus Operandi)

Each of the customer behavior vector, the customer profile, and the modus operandi arguments have many unique value sets. Assume, for example, that each of these arguments has 20 unique values. If that is the case, then the token data 40, 42 may by itself effectively categorize the customers into:

3 to the 20th power=3,486,784,401 choices.

Returning to the initial argument, which was examining the advice options and the uniqueness of the advice 3, the advice is dependent on the values presented by the customer token data 40, 42 and the bank's intent 18, which is in reality the spectrum of products and services 8 offered by the bank 4. Typically, the product and services spectrum is focused on bank-like products and services, but in future may be expanded to cover a broader array that includes commercial and trade linkages and associated services.

At minimum, assume the bank 4 is offering 20 products and services 8. When compounded with the hypothetical example for the customer token data 40, 42 described above, it follows that the spectrum of options for the customer 2 is huge indeed, and the logic of the advice engine 88 really works through a structured selection process which generates this large number of options. The token process presents the customer token data 40, 42 to the advice engine 88 number of items of advice 3. Thus, the advice logic engine 88 works with the customer token data 40, 42, and the bank's canned advice data to generate advice 3 to the customer 2.

According to the architecture for an embodiment of the present invention, the advice engine 88 server hardware is, for example, physically connected to the context assessment host server 114, the token data server 116 and the presentation engine server 106. The advice engine 88 reads data from the data servers with which it deals, such as customer's token data 40, 42, business and commerce rules server object 112, statistical and services facts server object 102, and a marketing database server object. The advice engine 88 also sends data and communicates with various processes, including for example, the context assessment engine 114, presentation layer engine 106, and token process.

An embodiment of the present invention makes use of various types of predefined or canned advice, such as GAP, TIP, marketing, and alert. Describing these types of advice in terms of functionality and focusing on how an item of advice 3 is generated and how the core of the system functions, rather than on the exact text of an advice or possible choices or options, GAP is generated as a result of the customer indicated goal or goals in life. Therefore, these types of advice 3 are generated based on customer stages in life and projection data. The data included in the customer profile 94 is behavioral information and financial aptitude. TIP advice generated during interaction with the customer 2 is an on-line process, which is invoked when the customer interacts with the bank 4. The input to this process is the customer profile 94, which also includes the latest data from the current session.

The marketing message object for an embodiment of the present invention is an off-line batch process, which prepackages the bank's offering to the particular class of customers, based on their financial aptitude. The alert object is an off-line process, which analyzes news information, relates it to the customer financial well being, and generates an alert of appropriate level. In addition there is "personal," which is not necessarily a financial vehicle, but a good neighbor service, which greets with birthdays, holidays, anniversaries and other important customer events. For very profitable customers, it may be flowers or fruit ordering for a special event in the customer's life.

A marketing message for an embodiment of the present invention is the bank's intent 18 to sell products and services 8. The idea behind that message is to promote services, which are applicable to each individual user or as close to each individual as possible. Therefore, it relies on segmentation of the product and compatibility of each customer with the segment. Additional refinement is required since each customer may fit several segments and vice versa. Personal traits from the behavioral part of the profile 94 play a more important role with regard to what message will really hits home with the customer 2.

The alert is a term commonly used for artificial intelligence. In reality, this object parses financial news and alerts customers if it affects their financial welfare. This is a relatively simple task which involves, for example, matching the alert symbols on the press release with the customer's portfolio. The intelligence comes from the software that realizes for example, that El-Nino will trigger price changes on the future crop contracts in the customer's portfolio.

The context assessment engine 114 for an embodiment of the present invention provides the self-learning, self-tuning capabilities of the system as a whole. It is modularized into objects, such as message and advice assessment 118, channel efficiency 120 for a given advice 3, and advice effectiveness 122 to an individual. The message and advice assessment object 118 determines how successful the advice 3 or message is, based on the total response. However, success for one piece of advice 3 does not automatically mean the same for another piece of advice, and vice versa. Each piece of advice 3 is measured on its profitability as well as its penetration.

In an embodiment of the present invention, different pieces of advice 3 and messages may achieve different results if presented via different touchpoints, or different presentation methods within a touchpoint. That data analysis is a part of the channel efficiency object 120 in the context assessment engine 114. Another function of the context assessment engine 114 is, for example, to fine-tune advice 3 or messages for an individual. Once advice 3 is given and the customer 2 does not use it, there is a software based postmortem session to decide if poor advice has been given or if the customer does not benefit from a particular piece of advice. In either case, this fine-tuning improves the advice 3 and its delivery to the customer 2 when the next inquiry is made.

The token process for an embodiment of the present invention performs a number of functions, such as delivering data to backend data stores 68 from touchpoints 64 for persistent storage, delivering data to touchpoints from the presentation engine 106, delivering data to the presentation engine from the advice engine 88, and delivering data to the advice engine from the backend data stores. Additional functions performed by the token process include, for example, delivering data from the context assessment engine 114 to the backend data stores 68, delivering data from the backend to the context assessment engine, delivering data between various touchpoints 64, and delivering data between homogeneous touchpoints in different geographies.

As indicated by the foregoing examples of functions of the token process for an embodiment of the present invention, the token process is a main databus of the system for an embodiment of the invention. More precisely, the token process is a software databus. The token process is not coupled, for example, to any specific hardware but is referred to herein as a databus for the lack of the availability of a better term. The functionality described above is not limited to the software engines mentioned. Since it involves pass-through of the data, the implementation is designed around set of common objects. Those objects themselves are plug-compatible to accommodate any number of software engines and any number of messages and data containers for efficient pass-through. The data container itself is designed to accommodate different kinds of messages or tokens 44 at different levels of complexity and different levels of data size through the output. The complexity of designing the container is to accommodate all newly developed software engines and existing systems with a universal method of communication.

Another aspect of the token process for an embodiment of the present invention is to implement a message queue to perform above existing benchmarks. Because the system includes interactive functionality, the performance is of paramount importance, and the system design accommodates on-line channels as well as backend processes and data stores. The implementation of the token process is seen as a data communications equipment (DCE)-type server constantly running on two or more central processing units (CPUs) in its own partition space. The token queue is invoked as one of the entries of the server. Tokenized data is passed as a parameter to the queue routine. Once a token 44 is placed in the queue, it is assessed for priority and positioned to the appropriate order or to the appropriate queue. Alternatively, a dual queue can be implemented to accommodate other systems.

In an embodiment of the present invention, when the token 44 is positioned on the top or bottom of the queue for processing, the server determines what engine or sub-system is a receiver of the data. The receiving system is then invoked with the token 44 as a parameter. Once the receiving system informs the delivery server of successful receivership of the token 44, the token is removed from the queue permanently. All of the foregoing functionality is augmented by a log server, which writes into the log all processing, as well as the timeliness of those processes. The log is necessary, for example, for security and system audit, performance tuning, and fault tolerance. The above-mentioned security is a passive element of the overall security approach.

In an embodiment of the present invention, performance tuning is a paramount issue as previously mentioned. The logs provide the engineering group with necessary information to tune and improve the performance. Fault tolerance is the ability of the system to avoid a crash. Nevertheless, if that happens, the system recovers quickly and painlessly. For example, the logs determine the system state before a crash, and what was the last token 44 in the queue to be processed. Then the system decides if the token 44 received before the crash was received correctly. If of that did not occur, the token 44 is reconstructed.

In an embodiment of the present invention, the session content is written into a VDU database when the CSR presses an end of session button, or preferably, this is done automatically during session. When the CSR performs banking transactions for the customer 2 from the desktop, there is also a process to mine the transaction logs to see what transactions during session were invoked on behalf of the customer. All transactions are mapped to network interactive voice response system (NIVR) menus and worldwide web (WWW) links, and the session activity data is written to a database. Therefore the content of this database is customer interaction and behavioral data, or at least a portion of behavioral data. The two types of sessions under which the token engine is invoked are, for example, an interactive session initiated by the customer 2 and a session initiated by the bank 4, which may or may not be interactive, depending on customer preferences.

During a customer originated session for an embodiment of the present invention, the token 44 is quickly populated with all data for the session and passed to the touchpoint at which the customer 2 accessed the bank 4. Depending on the opportunity to present the advice 3, not all advices may be presentable for all types of touchpoints 64 because of security or lack of it. However, that does not change the content of the advice 3. For example, if the bank 4 cannot approve a loan for $5,000 via an IVR 46, it does not mean that the bank should advise only $1,000. During a bank-initiated proactive session, the message or an advice 3 is passed to the token 44 and the token selects one of the touchpoints 64 based on customer preference, such as e-mail, beeper, fax, CSR callback, or the like. In this instance of the session, if the advice or alert is inappropriate for the desired touchpoint, then another touchpoint is used, or the session does not take place.

In an embodiment of the present invention, token processor functionality includes, for example, communication from the session activity database and IVR 46 with other bank databases, with those as the bank's backend data stores 68. Further, this functionality is augmented with, for example, an ORACLE data replicator, which lifts the data out of the session activity database and inserts it into the bank's database. Session activity data is also passed to persistent data store 68. The token process is designed to provide the certain major functions, such as execution and management of responsive sessions and execution and management of proactive sessions. This high level design of both functionalities of the advice engine 88 for an embodiment of the present invention includes, for example, deciding on the type of session, either proactive or responsive, and generating advice 3 for responsive sessions, for example, by reading data from the presentation data store, reading data from the marketing and business rules database 112, reading data from customer's profile 94, and generating advice.

Additionally, for generating advice 3 of responsive sessions, the advice engine 88 for an embodiment of the present invention logs responses, determines if additional advice is needed, sends updates to the customer's profile 94, sends information to the assessment engine 114, retrieves the bank's products information. retrieves statistical data, retrieves current token data for the customer, retrieves customer assets and liability information (customer profile), packages advice in the preferred format, sends the advice to the presentation engine 106—reject the customer advice store, posts advice to the token database—yes, do the look up, and sends a trigger to the context assessment engine 114 for assessment and evaluation (too early).

The advice engine 88 for an embodiment of the present invention generates advice 7 for proactive sessions, for example, by reading data from the news data store, determining the type of investments that the customer 2 has and the percentage of the total assess in each, determining the frequency of the customer's interaction with the system, determine the purchasing mode of the customer, performing a risk factor appraisal, and determining the areas where the risk is taken. Additionally, in generating advice for proactive sessions, the advice engine 88 filters news of the day, special events, and sales information to determine what the customer 2 wants, determines the news of the days—this loop is done once per day and filtered to the customer, determines any special events that can be tied up with this date, and determines any sales information that the customer may be interested in.

Figure 13:
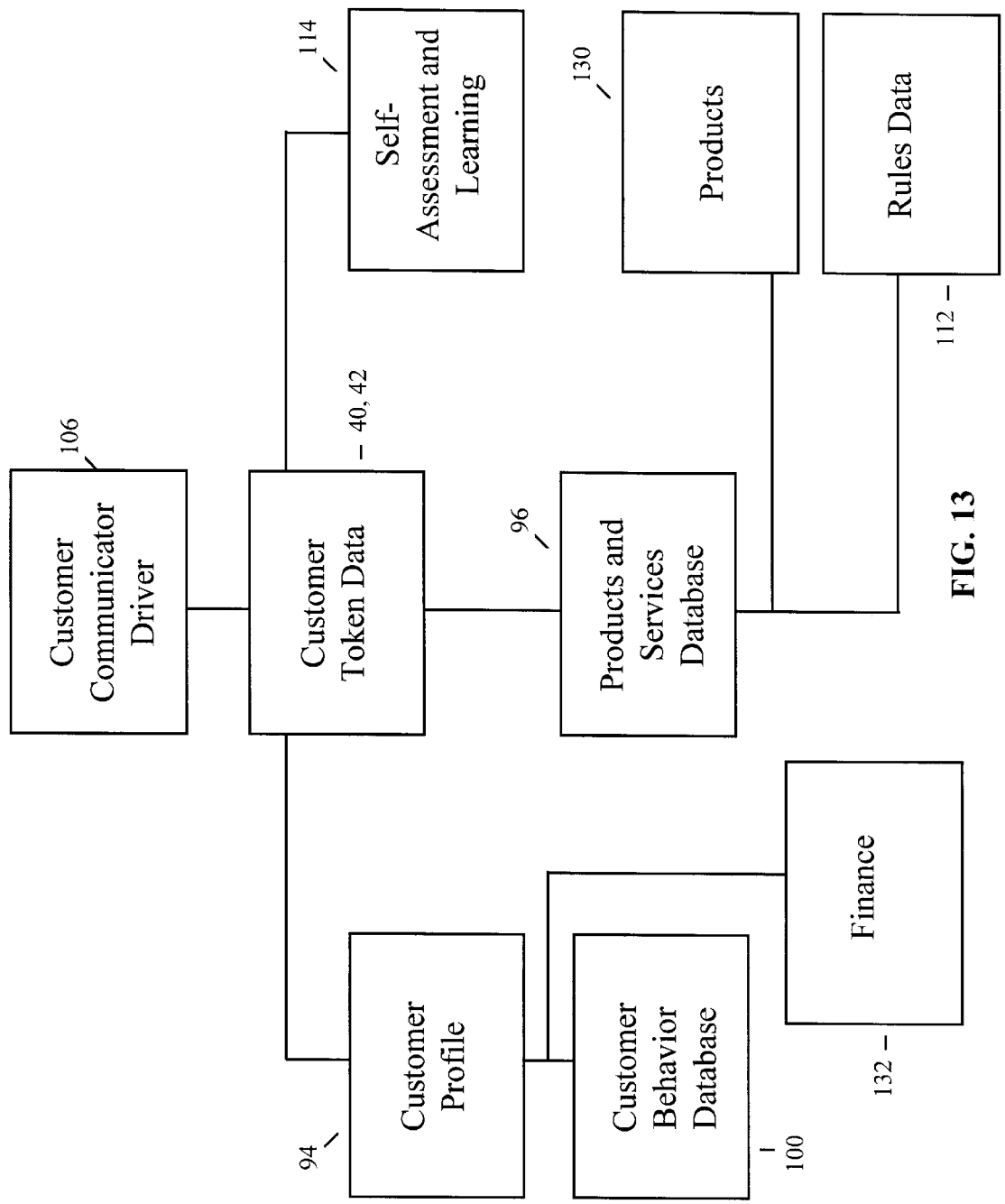
FIG. 13 is a diagram which illustrates key components of a data tree structure of the data architecture of the system for an embodiment of the present invention.

FIG. 13 is a diagram which illustrates key components of a data tree structure of the data architecture of the system for an embodiment of the present invention. The advice engine 88 for an embodiment of the present invention reads data from a number of databases, including for example, the customer's behavior analysis or behavior database 100, the customer's profile 94, the business and commerce rules 112, the statistical and services facts 102, and a marketing database. In addition, the advice engine 88 sends data to engines and/or system software, such as the self assessment engine 114, the presentation layer engine 106, the behavior database 100, and desktops.

To illustrate the system for an embodiment of the present invention and the manner in which it functions, reference is made, for example, to the data flow, the stored data content and the triggers that cause data to be moved and the manner in which it is projected. The system is data intensive and data sensitive. Referring further to FIG. 13, the movement of data from the different data stores to the customer's data structure and logic engines is illustrated, as well as the relationship between architectural design with data dependency for an embodiment of the invention.

In the enterprise layout of the data for an embodiment of the present invention, certain types of data are localized to certain areas and certain types of data are redundant globally. The system for an embodiment of the present invention and its adjoining systems store, retrieve, and manage data. The reason for having some redundant data is for real time performance considerations where it may be prudent, for example, to have data available locally rather than having to fetch it from a great distance. Referring further to FIG. 13, the data driven system for an embodiment of the present invention is based on data structures, such as the customer's profile 94, the customer's behavior database 100, products and services data 96, rules data 112, products data 130, finance data 132, and customer token 40, 42.

Referring again to FIG. 13, the customer's profile database 94 contains all the information that can be collected about the customer 2. The information is collected from the various data that the customer 2 normally submits in applications, credit reports and banking forms. In addition, it contains derived information that the system itself generates from the behavioral patterns of the customer 2. This data is dynamic and changes in time, even if the customer 2 does not use the system. For example, the fact that there has been no interaction from the customer 2 with the banking system is in itself a valuable piece of information that can prompt actions and may reflect a view of the customer.

The advice engine 88 for an embodiment of the present invention determines the actions to be taken and the specific advice 3 to be given to a specific customer. The prepared customer-unique information about the customer 2 is called the customer token data 40, 42. The customer token structure 44 is a universally accessible piece of information that has a unique physical storage layout, location, and is accessible universally by the system. The customer token 44 drives the particular manner in which the system communicates with the customer 2 including the type of advice offered, the layout of the screen that the customer or the agent sees, or voice messages that the customer hears.

FIG. 14 is a table that shows samples of the structure that contains the customer's profile data 94 for an embodiment of the present invention. For example, the customer's profile data 94 includes the customer unique identification 134, customer first name 136, customer middle initial 138, customer last name 140, customer main residence link 142, customer date of birth 144, customer sex 146, customer financial link 148, customer preferred method of engagement 150, customer declared financial link 152, customer communication link 154, and customer linguistic link 156.

Figure 16:
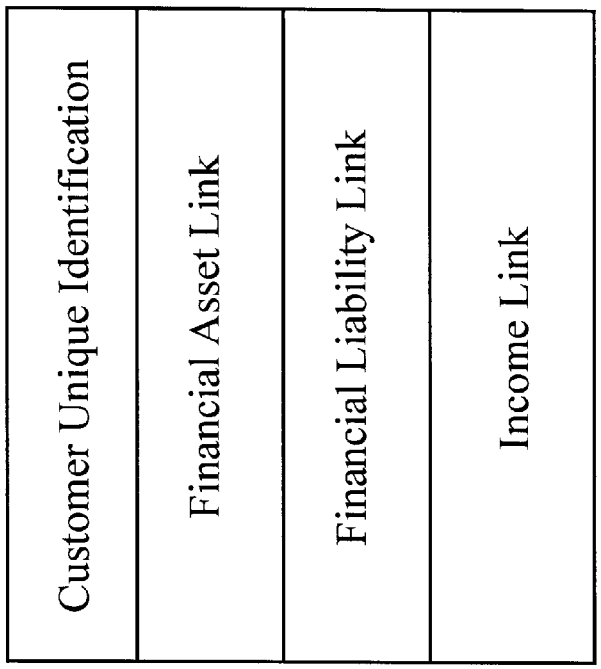
FIG. 16 is a table with shows examples of customer financial link data for an embodiment of the present invention.

FIG. 15 is a table which illustrates examples of customer residence link data 142 for an embodiment of the present invention. FIG. 16 is a table with shows examples of customer financial link data 148 for an embodiment of the present invention. FIG. 17 is a table with illustrates examples of customer declared financial link data 152 for an embodiment of the present invention. FIG. 18 is a table which shows samples of customer communication link data 154 for an embodiment of the present invention. FIG. 19 is a table which shows examples of customer linguistic link data 156 for an embodiment of the present invention.

Referring further to FIG. 13, the customer behavior database 100 for an embodiment of the present invention is the set of data designed to capture the customer's habits and behavioral traits. It contains, for example, two sets of information. A first set of information includes any customer explicitly expressed preferences, and a second set of information includes implicitly extracted data. FIG. 20 is a table which shows a sample data scheme for the customer behavior database 100 for an embodiment of the present invention.

The products and services data 96 for an embodiment of the present invention represents products and services offered by the system, which are grouped by country of availability, product lines and functional branches of the bank 4, investment type and strategy. Products and services are grouped according to availability. The database 96 is designed to accommodate future products, which are not available now, but will be profitable with future technologies. FIG. 21 is a table with shows examples of product data 96 for an embodiment of the present invention.

The rules data 112 for an embodiment of the present invention include an encapsulation of regulatory rules, such as the state, federal, and international rules that regulate the specific financial transaction sought. For example, the rules data reflect and manifest U.S. government regulation, reflect and manifest specific state rules and/or regulations where applicable, reflect country specific rules where applicable, regulate the transactions being conducted and ensure adherence to banking rules, apply any bank specific rules, and are updated as needed.

Statistical data 98 for an embodiment of the present invention is a complete repository of statistical information that captures well-defined patterns that relate to a specific financial offering. The statistical information relates, for example, to differences in patterns among sexes, age groups, national patterns and the like. Additional data that can be used includes, for example, statistics about at what age savings for IRAs peaks, certain behavioral patterns unique to men vs. women, age vs. degree of risk taking, and diversity factors based on geographical models.

The token data structure 44 for an embodiment of the present invention, represents a complete encapsulation of a customer's interactive, financial and preference data. The data structure for the token structure 44 scheme includes, for example, the customer's unique Id, presentation preference by touchpoint, the bank's intent, the customer's actual or derived intent, and previous customer intent fulfillment history. In order to raise the service for the bank's customers well above existing retail banking standards and to distinguish the bank's service brand from all other banking institutions, an embodiment of the present invention provides a vehicle to perform advanced electronic banking using the token 44, which is a personalized message with embedded methods of communication between the customer 2 and the bank 4.

Customization 62 of the token 44 for an embodiment of the present invention depends on the customer's value to the bank 4, the customer's abilities to utilize bank services, and the bank's intent to personalize those services to the customer. The token 44 also reflects the bank's special promotions and campaigns. The token 44 is the bank's vehicle to solicit compliance on the customer's part to the bank's business practices, when applicable. The token 44 is dynamically generated upon customer contact. All tokens have the same properties but differ in the values of those properties. Such properties include, for example, personalization 60, foresight into customer intent 10, the bank's intent 18, and globalization.

The software server responsible for generation of the individual token with the above-mentioned properties for an embodiment of the present invention has the capacity, for example, to monitor, service, analyze and correct itself The server monitors the bank-client relationship and takes corrective action, when the bank's intent 18 is not being delivered or used. This implies, for example, fine-tuning of intent 18 or re-thinking of potential recipients of the particular advice 3. The token data 40, 42 for an embodiment of the present invention is distinguished from the customer token function. The customer token function is the software that drives and uses the customer token data 49, 42. The customer token data is a data construct (much like a Semaphore, or data object in 00 language) that is unique for each customer. In contrast, the token function is operational software that is used by all and any customer interaction with the bank system.

The personalization property 60 for an embodiment of the present invention includes, for example, customer language preference, menu selection or hypertext markup language (HTML) pages mold. For example, if the customer 2 always checks the customer's equity portfolio first, it is reasonable to present to the customer that information automatically upon authentication. The same behavioral information is available to a dynamic HTML generator, therefore giving seamless interface between different touch-points with the bank 4. As an example, to deliver a Kanji presentation layer to a kiosk in Omaha, Nebr. for a customer of the bank 4 from Asia, ordinarily, that kiosk would not have the Kanji alphabet.

Personalization 60 can be derived via direct customer intervention, such as the customer 2 customizing an IVR or web page. Another method for personalization 60 is, for example, the bank's software intelligence. This is achieved, for example, via observation of the customer's behavior or the customer's pattern of interaction with the bank 4. In either case, it is not an interactive process. The information pertaining to customer preferences and modes of communication with the bank 4 are stored on a customer by customer basis. The automated customization engine 60 captures certain behavioral patterns.

The foresight into the customer intent property relates to performing predictions about the customer's intent 10 based on the previous activities on the side of the customer 2 and the action and/or reaction of the bank 4. For example, if the bank 4 knows that the customer 2 ordered checks about a week ago, the customer may likely ask where they are. Since the bank 4 knows that from its own source, a CSR may be advised, upon customer authentication, to inform the customer 2, for example, that the checks have been mailed to the customer.

The various components for an embodiment of the present invention are housed on servers. Each of the engines is housed on a separate server. The hardware for an embodiment of the present invention varies, depending on the banking institution's needs. The servers housing the various system components are highly reliable servers running an operating system that also provides high reliability. In an embodiment of the present invention the servers are distributed, depending on banking institution needs. The complexity and scalability of the system for an embodiment of the present invention requires critical analysis of the hardware components.

Hardware suitable for an embodiment of the present invention includes, for example, a Hewlett-Packard (HP)

platform. HP is the designer of a new 64-bit architecture, which can be viewed as a defacto standard for future platforms. HP's version of the UNIX operating system includes extensions, which makes it, for example, plug-compatible with a new Merced chip manufactured by Intel, with which the interchangeable board can be swapped and new hardware installed without software upgrades. The HP 9000 V2250 model, for example, can be scaled from 1 to 16 processors. While as few as 2 processors can be used in an embodiment of the present invention at the start, it can easily be scaled up to as many as 16 processors, which affords an upward performance curve as well as duplication capabilities.

HP mainframes are delivered, for example, with the interface to the small computer systems interface (SCSI) disk drive systems. The 12H RAID disk can accommodate up to 12–18 Gigabyte drives, which is sufficient for start-up. For a first phase of the token implementation, a fewer number of smaller drives, such as 8–9 G, are recommended. Connectivity and interconnectivity is achieved via multiple types of connections between components. Because of the high scalability of this architecture, site replication can be achieved with lower cost. For implementation, for example, in North America, two regional sites, for example, bi-coastal and perhaps one back-up site can suffice. European and Asia-Pacific sites can be sized based on population demand.

An operating system is an extremely important component of an application for an embodiment of the present invention. It is important to foresee the advent of new developments in operating systems and be able to react to them. An embodiment of the present invention utilizes the capabilities of an operating system. An operating system which is hardware independent and thus considered open is NT from Microsoft. An alternative is, for example, the ancestor of client-server operating system, UNIX. In HP terminology, it is HP-UX 11, which is scaleable and Merced chip ready. Finally, HP developed HP Open View software, which is another defacto standard in development and production support among UNIX platforms.

The physical component that will host the operational software and data stores for an embodiment of the present invention meets a number of requirements. For example, processors, and mass storage (disks) must be duplicated, interfaces cards must be duplicated, and transmission lines must be duplicated or a method for backup engineered. Further, processors and disks must be growable and scaleable, network transmission cards must be expandable in number, and processors must be connectable to one to another in case physical limits are reached on one. With respect to a database management system (DBMS), the choice of which relational database to use is more of a management decision than a technical decision.

For example, two major databases in the on line transaction processing (OLTP) arena are Oracle and Sybase. Each has its strengths and weaknesses. Oracle has a mature relational DBMS engine, Oracle 8.0. This release of the database has object-oriented features built in. It also supports hierarchical file partitioning and is claimed to be the fastest relational DBMS engine on the market. Oracle has a replication engine and SQL*NET—product, which allows access and replication of remote databases, including Oracle databases of different releases. Such a feature is extremely useful in an environment, such as an embodiment of the present invention, because, for example, of use of older Oracle releases, provided by the Nabnasset/Quintus touch-point solution. Oracle provides extensions of their relational DBMS to TUXEDO, which is an outstanding transaction processing engine and monitor. Oracle universal data server can use the Oracle transparent gateways to access heterogeneous data. Oracle transparent gateways provide read/write access to virtually any data store.

Many Wall Street financial institutions favor the Sybase engine. The Jaguar Transaction Processing engine has won praise for its feature content and performance. It is reported to be an ActiveX, COBRA, and Java-Bean compliance product. The Sybase replication server is certified by Sybase to replicate Oracle tables from Release 7.3.2.1. It is assumed that the earlier versions of Oracle databases are supported since they are subsets of 7.3.2.1. An advantage of Sybase is that Sybase is a business partner of HP, and its products are initially developed on HP platforms as opposed to being ported to other platforms later. This means optimization and early bugs are fixed on the HP platform first. The same is true for NT. The early version of Microsoft structured query language (SQL) Server used Sybase release 4.2. The is important, because the SQL interface between Sybase and the SQL Server are identical. Microsoft is on the same plane with its SQL Server as with NT itself. Its SQL Server performs very well on an NT platform. Oracle 8.0 and Sybase 11.5 are both competent relational DBMS engines.

The system for an embodiment of the present invention can be built, for example, in stages and introduced in phases intended to learn and improve at each phase. A reason for such an approach is that as carefully as one designs and reviews the logic engines, a few interactive soak cycles are needed. The soak cycles are short (for, example, 3 months each) and are used primarily to refine and enhance the logic from a logic appraisal stand and not from a software quality stand, which is assumed from thorough integration and test processes. A first phase of the system introduction involves, for example, the usage of a multi-processor server. The server meets the hardware requirements previously described herein. This server hosts all of the databases inherit in the system for an embodiment of the present invention. The first phase introduces, for example, the concept and all of the processes. The databases have full rich schemes, though few of their data elements are populated. The logic is simple and follows the broadest lines of the logic engine design. The physical layout for an embodiment of the present invention is designed and intended to make the system simple to introduce with a well defined interface to a customer's call center architecture, as well as an interface to the bank's existing database systems.

An aspect of on embodiment of the present invention is the physical network connectivity necessary for the customer to access a bank CSR through the public switched telephone network (PSTN) or the Internet for collaboration and e-mail. Another aspect is the overall call flow between these physical entities. Considering the voice call component connectivity for an embodiment of the present invention at a high level, the PSTN connects to the bank's network interactive voice response (NIVR) system. The NIVR connects to a voice enhanced service processor (VESP), which creates the session activity database and is the middle-ware or computer telephony Interface (CTI) to the NIVR and other systems. This is the equipment that provides the "screen pop" to a representative showing customer account information. The NIVR is also connected through the VESP into the automatic call distributor (ACD) for synchronization of "screen pop" and voice call coordination. The ACD distributes the call to the CSR at the bank call center.

For Internet collaboration, defined as speaking to a representative without ending an Internet session, in an embodiment of the present invention, the Internet connects a customer 2 to a server containing the home page and general information about the bank 4 and its services. The Internet telephony gateway (ITG), the Internet control manager (ICM) and the Web line collaboration server are components used to launch a voice call connecting the customer 2 to the agent. The ICM interfaces the PASSAGEWAY (Lucent) telephony server (T Server) which provides access to the ACD. The ACD and the VESP talk to each other, setting up the synchronization between the customer 2 and the agent for the voice and visual Internet session. Further, the Internet e-mail components are similar to that of Internet collaboration. Significant differences include, for example, Internet e-mail requires a mail server and MessageCare, both of which are not involved in Internet collaboration.

The customization 62 and personalization 60 system for an embodiment of the present invention is, in reality, a multi-component system. For each knowledge center 98, there is a customization 62 and personalization 60 system that serves it. The customization 62 and personalization 60 system may serve more than one knowledge center 98 at a time. However, for a single customer there is a single location where customization 62 and personalization 60 records for that customer are kept. If the customer 2 accesses a knowledge center 98 that is serving the customization 62 and personalization 60 system hosting the particular customer's token data 40, 42, then the system will provide the advice 3 and all the other customization 62 and personalization 60 services.

In an embodiment of the present invention, if the customer 2 accesses a knowledge center 98 located a far away distance than the home location (even internationally), then the local system determines from the personal Identification the ID of the customization 62 and personalization 60 system that hosts the particular customer's data. The local system then contacts the host system and executes advice 3 and all the other functions acting somewhat as a conduit. Thus, the customer 2 experiences the same look and feel regardless of where the bank 4 is accessed. In order to provide this universal look and feel, the overall network is fast enough so that the customer 2 accessing the bank 4, for example, from a country in Europe does not experience delays due to transmission. Therefore, the network architecture and the wide area network transport is very important. Software architecture is a critical part of an embodiment of the present invention. The software architecture goes hand in hand with the hardware architecture, transport, and overall system architecture. Software is the utility that delivers the architected functionality. The manner and efficiency of this software influences the system operations, maintenance and cost.

With regard to customer access to the system for an embodiment of the present invention, in general, the system is initiated every time the customer 2 interacts with the bank 4. This interaction begins as soon as the customer 2 has an account number, which provides the customer with access to an account through, for example, IVR 46, or when the customer logs onto electronic banking. The system immediately begins building the customer's profile 94. The customer's name is in the database, and other information about the customer 2 may be included in the database, such as the fact that the customer's balance never goes above $3,000, or that the customer calls the banking institution very often to check balances, or that the customer checks to see if certain checks have cleared.

The system for an embodiment of the present invention may also determine other information, such as the fact that the customer does not invest a lot of money in bonds and stocks. All touchpoints that the customer 2 has with the banking institution and all products and services 8 the customer uses provide inputs. These products and services 8 include banking related and financial investment related information.

Figure 22:
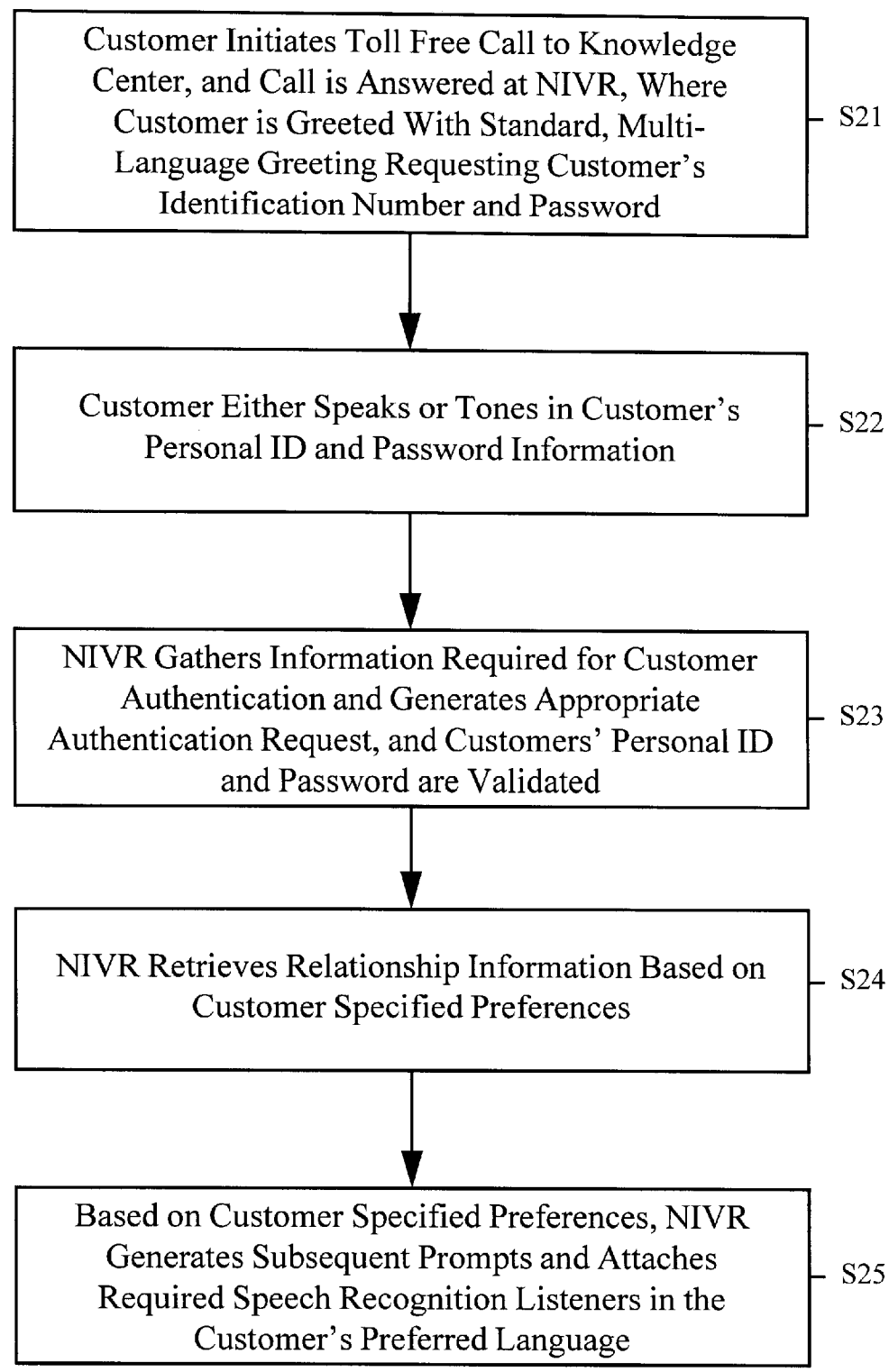
FIG. 22 is a flow chart which illustrates a sample network interactive voice recognition (NIVR) log in by a customer for an embodiment of the present invention.

FIG. 22 is a flow chart which illustrates a sample NIVR log in by a customer for an embodiment of the present invention. The customer 2 calls into the NIVR and enters a valid customer identification number (CIN) and password, and the customer's account number and password are accepted and validated. Relationship information is retrieved, and the current session recording is initiated through the token 44. This activates pre-selected customer options such as language, treatment preference and custom menu options. In this example, it is assumed that the customer uses natural speech recognition or tone keypad.

Referring to FIG. 22, at S21, the customer 2 initiates a toll free call to the knowledge center, and the call is answered at the NIVR, where the customer is greeted with a standard, multi-language greeting requesting the customer's identification number and password. At S22, the customer 2 either speaks or tones in the customer's personal ID and password information. At S23, the NIVR gathers the information required for customer authentication and generates the appropriate authentication request, and the customer's personal ID and password are validated. At S24, the NIVR retrieves relationship information based on customer specified preferences. At S25, based on the customer specified preferences, the NIVR generates subsequent prompts and attaches required speech recognition listeners in the customer's preferred language. The NIVR can perform any customer specified menuing, or prompt the customer further for menuing details, or bypass all menuing and transfer the call immediately to an appropriate advocate.

Figure 23:
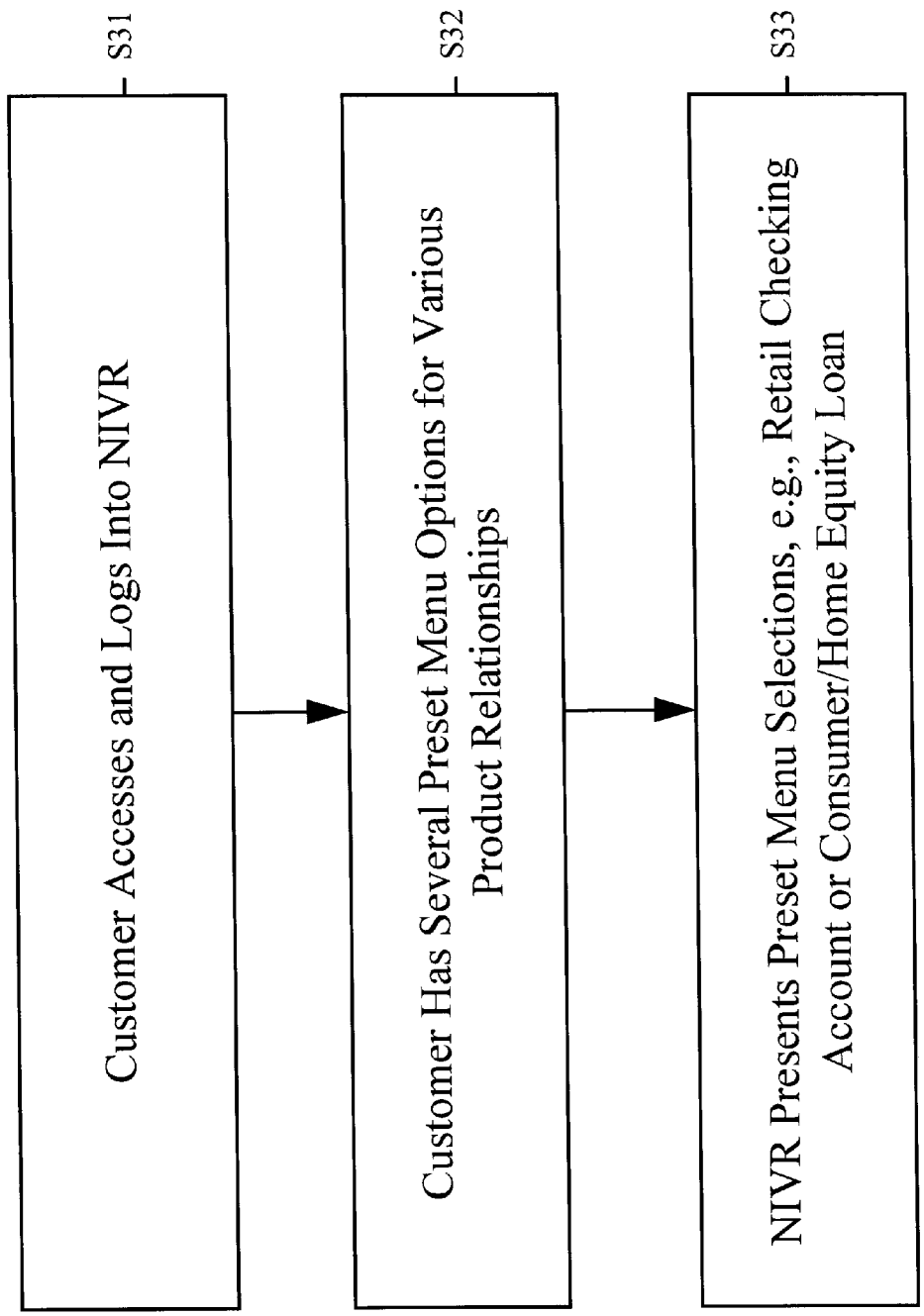
FIG. 23 is a flow chart which illustrates an example of the customer navigating the NIVR custom menu options for an embodiment of the present invention.

FIG. 23 is a flow chart which illustrates an example of the customer navigating the NIVR custom menu options for an embodiment of the present invention. After logging into the NIVR, the customer 2 wishes to navigate the customer's menu preset options for checking, which automatically delivers, for example, the last three deposits, the last three withdrawals and the current account balance. The customer 2 also has, for example, a home equity loan menu preset that delivers the date and amount of the last payment received, and the remaining principal amount. It is likewise assumed in this example, that the customer 2 uses natural speech or tone keypad.

Referring to FIG. 23, at S31, the customer 2 successfully accesses and logs into the NIVR. At S32, the customer 2 has several preset menu options for the various product relationships. For the customer's retail checking account, for example, at S33, the customer 2 requests that he or she always be presented with the last three deposits, the last three withdrawals and the account balance, or the customer's consumer/home equity loan, for example, the customer 2 requests that he or she be presented with the last payment received date and amount, and the amount of principal remaining on the loan.

Figure 24:
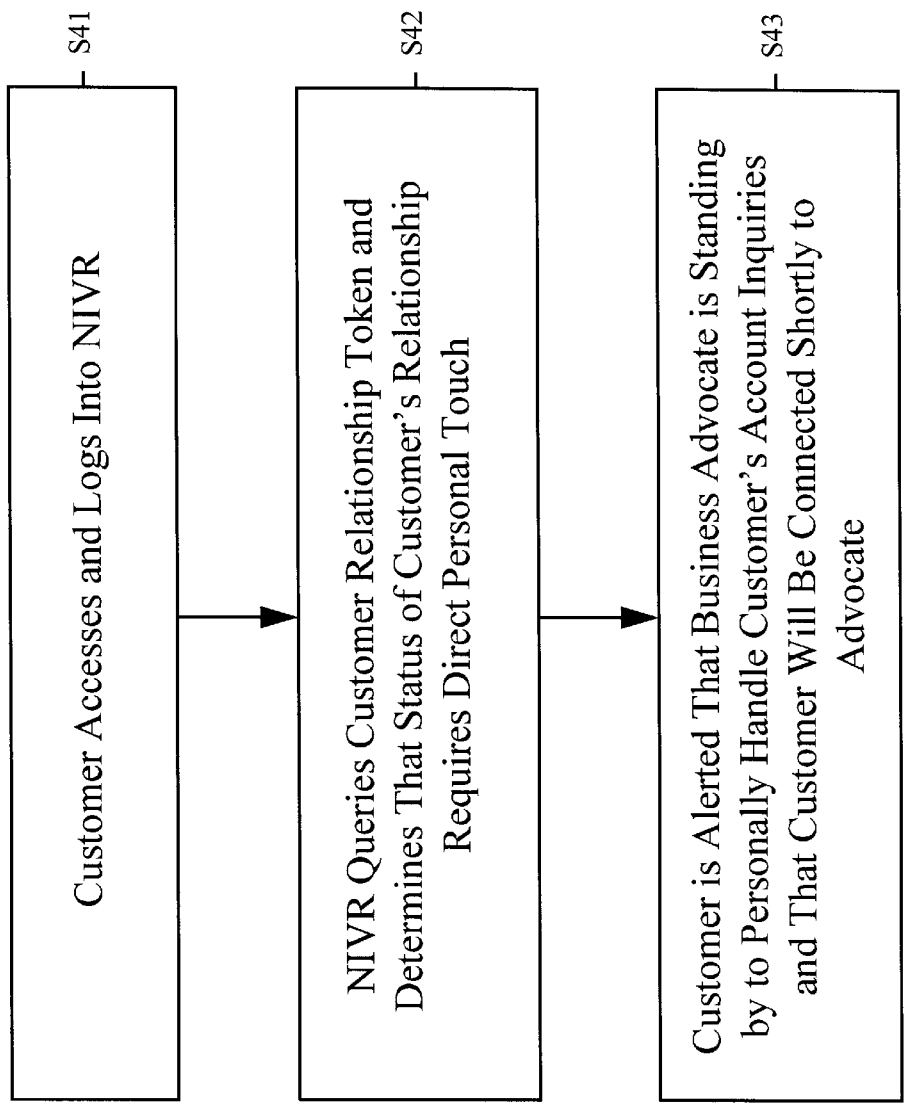
FIG. 24 is a flow chart which illustrates an example of the process of an override by the NIVR of the customer's intent for an embodiment of the present invention.

FIG. 24 is a flow chart which illustrates an example of the process of an override by the NIVR of the customer's intent for an embodiment of the present invention. After logging into the NIVR, the business determines that the state of the customer's accounts requires direct advocate support. This can be in the form of customer requested proactive information, or business specified redirection due to recent account activity. Again, in this example, it is assumed that the customer 2 uses natural speech or tone keypad.

Referring to FIG. 24, at S41, the customer 2 successfully accesses and logs into the NIVR. At S42, the NIVR queries the customer relationship token 44 and determines that the status of the customer's relationship requires a direct personal touch. Examples that trigger this activity include potential fraudulent activity against an account, account payment delinquency, account overdraft or insufficient funds, customer specified notification of bond maturity, and the like. At S43, the customer 2 is alerted that a business advocate is standing by to personally handle the customer's account inquiries and that the customer will be connected shortly to the advocate.

Figure 25:
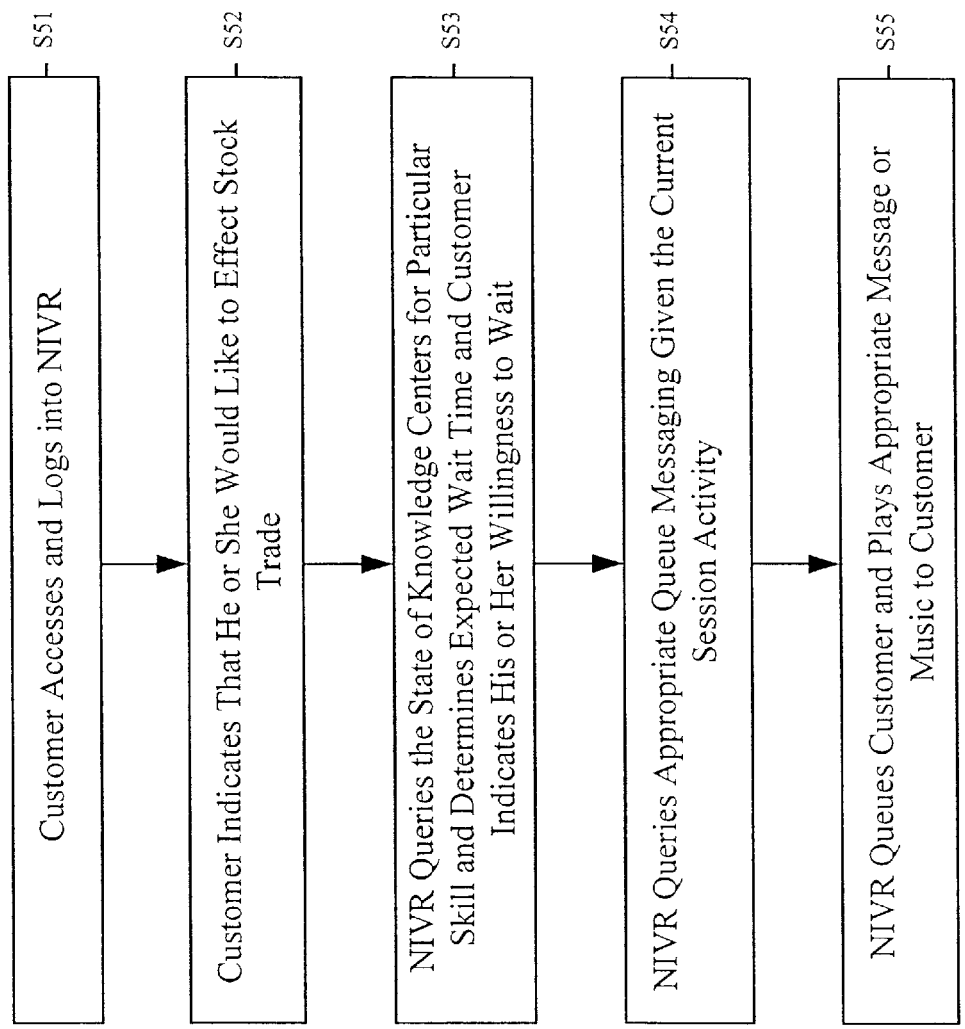
FIG. 25 is a flow chart which illustrates an example of the process of network interactive voice recognition (NIVR) queuing for an embodiment of the present invention.

FIG. 25 is a flow chart which illustrates an example of the process of NIVR queuing for an embodiment of the present invention. After logging into the NIVR, the customer 2 would like to initiate a brokerage trade. As this requires a highly skilled advocate with the skill and credentials to effect a brokerage trade, a query is made to determine when an advocate will be available. The expected delay is, for example, two minutes, so the NIVR queues the customer 2 and plays other relevant market information. Again, it is assumed for this example that the customer 2 uses natural speech or tone keypad.

Referring to FIG. 25, at S51, the customer 2 successfully accesses and logs into the NIVR. At S52, the customer 2 indicates that he or she would like to effect a stock trade. This option requires the assistance of an advocate possessing a particular skill. At S53, the NIVR queries the state of the knowledge centers for a particular skill and determines that the expected wait time will be, for example, two minutes, and the customer 2 indicates his or her willingness to wait. At S54, the NIVR queries for the appropriate queue messaging given the current session activity. At S55, the NIVR queues the customer 2 and plays an appropriate message or music to the customer.

Figure 26:
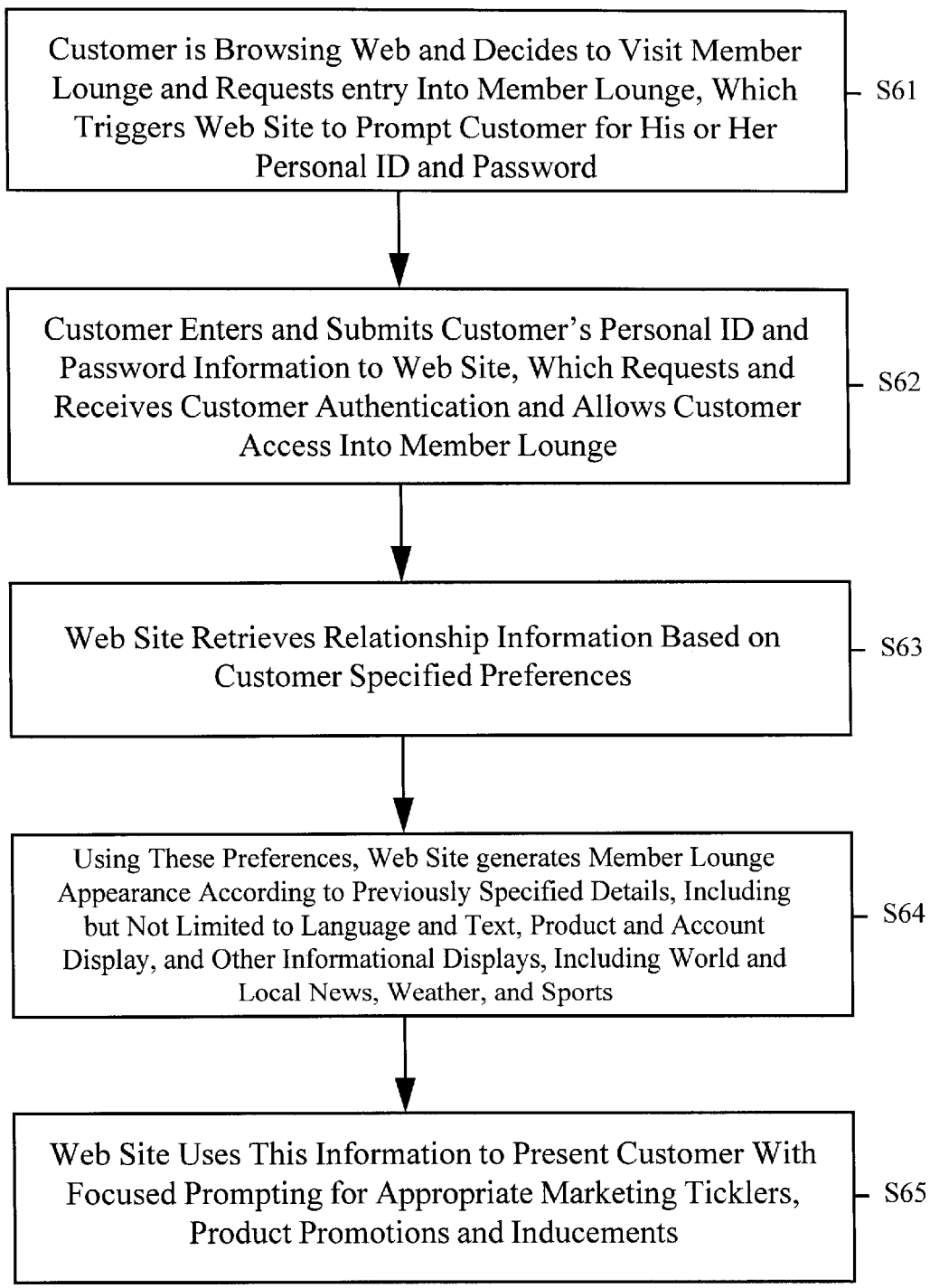
FIG. 26 is a flow chart which illustrates an example of the process of the customer accessing via the Web and requesting a collaborative session for an embodiment of the present invention.

FIG. 26 is a flow chart which illustrates an example of the process of the customer 2 accessing via the Web and requesting a collaborative session for an embodiment of the present invention. The customer 2 accesses the Web and requests a collaborative session with voice over Internet Protocol (VoIP). In this example, it is assumed that the customer 2 has established Internet access channel and personal equipment to support Internet access including appropriate Web browser, VoIP capabilities or a second phone line to support call backs.

Referring to FIG. 26, at S61, the customer 2 is browsing the Web and decides to visit the member lounge and requests entry into member lounge, which triggers the Web site to prompt the customer 2 for his or her personal ID and password. At S62, the customer 2 enters and submits the customer's personal ID and password information to the Web site, which requests and receives customer authentication and allows the customer access into member lounge. At S63, the Web site retrieves relationship information based on customer specified preferences, Referring further to FIG. 26, at S64, using these preferences, the Web site generates a member lounge appearance according to the previously specified details, including but not limited to language and text, product and account displays, and other informational displays including world and local news, weather, sports. At S65, the Web site uses this information to present the customer with focused prompting for appropriate marketing ticklers, product promotions and inducements. The customer relationship information is used by the Web site member lounge to permit or prohibit the use of advanced Internet collaborative features such as VoIP or Text Chat depending on customer value and/or appropriate advocate availability.

Figure 27:
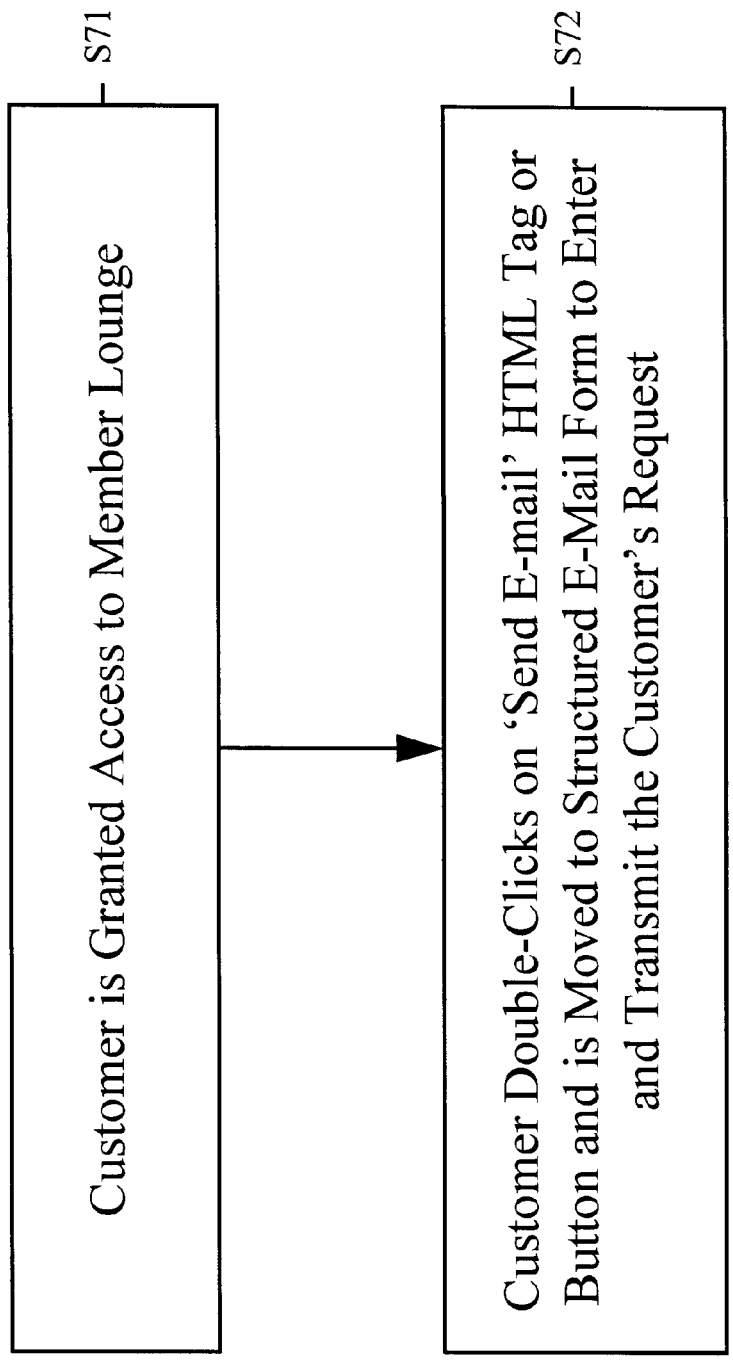
FIG. 27 is a flow chart which illustrates an example of the process of the customer accessing the Web and sending an asynchronous request via structured e-mail for an embodiment of the present invention.

FIG. 27 is a flow chart which illustrates an example of the process of the customer 2 accessing the Web and sending an asynchronous request via structured e-mail for an embodiment of the present invention. The customer 2 establishes an Internet access channel and personal equipment to support Internet access including an appropriate Web browser. Referring to FIG. 27, at S71, the customer 2 is granted access to the member lounge. After browsing the Web site or reviewing the customer's account information, the customer 2 has a question about the disposition of the account or a previous request. Alternatively, the customer 2 may have seen something that caught his or her eye and would like to receive further information about the item in question. At S72, the customer 2 double-clicks on the 'send e-mail' HTML tag or button and is moved to a structured e-mail form where the customer can enter and transmit the customer's request.

Figure 28:
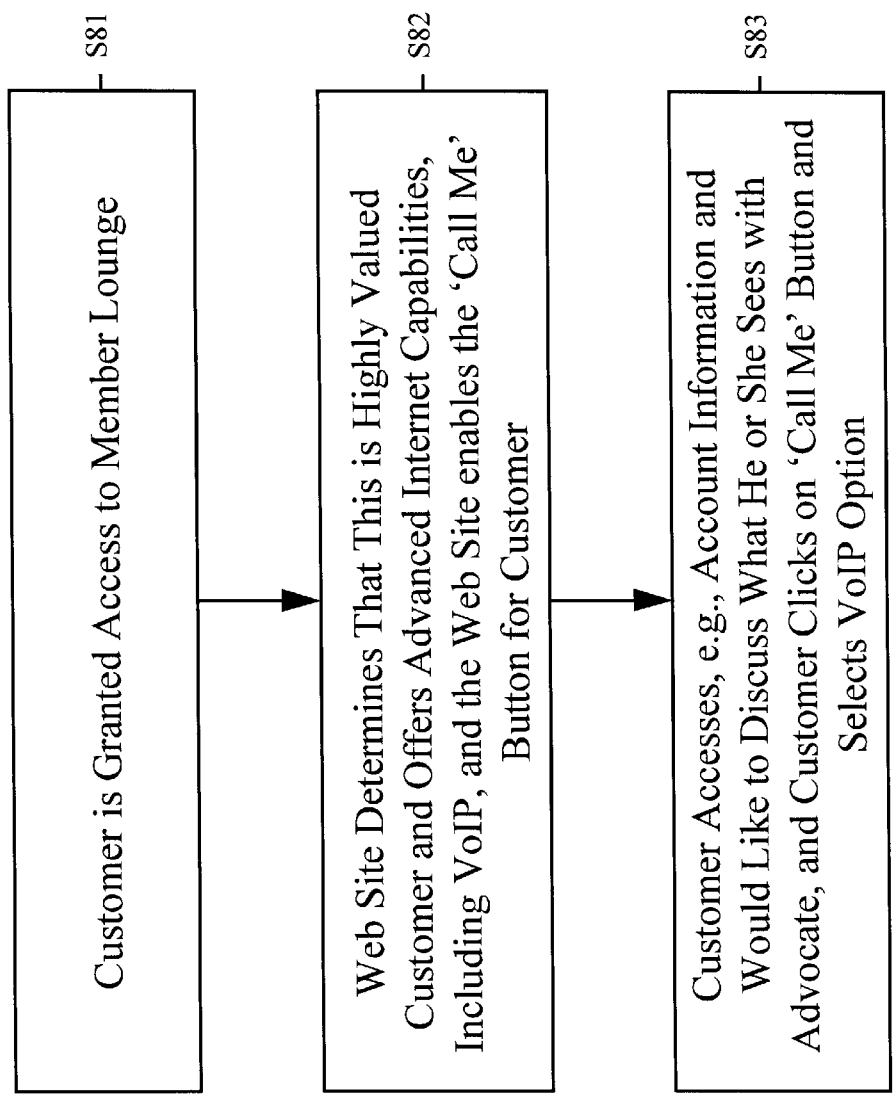
FIG. 28 is a flow chart which shows a sample of the process of the customer accessing the Web and requesting a collaborative session with voice over Internet Protocol (VoIP) for an embodiment of the present invention.

FIG. 28 is a flow chart which shows a sample of the process of the customer 2 accessing the Web and requesting a collaborative session with voice over IP for an embodiment of the present invention. The customer 2 establishes Internet access channel and personal equipment to support Internet access including appropriate Web browser, VoIP capabilities or second phone line to support call backs. Referring to FIG. 28, at S81, the customer 2 is granted access to the member lounge. At S82, the Web site determines that this is a highly valued customer and will offer advanced internet capabilities including VoIP, and to this end, the Web site enables the 'Call Me' button for the customer 2. At S83, the customer 2 accesses, for example, account information and would like to discuss what he or she sees with an advocate, and the customer clicks on the 'Call Me' button and selects the VoIP option.

Figure 29:
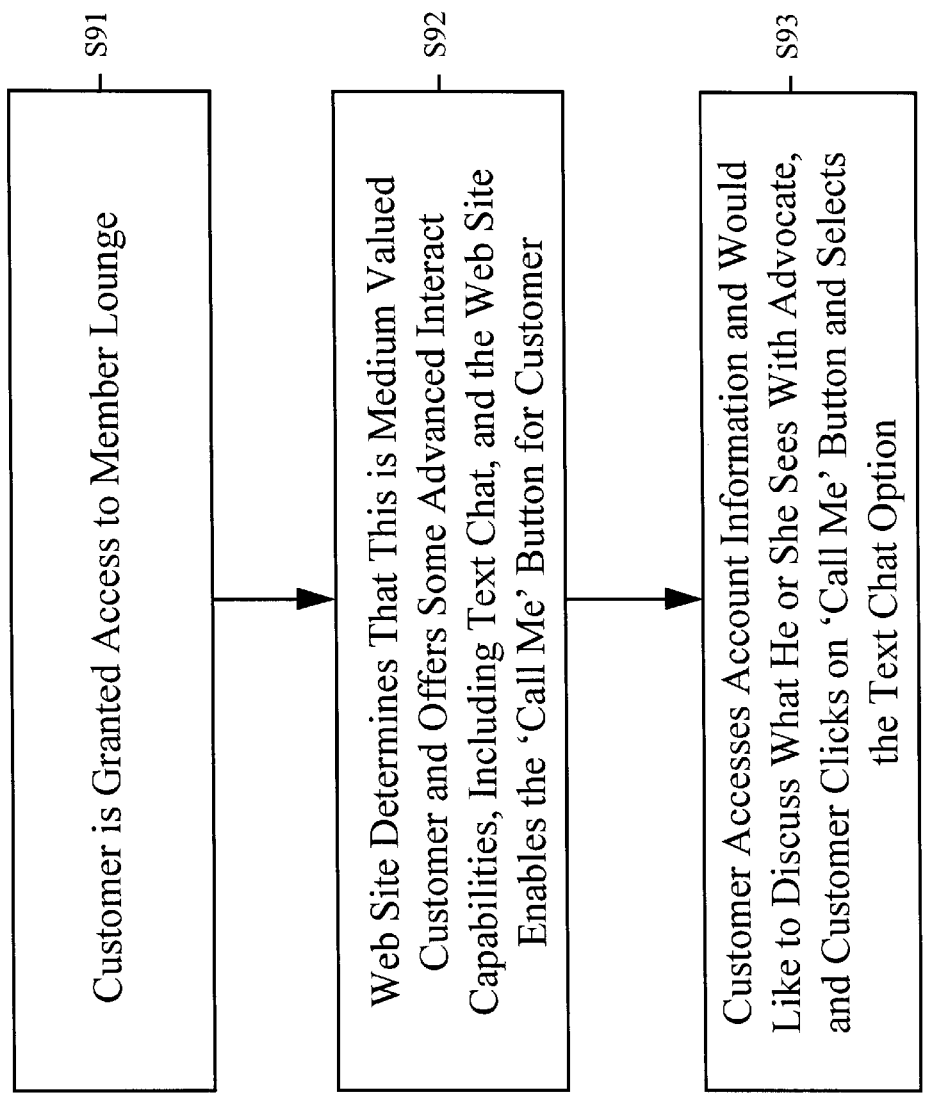
FIG. 29 is a flow chart which illustrates an example of the process of a customer accessing the Web and requesting a collaborative session with text chat for an embodiment of the present invention.

FIG. 29 is a flow chart which illustrates an example of the process of a customer accessing the Web and requesting a collaborative session with text chat. In this example, it is assumed that the customer has established Internet access channel and personal equipment to support Internet access including appropriate Web browser, Text Chat capabilities or second phone line to support call backs. Referring to FIG. 29, at S91, the customer 2 is granted access to the member lounge. At S92, the Web site determines that this is a medium valued customer and offers some advanced interact capabilities including Text Chat, and to this end, the Web site enables the 'Call Me' button for the customer 2. At S93, the customer 2 accesses account information and would like to discuss what he or she sees with an advocate, and the customer clicks on the 'Call Me' button and selects the Text Chat option.

Figure 30:
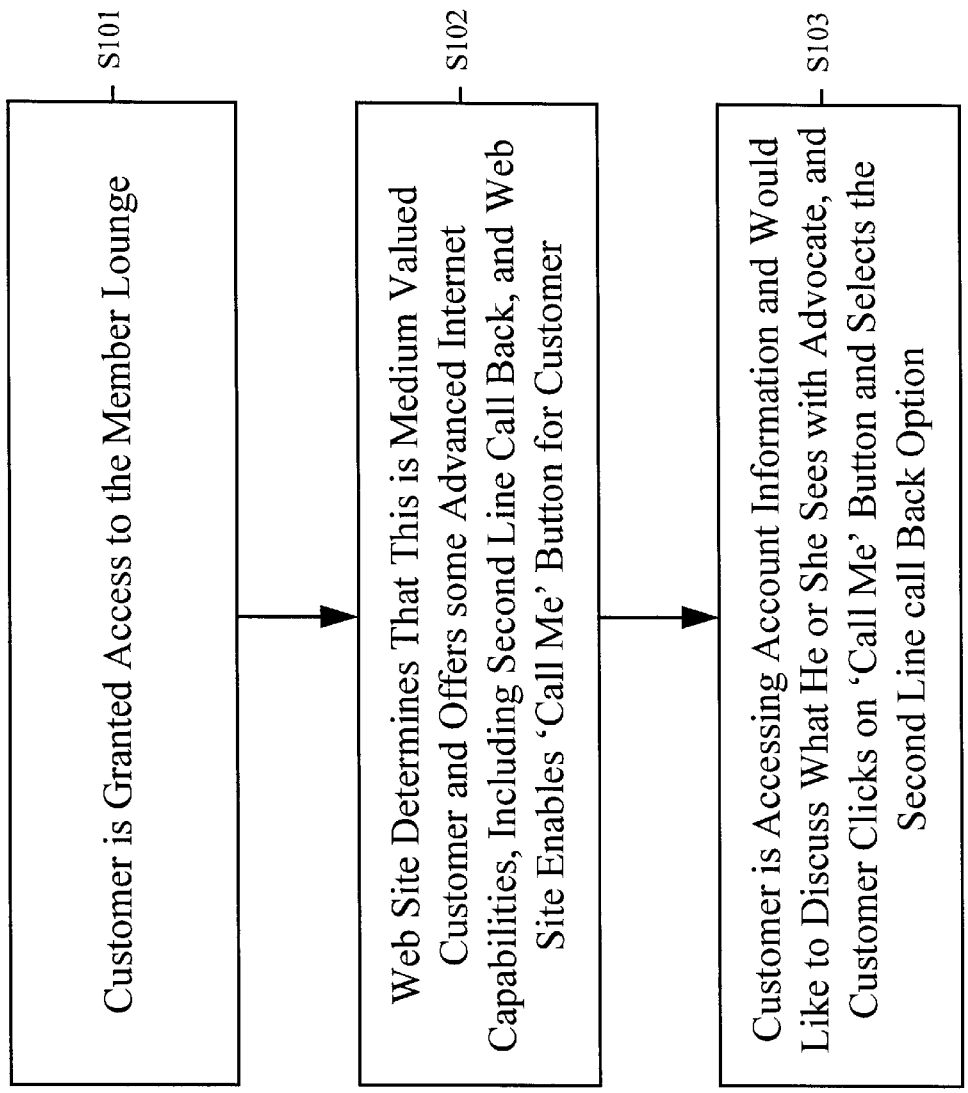
FIG. 30 is a flow chart which shows an example of the process of the customer accessing the Web and requesting a collaborative session with a second line call back for an embodiment of the present invention.

FIG. 30 is a flow chart which shows an example of the process of the customer 2 accessing the Web and requesting a collaborative session with a second line call back. It is assumed for this example, that the customer 2 establishes Internet access channel and personal equipment to support Internet access including appropriate Web browser and a second phone line to support call backs. Referring to FIG. 30, at S101, the customer 2 is granted access to the member lounge. At S102, the Web site determines that this is a medium valued customer and offers some advanced Internet capabilities including second line call back, and to this end, the Web site enables the 'Call Me' button for the customer 2. At S103, the customer 2 is accessing account information and would like to discuss what he or she sees with an advocate, and the customer clicks on the 'Call Me' button and selects the second line call back option.

Figure 31:
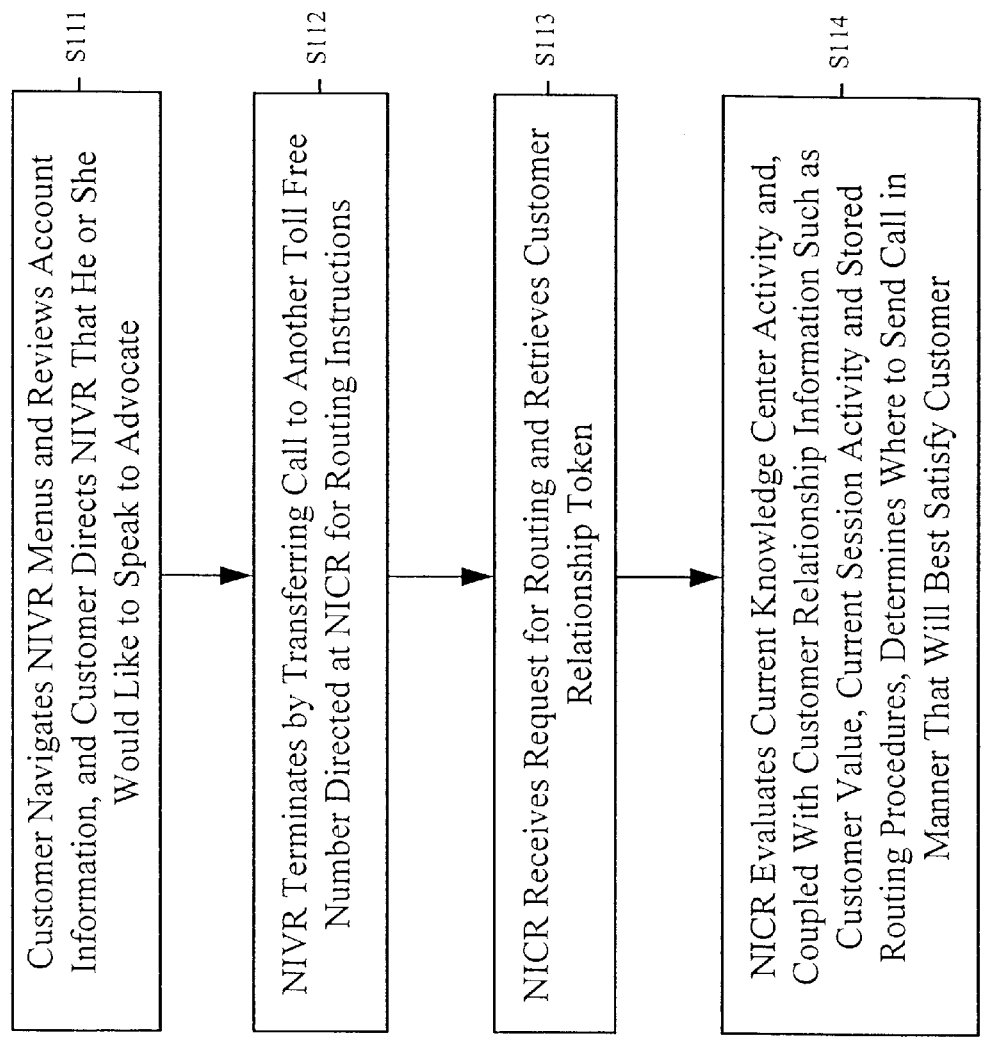
FIG. 31 is a flow chart which illustrates an example of the process of touchpoint routing for an embodiment of the present invention.

FIG. 31 is a flow chart which illustrates an example of the process of touchpoint routing for an embodiment of the present invention. The customer 2 accesses the NIVR, and during the course of the NIVR navigation, the customer requests to speak to an advocate. The NIVR terminates it's portion of the customer session and transfers the request to the NICR. The NICR reviews current knowledge center activity and, coupled with the current session history, directs the advocate request to the advocate best suited to address the customer's request. In this example, it is assumed that the customer 2 has navigated NIVR and that current session history information is available.

Referring to FIG. 31, at S111, the customer 2 navigates the NIVR menus and reviews account information, and at some point, the customer directs the NIVR that he or she would like to speak to an advocate. At S112, the NIVR terminates by transferring the call to another toll free number which is directed at the NICR for routing instructions. At S113, the NICR receives the request for routing and retrieves the customer relationship token 44. At S114, based on this information, the NICR evaluates current knowledge center activity and, coupled with customer relationship information such as customer value, current session activity and stored routing procedures, determines where to send the call in a manner that will best satisfy the customer 2.

Figure 32:
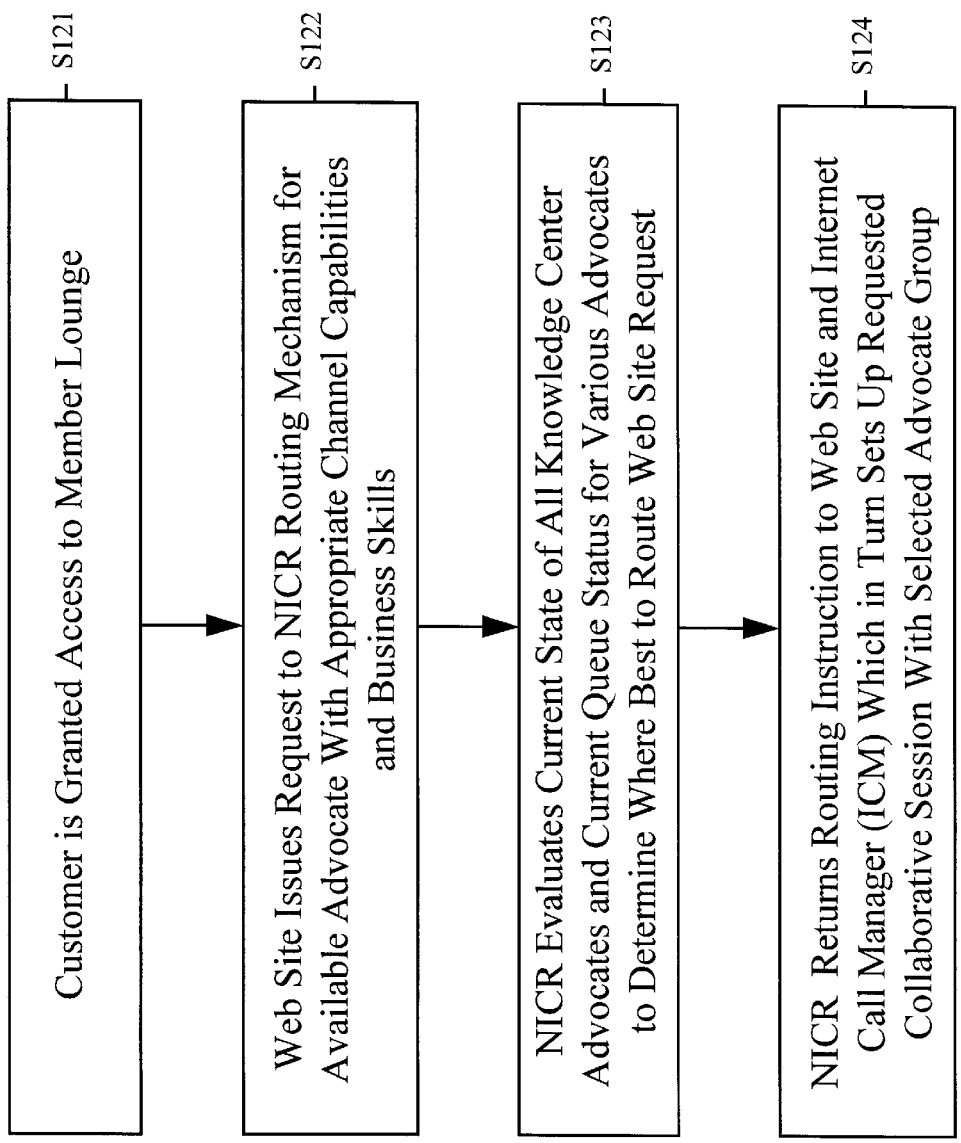
FIG. 32 is a flow chart which illustrates an example of use of inbound Internet by the customer for an embodiment of the present invention.

FIG. 32 is a flow chart which illustrates an example of use of inbound Internet by the customer for an embodiment of the present invention. The customer 2 accesses the Web, and after reviewing account information, the customer selects a 'Call Me' option. This request is transmitted to the NICR, where an appropriate evaluation of available advocates possessing the required business skills and channel capabilities is made. It is assumed in this example that the customer has established Internet access channel and personal equipment to support Internet access including appropriate Web browser, VoIP capabilities or second phone line to support call backs.

Referring to FIG. 32, at S121, the customer 2 is granted access to the member lounge, and during the course of browsing the member lounge and the customer's account information, the customer decides to establish collaborative contact with a business advocate. This type of contact is presented through various channels such as VoIP, Text Chat or second line call back. At S122, the Web Site issues a request to the NICR routing mechanism for an available advocate with the appropriate channel capabilities and business skills. At S123, the NICR evaluates the current state of all knowledge center advocates and the current queue status for the various advocates to determine where best to route the Web site request. At S124, the NICR returns a routing instruction to the Web Site and the Internet call manager (ICM), which in turn sets up the requested collaborative session with the selected advocate group.

Figure 33:
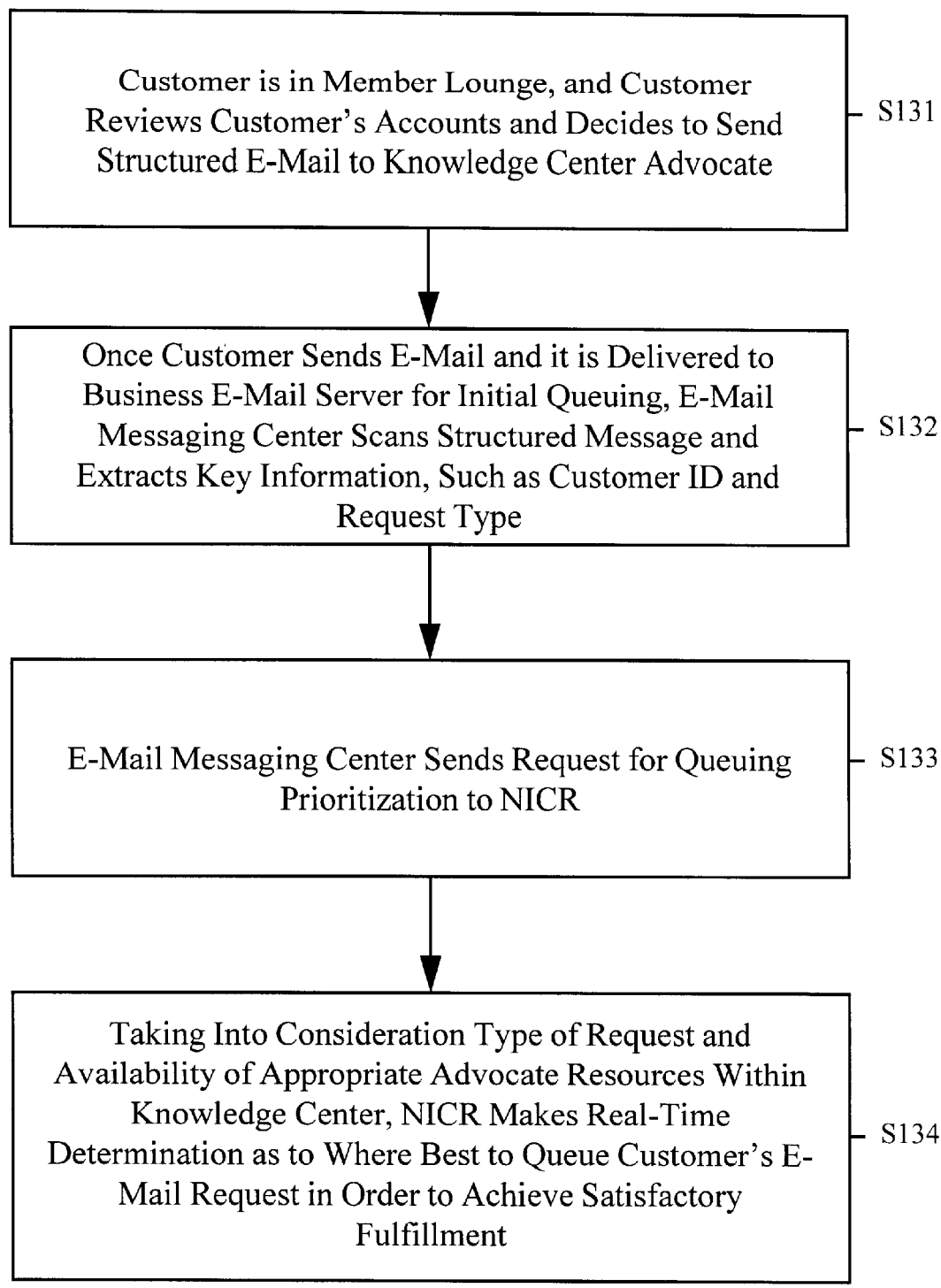
FIG. 33 is a flow chart which illustrates an example of the process of use of inbound e-mail by the customer for an embodiment of the present invention.

FIG. 33 is a flow chart which illustrates an example of the process of use of inbound e-mail by the customer for an embodiment of the present invention. The customer 2 accesses the Web and requests to send an e-mail, and initially, the e-mail is deposited in a holding queue. Further e-mail prioritization and distribution to an appropriate queue is determined as required according to business defined rules and current knowledge center activity levels. For this example, it is assumed that the customer 2 has established Internet access channel and personal equipment to support Internet access including appropriate Web browser and e-mail capabilities.

Referring to FIG. 33, at S131, the customer 2 is in the member lounge, and the customer reviews the customer's accounts and decides to send a structured e-mail to the knowledge center advocate. At S132, once the customer sends the e-mail and it is delivered to the business e-mail server for initial queuing, the e-mail messaging center scans the structured message and extracts key information such as customer ID and request type. The result of the preliminary e-mail determines whether a further refinement in queuing granularity is required due to the nature of the request, its time sensitivity, or the customer's relative value to the business. At S133, the e-mail messaging center sends a request for queuing prioritization to the NICR. At S134, taking into consideration the type of request and the availability of appropriate advocate resources within the knowledge center, the NICR makes a real-time determination as to where best to queue the customer's e-mail request in order to achieve satisfactory fulfillment.

In an embodiment of the present invention, the products and services 8 also may be broader, in the sense that the bank 4 may have deals with others for retailing certain things, such as cars. For example, if the customer 2 is logging into the system to try to get a loan, the system may determine that the customer is inquiring about car loans. In response, the system may automatically provide the customer 2 with information such as the following: "this bank has the greatest deal and guarantees you $100 above invoice on this particular car if you touch this button or call this number or send this e-mail to the Internet."

Figure 34:
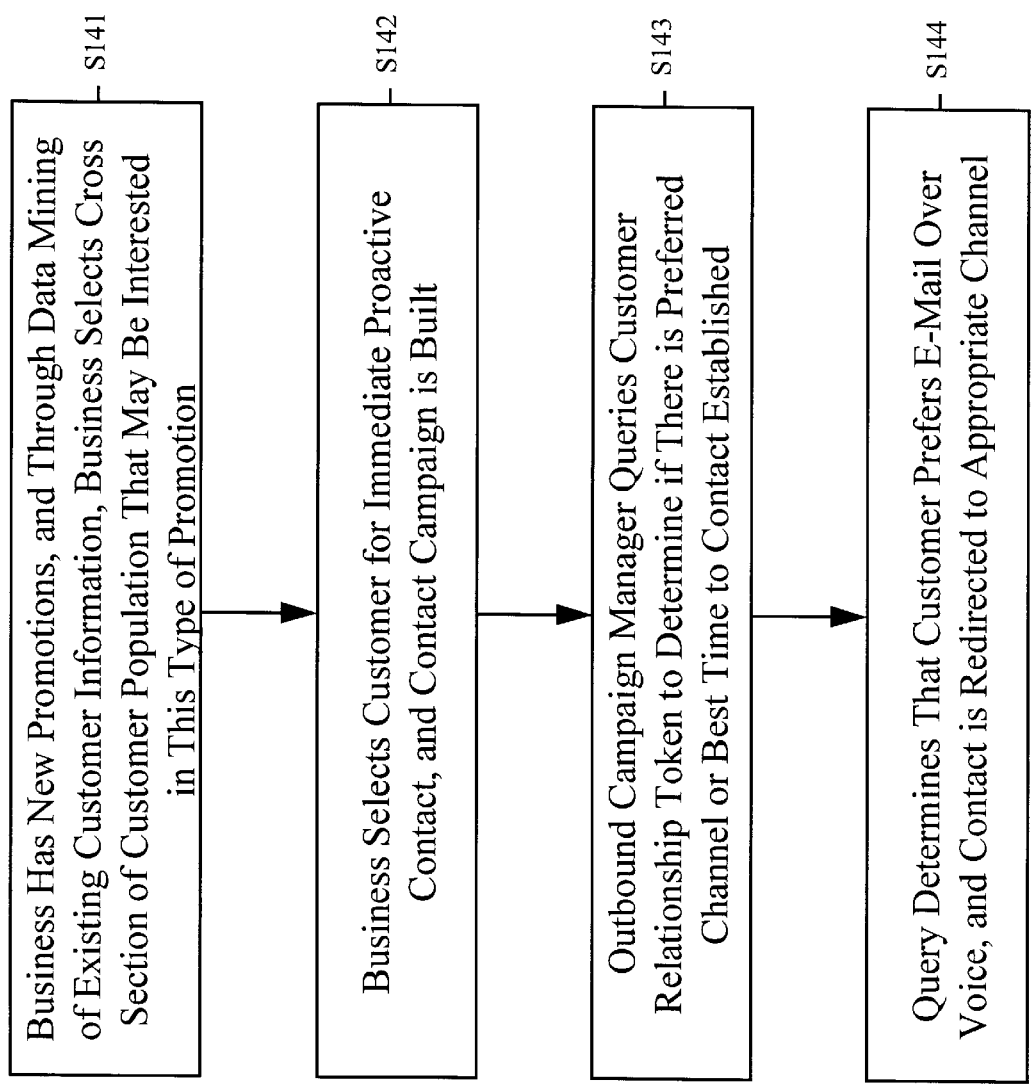
FIG. 34 is a flow chart which illustrates an example of use of outbound voice to the customer for an embodiment of the present invention.

FIG. 34 is a flow chart which illustrates an example of use of outbound voice to the customer 2 for an embodiment of the present invention. The business wishes to initiate voice contact with the customer 2 due to a recent promotional opportunity which may be of interest or due to the detection of unusual account activity. The contact campaign is executed, and as each contact is prepared, the customer relationship token 44 is accessed for modal preferences. This reveals that the customer 2 has a defined contact preference for e-mail. The outbound voice campaign is redirected to an appropriate e-mail alert which can be directed to the customer 2 through a preferred channel. In this example, it is assumed that the customer preferences and channel contacts, such as e-mail address, are established.

Referring to FIG. 34, At S141, the business has some new promotions, and through data mining of the existing customer information, the business selects a cross section of the customer population that may be interested in this type of promotion. Alternatively, the business fraud processes determine that the recent account activity for the customer 2 is unusual and may be fraudulent. In either case, at S142, the business selects the customer 2 for immediate proactive contact, and the contact campaign is built. Before each customer contact is attempted, at S143, the outbound campaign manager queries the customer relationship token 44 to determine if there is a preferred channel or best time to contact established. At S144, the query determines that the customer 2 prefers e-mail over voice, and the contact is redirected to the appropriate channel.

Figure 35:
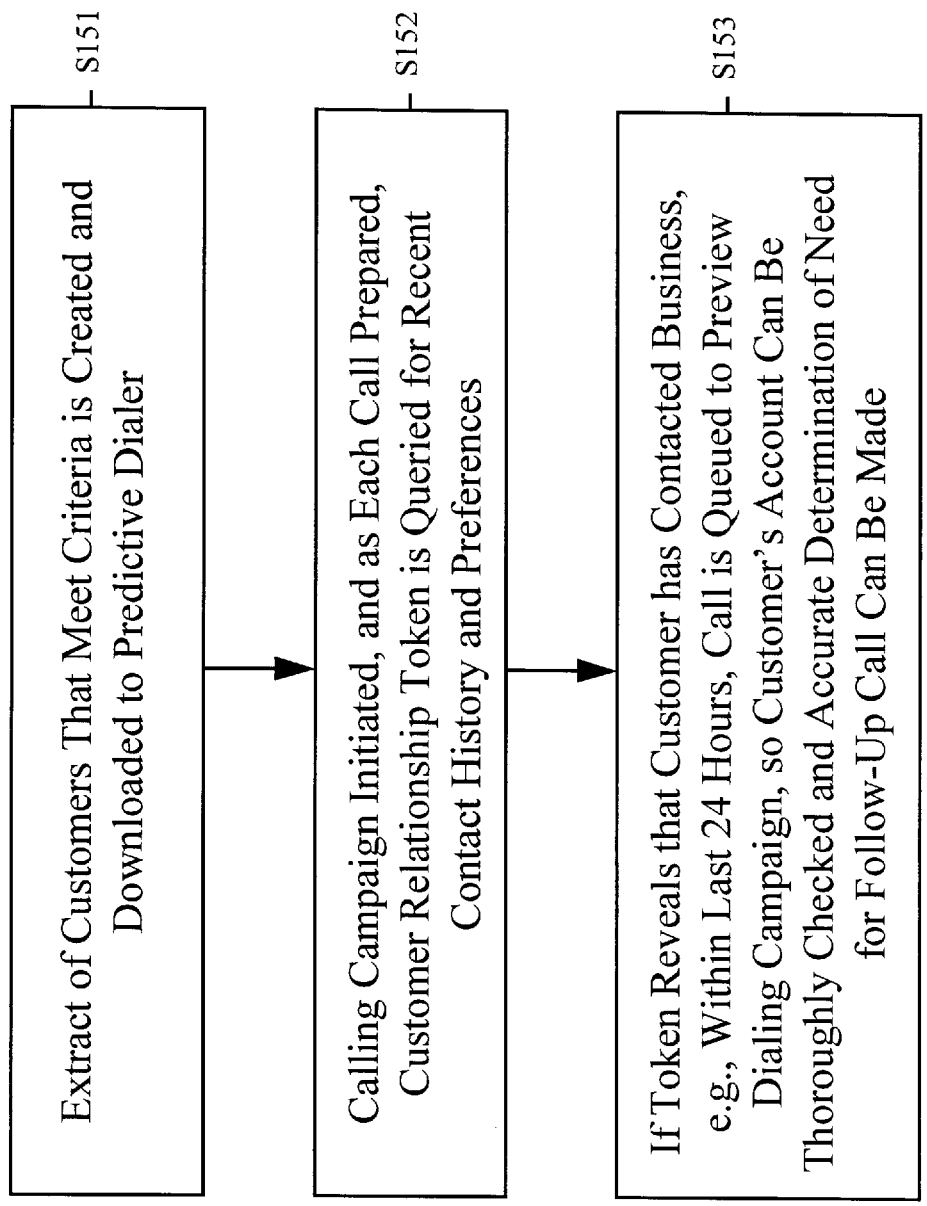
FIG. 35 is a flow chart which illustrates an example use of touchpoint outbound to a customer for an embodiment of the present invention.

FIG. 35 is a flow chart which illustrates an example use of touchpoint outbound to a customer for an embodiment of the present invention. The business wishes to establish voice contact with the customer 2 to discuss promotional opportunities or fulfillment follow-ups. It is assumed in this example that customer contact information is available to a predictive dialer. The business places follow-up calls to customers that have recently ordered new checks. The business typically does this, for example, after 5 business days of mailing.

Referring to FIG. 35, using normal business processes, at S151, an extract of customers that meet this criteria is created and downloaded to the predictive dialer. At S152, the calling campaign is initiated, and as each call is prepared, the customer relationship token 44 is queried for recent contact history and preferences. At S153, if the token 44 reveals that the customer 2 has contacted the business, for example, within the last 24 hours, the call is queued to a preview dialing campaign, so that the customer's account can be thoroughly checked and an accurate determination of the need for the follow-up call can be made.

Figure 36:
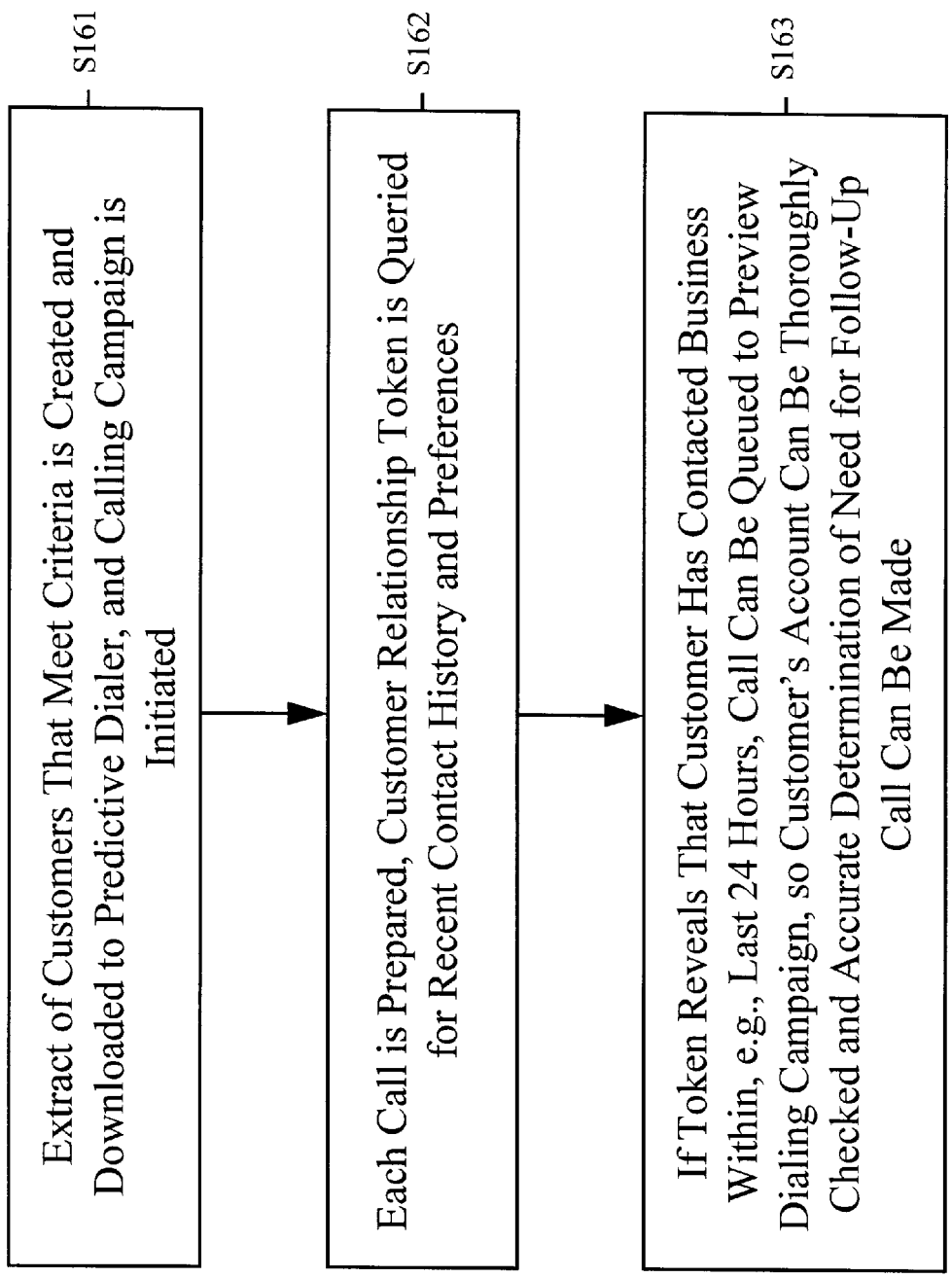
FIG. 36 is a flow chart which illustrates and example of use of an e-mail broadcast to customers for an embodiment of the present invention.

FIG. 36 is a flow chart which illustrates and example of use of an e-mail broadcast to customers for an embodiment of the present invention. The business wishes to distribute e-mail to customers for the purpose of special promotional offering or fulfillment follow-ups. In this example, it is assumed that customer contact information is available to the predictive dialer. The business wishes to place follow-up calls to customers that have recently ordered new checks. The business typically does this, for example, after 5 business days of mailing.

Referring to FIG. 36, using normal business processes, at S161, an extract of customers that meet this criteria is created and downloaded to the predictive dialer, and the calling campaign is initiated. At S162, as each call is prepared, the customer relationship token 44 is queried for recent contact history and preferences. At S163, if the token 44 reveals that the customer 2 has contacted the business within, for example, the last 24 hours, the call can be queued to a preview dialing campaign, so that the customer's account can be thoroughly checked and an accurate determination of the need for the follow-up call can be made.

Figure 37:
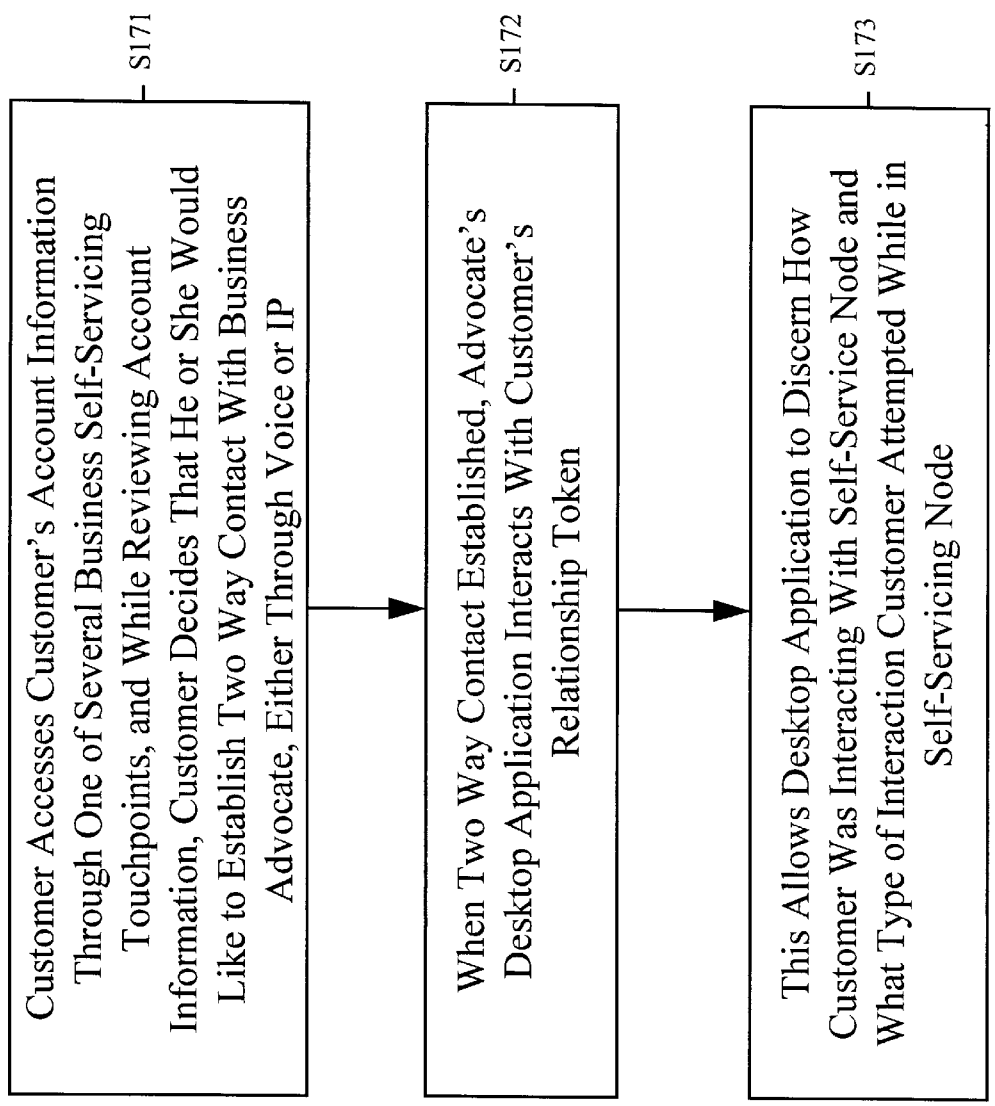
FIG. 37 is a flow chart which shows an example of use of a desktop computer as a touchpoint for the customer for an embodiment of the present invention.

FIG. 37 is a flow chart which shows an example of use of a desktop computer as a touchpoint for the customer for an embodiment of the present invention. The customer 2 requests contact with the knowledge center advocate. When the customer 2 contact is transferred to the advocate, the CTI middleware and desktop application query the customer relationship token 44 to determine which application focus to select for the current session. A multi-focus desktop application with cross trained, multi-skilled advocates are assumed in this example.

Referring to FIG. 37, at S171, the customer 2 accesses the customer's account information through one of several business self-servicing touchpoints, and while reviewing the account information, the customer decides that he or she would like to establish two way contact with a business advocate, either through voice or IP. At S172, when the two way contact is established, the advocate's desktop application interacts with the customer's relationship token 44. At S173, this allows the desktop application to discern how the customer 2 was interacting with the self-service node and what type of interaction the customer attempted while in the self-servicing node.

Various preferred embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the present invention. Accordingly, the invention is only limited by the following claims.

What is claimed is:

1. A method for presenting customized and personalized advice for a customer by a financial institution, comprising:
analyzing information relating to the customer consisting at least in part of token data for the customer from a token database by an advice engine of the financial institution to identify at least one customer characteristic indicative of a type of advice preferable to the customer;
automatically generating at least one item of advice by the advice engine of the type indicated to be preferable to the customer;
analyzing information relating to the customer consisting at least in part of the token data for the customer by a presentation engine of the financial institution to identify at least one customer characteristic indicative of a preference of the customer for a manner in which to present the advice to the customer;
automatically presenting the generated item of advice to the customer by the presentation engine in the manner indicated to be preferable to the customer;
automatically assessing an effectiveness of the presented item of advice by a context assessment engine of the financial institution; and
automatically updating the token data with a result of the assessment by the context assessment engine.

2. The method of claim 1, wherein analyzing the information to identify the customer characteristic indicative of the type of advice further comprises receiving a customer input by the advice engine of the financial institution.

3. The method of claim 2, wherein receiving the customer input further comprises receiving the customer input by the advice engine from a presentation engine of the financial institution.

4. The method of claim 3, wherein receiving the customer input further comprises receiving the customer input by the presentation engine from the customer.

5. The method of claim 3, wherein receiving the customer input further comprises automatically parsing the customer input by the presentation engine.

6. The method of claim 3, wherein receiving the customer input further comprises automatically characterizing the customer input by the presentation engine.

7. The method of claim 2, wherein receiving the customer input further comprises receiving the customer's ID by the advice engine.

8. The method of claim 7, wherein receiving the customer's ID further comprises verifying the customer with the customer's ID by the advice engine.

9. The method of claim 1, wherein analyzing the information to identify the customer characteristic indicative of the type of advice further comprises automatically reading financial institution data by the advice engine of the financial institution.

10. The method of claim 1, wherein analyzing the information to identify the customer characteristic indicative of the type of advice further comprises automatically analyzing data of the financial institution by the advice engine of the financial institution to identify at least one customer characteristic indicative of a responsive type of advice preferable to the customer.

11. The method of claim 10, wherein automatically analyzing the data further comprises automatically reading the data by the advice engine from at least one category of financial institution data selected from a group consisting of presentation data, marketing and business rules data, and customer profile data.

12. The method of claim 1, wherein analyzing the information to identify the customer characteristic indicative of the type of advice further comprises automatically analyzing data of the financial institution by the advice engine of the financial institution to identify at least one customer characteristic indicative of a proactive type of advice preferable to the customer.

13. The method of claim 12, wherein automatically analyzing the data further comprises automatically reading the data by the advice engine from at least one category of financial institution data selected from a group consisting of customer pertinent news data, customer asset investment data, customer interaction frequency data, customer purchasing history data, customer risk factor appraisal data, and customer risk area data.

14. The method of claim 1, wherein automatically generating the item of advice further comprises automatically preparing a responsive item of advice for the customer by the advice engine.

15. The method of claim 14, wherein automatically preparing the responsive item of advice further comprises automatically preparing the responsive item of advice at least in part according to a reading by the advice engine of data from at least one category of financial institution data selected from a group consisting of presentation data, marketing and business rules data, customer profile data, financial institution product information data, statistical data, customer token data, and customer asset and liability data.

16. The method of claim 1, wherein automatically generating the item of advice further comprises automatically preparing a proactive item of advice for the customer by the advice engine.

17. The method of claim 16, wherein automatically preparing the proactive item of advice further comprises automatically preparing the proactive item of advice at least in part according to a reading by the advice engine of data from at least one category of financial institution data selected from a group consisting of customer pertinent news data, customer asset investment data, customer interaction frequency data, customer purchasing history data, customer risk factor appraisal data, and customer risk area data.

18. The method of claim 16, wherein automatically preparing the proactive item of advice further comprises automatically filtering at least one category of data for the customer by the advice engine selected from a group of customer pertinent data consisting of news of the day, special events tied to a current date, and sales information of interest to the customer.

19. The method of claim 1, wherein automatically generating the item of advice further comprises automatically packaging the item of advice by the advice engine in a preferred format for the customer.

20. The method of claim 1, wherein automatically generating the item of advice further comprises automatically sending the prepared item of advice to a presentation engine of the financial institution by the advice engine.

21. The method of claim 1, wherein automatically generating the item of advice further comprises automatically posting the item of advice to a token database of the financial institution by the advice engine.

22. The method of claim 1, wherein automatically generating the item of advice further comprises automatically sending an update related to the prepared item of advice to a customer profile of the financial institution by the advice engine.

23. The method of claim 1, wherein automatically generating the item of advice further comprises automatically sending an update related to the prepared item of advice to a context assessment engine of the financial institution by the advice engine.

24. The method of claim 1, wherein analyzing the information to identify the customer characteristic indicative of the manner to present the advice further comprises deciphering a customer touchpoint channel by the presentation engine of the financial institution.

25. The method of claim 24, wherein analyzing the information to identify the customer characteristic indicative of the manner to present the advice further comprises molding a customer token by the presentation engine according to at least one customer characteristic for the touchpoint channel.

26. The method of claim 24, wherein analyzing the information to identify the customer characteristic indicative of the manner to present the advice further comprises recognizing a customer location by the presentation engine.

27. The method of claim 1, wherein analyzing the information to identify the customer characteristic indicative of the manner to present the advice further comprises automatically reading at least one fulfillment process status into a customer token by the presentation engine of the financial institution.

28. The method of claim 1, wherein analyzing the information to identify the customer characteristic indicative of the manner to present the advice further comprises automatically reading at least one intent of the financial institution into a customer token by the presentation engine of the financial institution.

29. The method of claim 1, wherein analyzing the information to identify the customer characteristic indicative of the manner to present the advice further comprises automatically reading the token data for the customer and at least one category of financial institution data by the presentation engine of the financial institution selected from a group consisting of customer continuity data, customer financial profile data, and customer behavior data.

30. The method of claim 1, wherein analyzing the information to identify the customer characteristic indicative of the manner to present the advice further comprises automatically processing at least one immediate intent of the customer by the presentation engine of the financial institution.

31. The method of claim 1, wherein analyzing the information to identify the customer characteristic indicative of the manner to present the advice further comprises identifying a presentation format for the customer by the presentation engine of the financial institution based at least in part on the identified customer characteristic.

32. The method of claim 1, wherein automatically presenting the advice by the presentation engine further comprises automatically receiving the advice by the presentation engine from the advice engine of the financial institution.

33. The method of claim 1, wherein automatically presenting the advice by the presentation engine further comprises automatically packaging a response by the presentation engine to an inquiry by the customer received by the presentation engine.

34. The method of claim 1, wherein automatically presenting further comprises automatically identifying the manner indicated to be preferable to the customer by the presentation engine.

35. The method of claim 34, wherein automatically identifying the manner further comprises automatically identifying the manner indicated to be preferable to the customer by the presentation engine according to the token data for the customer.

36. The method of claim 35, wherein automatically identifying the manner indicated to be preferable to the customer further comprises automatically modifying at least one aspect of the manner of presentation by the presentation engine according to the token data from a group of aspects consisting of a presentation screen, a presentation voice, presentation colors, and presentation music.

37. The method of claim 1, wherein automatically presenting further comprises automatically presenting the advice by the presentation engine to the customer through a medium designated according to a token process of the financial institution.

38. The method of claim 37, wherein automatically presenting the advice through the designated medium further comprises automatically presenting the advice to the customer by the presentation engine through at least one of a phone/interactive voice response, a personal computer/browser, a network/Internet, a kiosk/intranet, a recruitment center/self service, an automated teller machine/self service, a personal digital assistant/digital, and an agent at a desktop/browser.

39. The method of claim 1, wherein automatically evaluating further comprises automatically evaluating the effectiveness of a financial institution message of the advice by the context assessment engine.

40. The method of claim 1, wherein automatically evaluating further comprises automatically evaluating the effectiveness of a touchpoint channel for the advice by the context assessment engine.

41. The method of claim 1, wherein automatically evaluating further comprises automatically evaluating the effectiveness of a subject of the advice by the context assessment engine.

42. The method of claim 1, wherein automatically evaluating further comprises automatically reading an input from an advice engine of the financial institution by the context assessment engine.

43. The method of claim 42, wherein automatically evaluating further comprises automatically comparing the input from the advice engine with a customer token by the context assessment engine.

44. A system for presenting customized and personalized advice for a customer by a financial institution, comprising:
   an advice engine for analyzing information relating to the customer consisting at least in part of token data for the customer from a token database to identify at least one customer characteristic indicative of a type of advice preferable to the customer and for automatically generating at least one item of advice of the type indicated to be preferable to the customer;
   a presentation engine coupled to the advice engine for analyzing information relating to the customer consisting at least in part of the token data for the customer to identify at least one customer characteristic indicative of a preference of the customer for a manner in which to present the advice to the customer and for presenting the generated item of advice to the customer in the manner indicated to be preferable to the customer; and
   a context engine coupled to at least one of the advice engine and the presentation engine for automatically assessing an effectiveness of the presented advice and for automatically updating a token structure of the financial institution with a result of the assessment.

\* \* \* \* \*